United States Patent
Murakami et al.

(10) Patent No.: US 6,532,648 B2
(45) Date of Patent: *Mar. 18, 2003

(54) APPARATUS FOR FIXEDLY CONNECTING THREADED TUBES, AND RECORDING MEDIUM STORING CONTROL PROGRAM

(75) Inventors: Yukitaka Murakami, Fukuoka (JP); Shinji Hashimura, Kurume (JP); Kazuya Mori, Kurume (JP)

(73) Assignee: Central Motor Wheel Co., Ltd., Anjo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/095,010

(22) Filed: Mar. 12, 2002

(65) Prior Publication Data

US 2002/0121012 A1 Sep. 5, 2002

Related U.S. Application Data

(62) Division of application No. 09/535,990, filed on Mar. 27, 2000, now Pat. No. 6,385,837.

(30) Foreign Application Priority Data

Apr. 5, 1999 (JP) .............................................. 11-98046

(51) Int. Cl.[7] .................................................. B23P 21/00
(52) U.S. Cl. ............................. 29/714; 29/240; 285/18; 73/862.21; 73/862.23; 73/862.24; 73/862.25
(58) Field of Search ........................ 29/714, 721, 722, 29/240.5, 407.02, 407.03, 428, 240; 285/18, 333, 335; 73/862.21, 862.23, 862.24, 862.25

(56) References Cited

U.S. PATENT DOCUMENTS

| 2,527,456 A | 10/1950 | Schmeling |
| 3,368,396 A | 2/1968 | Burkleo et al. |
| 3,606,664 A | 9/1971 | Weiner |
| 3,693,727 A | * 9/1972 | Bell ............................ 173/177 |
| 3,696,872 A | 10/1972 | Jonsson |
| 3,745,820 A | 7/1973 | Weiner |
| 3,882,377 A | 5/1975 | Kelly |
| 3,942,592 A | 3/1976 | Hodge |
| 3,975,954 A | * 8/1976 | Barnich ...................... 173/182 |
| 4,091,451 A | * 5/1978 | Weiner et al. .............. 173/182 |
| 4,127,927 A | 12/1978 | Hauk et al. |
| 4,142,591 A | 3/1979 | Himmelstein |
| 4,176,436 A | * 12/1979 | McCombs et al. .......... 173/182 |
| 4,202,208 A | 5/1980 | Byrne, Jr. |
| 4,210,017 A | * 7/1980 | Motsinger ..................... 702/41 |
| 4,375,120 A | 3/1983 | Sigmund |
| 4,375,121 A | * 3/1983 | Sigmund ..................... 173/176 |
| 4,501,335 A | 2/1985 | Gann |
| 4,567,779 A | 2/1986 | Byrne |
| 4,592,125 A | * 6/1986 | Skene ..................... 29/407.03 |
| 4,614,120 A | 9/1986 | Fradin et al. |

(List continued on next page.)

Primary Examiner—Gregory M. Vidovich
Assistant Examiner—Essama Omgba
(74) Attorney, Agent, or Firm—Oliff & Berridge, PLC

(57) ABSTRACT

Method of fixedly connecting together externally and internally threaded tubes by tight engagement of externally and internally threaded portions of the tubes, wherein a wrenching operation is performed to rotate the externally and internally threaded tubes relative to each other with the externally and internally threaded portions engaging each other while an axial force is applied between the tubes. A physical quantity relating to a coefficient of friction between said tubes is obtained on the basis of a detected wrenching torque applied to rotate the tubes relative to each other and the axial force, and a terminating condition for terminating the wrenching operation is determined on the basis of the obtained physical quantity. The wrenching operation is terminated when the terminating condition has been satisfied. Apparatus for practicing the method and recording medium storing a control program for the method are also disclosed.

31 Claims, 40 Drawing Sheets

U.S. PATENT DOCUMENTS

| | | |
|---|---|---|
| 4,667,389 A | 5/1987 | Hasha |
| 4,692,988 A | 9/1987 | Shulver et al. |
| 4,700,576 A | 10/1987 | Grare et al. |
| 4,730,254 A * | 3/1988 | Voden, Jr. .................. 173/151 |
| 4,738,145 A | 4/1988 | Vincent et al. |
| 4,791,816 A | 12/1988 | Grare et al. |
| RE33,526 E | 1/1991 | Coyle, Sr. |
| 5,040,827 A * | 8/1991 | DeLange ..................... 285/18 |
| 5,105,519 A | 4/1992 | Doniwa |
| RE34,063 E | 9/1992 | Vincent et al. |
| 5,216,795 A | 6/1993 | Hansson |
| 5,233,742 A | 8/1993 | Gray et al. |
| 5,245,265 A | 9/1993 | Clay |
| 5,278,775 A | 1/1994 | Bibel |
| 5,321,506 A | 6/1994 | Sargent |
| 5,390,568 A | 2/1995 | Pietras |
| 5,402,688 A * | 4/1995 | Okada et al. ............ 73/862.21 |
| 5,404,643 A | 4/1995 | Rice |
| 5,471,739 A * | 12/1995 | Fetzer ........................ 29/237 |
| 5,502,883 A | 4/1996 | Ohmi et al. |
| 5,509,316 A | 4/1996 | Hall |
| 5,637,806 A * | 6/1997 | Baryshnikov et al. ... 73/862.21 |
| 5,661,888 A * | 9/1997 | Hanslik ................... 29/407.02 |
| 5,837,907 A | 11/1998 | Ohmi et al. |
| 6,047,455 A | 4/2000 | Hansson |
| 6,056,324 A | 5/2000 | Reimert et al. |
| 6,144,891 A * | 11/2000 | Murakami et al. .......... 700/108 |
| 6,212,763 B1 | 4/2001 | Newman |
| 6,233,807 B1 | 5/2001 | Werner |
| 6,263,742 B1 | 7/2001 | Gruson et al. |
| 6,385,837 B1 * | 5/2002 | Murakami et al. .......... 285/333 |

* cited by examiner

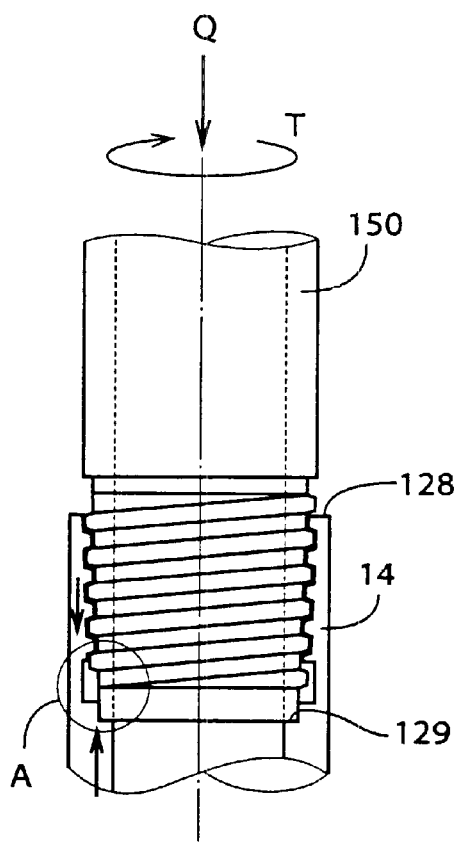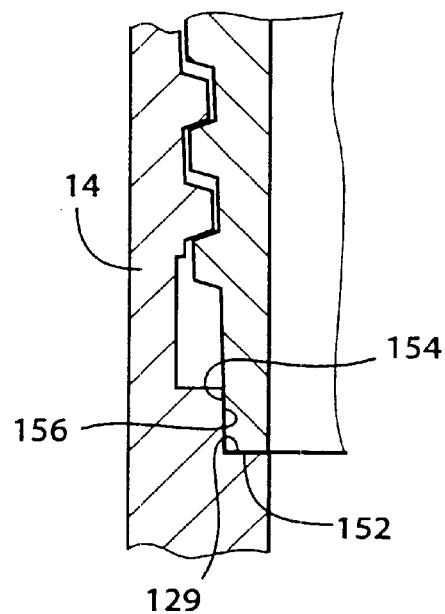
FIG. 15A
FIG. 15B
DETAILS OF PORTION A

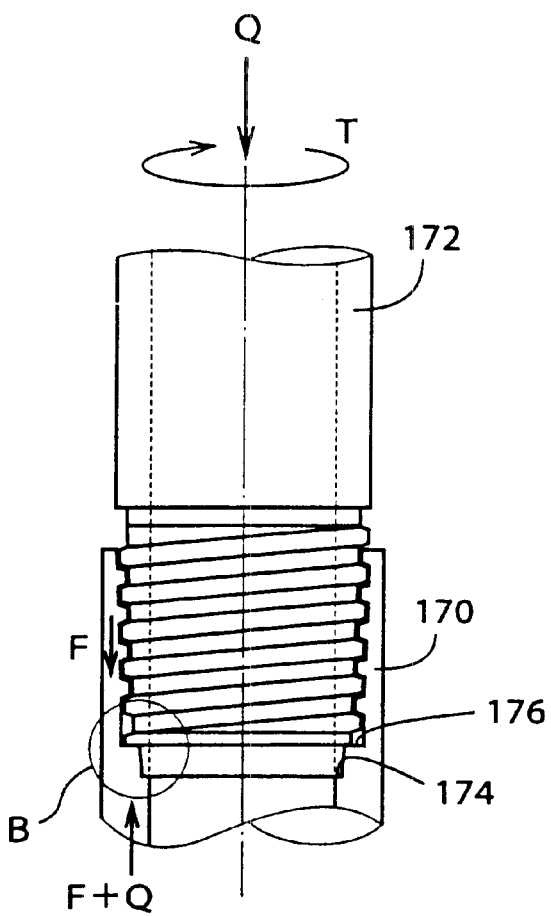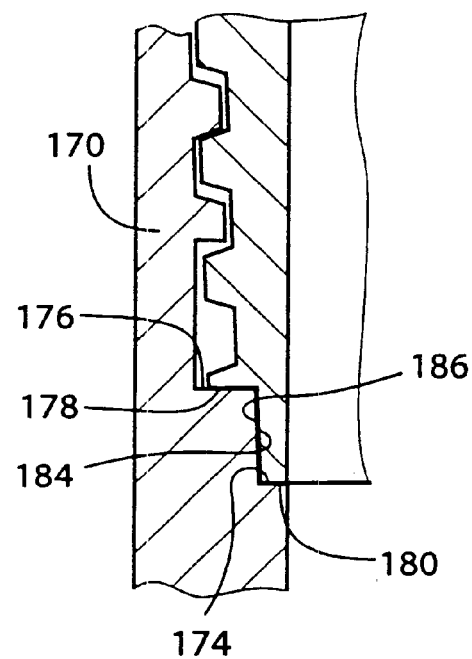
FIG. 16A
FIG. 16B
DETAILS OF PORTION B

DETAILS OF PORTION C

WHERE Q = 500N

WHERE Q = 1000N

APPARATUS FOR FIXEDLY CONNECTING THREADED TUBES, AND RECORDING MEDIUM STORING CONTROL PROGRAM

This application is a Divisional of patent application Ser. No. 09/535,990 filed Mar. 27, 2000, now U.S. Pat. No. 6,385,837.

This application is based on Japanese Patent Application No. 11-98046 filed Apr. 5, 1999, the contents of which are incorporated hereinto by reference.

BACKGROUND OF THE INVENTION

1. Field of the Invention

The present invention relates to a method and an apparatus for fixedly connecting together an externally threaded tube and an internally threaded tube by tight engagement of an externally threaded portion and an internally threaded portion provided on the externally and internally threaded tubes, respectively. The present invention is applicable to operations to connect any threaded tubes, but is preferably applicable to operations to connect tubes having comparatively large lengths and diameters, for obtaining pipes used to support earth drilling tools for drilling or boring the earth in oil fields, and fluid transporting pipes used for transporting oils, natural gases and other fluids.

2. Discussion of the Related Art

As a method of fixedly connecting together two tubes, there is known a method wherein an externally threaded portion of an externally threaded tube and an internally threaded portion of an internally threaded tube are first brought into engagement with each other and are then rotated relative to each other so that the two tubes are fastened or fixedly connected to each other. Three typical examples of this method are as follows:

1) The threaded surfaces (hereinafter referred to as "contacting thread surfaces" of the externally and internally threaded portions of the two tubes are held in meshing engagement with each other, with an axial tightening force acting between the contacting threaded surfaces, while shoulder surfaces of the two tubes are held in contact with each other at their contacting portions (hereinafter referred to "contacting shoulder surfaces");

2) The contacting thread surfaces of the two tubes are held in meshing engagement with each other, with an axial tightening force acting between the contacting thread surfaces, and a non-threaded tapered outer circumferential surface (a radial sealing surface) of the externally threaded tube and a non-threaded tapered inner circumferential surface (radial sealing surface) of the internally threaded tube are held in engagement with each other, with a radial tightening force acting between the tapered outer and inner circumferential surfaces, while the contacting shoulder surfaces are held in contact with each other; and 3) The externally and internally threaded surfaces of the two tubes which are both tapered are held in meshing engagement with each other, with a radial tightening force acting between the contacting thread surfaces of the two tubes, without the contacting shoulder surfaces being provided on the two tubes.

Where the two tubes are fixedly connected together by the method 1) indicated above, a fluid-tight sealing is provided between the contacting shoulder surfaces of the two tubes. Where the two tubes are fixedly connected together by the method 2) indicated above, a fluid-tight sealing is provided both between the contacting shoulder surfaces, and between the radial sealing surfaces. In view of these facts, a tube assembly obtained by connecting the two tubes by the method 1) is suitably usable as a drill pipe for supporting earth drilling or boring tools, and a tube assembly obtained by connecting the two tubes by the method 2) is suitably usable as a fluid transporting pipe. The tube assembly obtained according to the method 2) wherein the sealing is provided between the radial sealing surfaces exhibits higher degrees of fluid tightness and fluid leakage resistance, than the tube assembly obtained according to the method 1) wherein the sealing is provided between the contacting shoulder surfaces.

Where the method 2) is applied to two tubes each of which has two shoulder surfaces that are spaced apart from each other in the axial direction, the axially corresponding shoulder surfaces of the two tubes are usually held in contact with each other. Of the four shoulder surfaces of the two tubes, one of the two shoulder surfaces of the internally threaded tube which is located at the outer or distal end of the internally threaded portion, and one of the two shoulder surfaces of the externally threaded tube which is located at the inner or proximal end of the externally threaded portion are referred to as "torque shoulder surfaces". Each of the two tubes has a radial sealing surface in the form of a non-threaded tapered inner or outer circumferential surface between the two shoulder surfaces. When the two tubes each having the two shoulder surfaces and the radial sealing surface are connected together according to the method 2), the axial tightening force acts on the tubes at two axial positions corresponding to the two sets of contacting shoulder surfaces, and the radial tightening force acts on the tubes between the contacting radial sealing surfaces. Since the fluid-tight sealing is provided primarily by the contacting radial sealing surfaces, the method is called a radial sealing method [Method 2)-1]. Depending upon the dimensional relationships of the radial sealing surfaces and the shoulder surfaces of the two tubes, it is possible that only the torque shoulder surfaces of the two tubes are held in contact with each other, with the other shoulder surfaces being held in an axially spaced-apart relationship with each other.

Where the two tubes are not provided with the torque shoulder surfaces, it is possible that the axial tightening force acts between the contacting shoulder surfaces, while the radial tightening force acts between the radial sealing surfaces. In this case, the fluid-tight sealing is provided primarily by the contacting shoulder surfaces, and therefore the method is called a shoulder sealing method. Tube assemblies obtained according to this shoulder sealing method and the above-indicated radial sealing method are referred to as premium joints, and these methods are called a premium joint method [Method 2)-2].

The specific method that can be suitably used for fixedly connecting together the two tubes depends upon the configurations of the threaded portions of the two tubes and the configurational and dimensional relationships of the threaded portions and the shoulder surfaces. Not only the method 3) but also the methods 1) and 2) may be used where the threaded portions of the tubes are tapered. Usually, the method 1) is used for the tubes whose threaded portions have trapezoidal or triangular threads, and the methods 2) and 3) are used for the tubes whose threaded portions have trapezoidal threads. The externally and internally threaded tubes may be called a "pin" and a "box", respectively.

Although an operation to fixedly connect together two threaded tubes is desirably controlled on the basis of the axial and radial tightening forces, this control is difficult. Conventionally, therefore, the tube connecting operation is controlled on the basis of a wrenching torque applied to rotate the two tubes relative to each other, or both the torque and a speed of the relative rotation.

Where the tube connecting operation is controlled on the basis of the wrenching torque, the relative rotation (wrenching operation) is terminated when the actual wrenching torque (torque equal to a resistance to the relative rotation) has become equal to a desired or target value. In this case, the desired wrenching torque value corresponding to a desired tightening force of the two tubes is calculated on the basis of a measured or estimated coefficient of friction at the contacting portions (contacting thread surfaces and contacting shoulder surfaces) of the two tubes. However, the friction coefficient greatly varies depending upon the physical conditions (e.g., roughness) of the contacting surfaces as machined, the lubricating conditions of those contacting is surfaces, and other conditions, which vary under different machining conditions and under different environments in which the tube connecting operation is carried out. Accordingly, the actual tightening force tends to have a considerable variation from the desired or nominal value for the tube assembly to be obtained. Thus, it is difficult to obtain the tube assembly having the nominal or desired tightening force, and the conventionally obtained tube assembly suffers from problems of yield and seizure at the contacting surfaces.

In one example of control of the tube connecting operation on the basis of both the wrenching torque and the relative rotation speed, an upper limit and a lower limit are set for each of the wrenching torque and the relative rotation speed, for defining their optimum ranges. The tube connecting operation is determined to be performed in a normal manner, if the relative rotation speed is in the optimum range when the wrenching torque has reached its lower limit, or if the wrenching torque is in the optimum range when the relative rotation speed has been lowered to its lower limit. If either of the above two conditions is not satisfied, the tube connecting operation is determined to have some abnormality. The relative rotation speed used to effect the above determination is a value detected after the externally and internally threaded tubes have been brought to a predetermined state, which may be: a predetermined state of initiation of the meshing engagement of the externally and internally threaded portions; a state of the meshing engagement established after the two tubes has been rotated relative to each other through a predetermined angle after the initiation of the meshing engagement; or a state in which the wrenching torque has reached a predetermined speed detection initiating value at which the detection or measurement of the relative rotation speed is initiated. The speed detection initiating value may be the wrenching torque value detected when the shoulder surfaces or radial sealing surfaces of the externally and internally threaded tubes have been brought into contact with each other after the thread surfaces are in substantial meshing engagement with each other. The control of the tube connecting operation on the basis of both the wrenching torque and the relative rotation speed makes it possible to detect abnormalities of the tube connecting operation, such as an abnormal increase of the wrenching torque (up to its upper limit) before full engagement of the externally and internally threaded portions, which may occur due to foreign matters interposed between the external and internal thread surfaces, and an abnormally high value (upper limit value) of the relative rotation speed when the wrenching torque is not larger than the lower limit.

However, the conventional method and apparatus for fixedly connecting together the externally and internally threaded tubes suffer from a considerable large amount of variation of the final wrenching torque due to a variation of the friction coefficient of the individual tubes, since the measured or estimated friction coefficient is used to determine the speed detection initiating value of the wrenching torque, and the lower and upper limits of the wrenching torque. Accordingly, the conventional method and apparatus do not permit accurate detection of abnormalities in the tube connecting or wrenching operation.

SUMMARY OF THE INVENTION

It is therefore an object of this invention to improve the reliability of control of the operation to fixedly connecting together the externally and internally threaded tubes. The present invention provides the following forms of a method of fixedly connecting the externally and internally threaded tubes, the following forms of an apparatus for practicing this method, and the following forms of a recording medium storing a program for controlling the operation to fixedly connecting the tubes. Like the appended claims, each of these forms of the present invention is numbered and depends from the other form or forms, where appropriate, to indicate possible combinations of technical features of this invention, and for easier understanding of the invention. However, it is to be understood that the present invention is not limited to the technical features and their combinations described below.

(1) A method of fixedly connecting together an externally threaded tube and an internally threaded tube by tight engagement of an externally threaded portion of the externally threaded tube and an internally threaded portion of the internally threaded tube, comprising the steps of: performing a wrenching operation in which the externally and internally threaded tubes are rotated relative to each other with the externally and internally threaded portions engaging each other while an axial force is applied to the tubes for forcing the tubes toward each other; detecting a wrenching torque being applied to rotate the tubes relative to each other; obtaining a physical quantity relating to a coefficient of friction between the tubes, on the basis of the detected wrenching torque and the axial force; determining a terminating condition for terminating the wrenching operation, on the basis of the obtained physical quantity; and terminating the wrenching operation when the terminating condition has been satisfied.

In the tube connecting method according to the form (1) of the invention described above, the physical quantity relating to the coefficient of friction between the two tubes is obtained on the basis of the detected wrenching torque and the axial force, and the terminating condition for terminating the wrenching operation is determined on the basis of the obtained physical quantity. When the determined terminating condition has been satisfied, the wrenching operation is terminated. For instance, a desired final value of the wrenching torque is determined on the basis of the obtained physical quantity. In this case, it is considered that the terminating condition has been satisfied when the detected actual value of the wrenching torque has reached the determined desired final value. It is obvious that the wrenching torque required for establishing a desired axial or radial tightening force between the externally and internally threaded portions of the tubes increases with an increase in the obtained physical quantity.

Assuming that the mutually contacting portions of the two tubes have nominal configurations and dimensions, the physical quantity increases with an increase in the wrenching torque if the axial force applied to the two tubes is constant. If the wrenching torque is constant, the physical quantity increases with an increase in the axial force. These facts will become apparent from the equations (3), (8) and (28) given in the PREFERRED EMBODIMENTS OF THE INVENTION. It will be understood that the physical quantity relating to the friction coefficient can be obtained on the basis of the wrenching torque and the axial force applied to the tubes. An experiment shows that the accuracy of obtaining the physical quantity is improved with an increase in the axial force applied to the two tubes.

In the present tube connecting method, the physical quantity relating to the friction coefficient is obtained for each pair of the externally and internally threaded tubes which are to be fixed connected together. The obtained physical quantity reflects the condition of the contacting surfaces of the tubes as machined or finished, and the lubricating condition of the contacting surfaces, for example. Accordingly, a variation in the tightening force applied between the two tubes can be reduced by determining the terminating condition on the basis of the obtained physical quantity relating to the friction coefficient, so that the actual tube tightening force can be controlled to be as close as possible to the nominal or desired value. Therefore, the present method is effective to avoid a yield or seizure of the contacting portions of the tubes, which would otherwise arise from a variation in the tube tightening force. The physical quantity relating to the friction coefficient may be not only the friction coefficient per se, but may also be any quantity from which the friction coefficient can be estimated. For instance, the physical quantity may be a quantity which changes in steps with the friction coefficient.

(2) A method according to the above mode (1), wherein the externally and internally threaded tubes are rotated relative to each other while the tubes are held so as to extend in the vertical direction.

It is desirable to hold the two tubes upright while the two tubes are rotated relative to each other. In this case wherein the two tubes are held upright, the weight of the upper one of the two tubes is applied as the axial force (compressive force) between the two tubes, while the lower tube is held in a stationary or clamped state. Where the upper tube is held in the clamped state, the weight of the lower tube is applied as the axial force (tensile force) between the two tubes. This form of the method does not require an axial force applying device exclusively provided for the purpose of applying the axial force between the two tubes, or permits the use of an axial force applying device having a comparatively small capacity. This form of the method is effective where the method is practiced to obtain a plurality of fixedly connected tubes which constitute a drill pipe used in the vertically extending attitude for supporting a tool for drilling or boring the earth in oil fields, for example. The present form of the method is particularly effective where the next tube is connected to the upper end of the drill pipe when the level of the upper end has become close to the ground level.

(3) A method according to the above form (1), wherein the externally and internally threaded tubes are rotated relative to each while the tubes are held so as to extend in the horizontal direction.

The method according to the above form (3) of the invention is suitable for obtaining a long pipe extending parallel to the ground surface, by fixedly connecting together the externally and internally threaded tubes. Pipes for transporting oils and natural gases are typical examples of such a pipe as obtained according to this form of the invention.

(4) A method according to any one of the above modes (1)–(3), wherein the axial force is applied to the externally and internally threaded tubes for forcing the tubes toward each other.

The wrenching torque applied to the tubes for relative rotation thereof may be detected while an axial compressive force is applied to the two tubes for forcing these tubes toward each other, or alternatively while an axial tensile force is applied to the two tubes for forcing these tubes away from each other. From the standpoint of the construction of a tube connecting apparatus adapted to practice the method, it is preferable to detect the wrenching torque while the axial compressive force is applied between the two tubes. As described later, the coefficient of friction between the contacting shoulder surfaces of the threaded portions of the tubes can be detected with the axial compressive force applied to the tubes, where the two tubes are fixedly connected together with the shoulder surfaces of the threaded portions held in contact with each other.

(5) A method according to the above form (4), wherein the step of detecting a wrenching torque comprises detecting at least one of an initial value of the wrenching torque in an initial phase of the wrenching operation in which shoulder surfaces of the externally and internally tubes are not in contact with each other while thread surfaces of the tubes are in contact with each other, and an intermediate value of the wrenching torque in an intermediate phase of the wrenching operation in which the shoulder surfaces are in substantial contact with each other while the thread surfaces are not in substantial contact with each other.

The method according to the above form (5) is compatible with the methods 1) and 2) described above. In the initial phase, the thread surfaces of the two tubes are in contact with each other. In the intermediate phase, the shoulder surfaces of the tubes are in contact with each other. In the method according to the present form (5), at least one of the physical quantity relating to the coefficient of friction between the contacting thread surfaces and the physical quantity relating to the coefficient of friction between the contacting shoulder surfaces is obtained, and the terminating condition is determined on the basis of the obtained at least one of those two physical quantities. The accuracy of control of the tightening force applied to the tubes can be improved when the terminating condition is determined on the basis of the two physical quantities obtained.

In the initial and intermediate phases, neither an axial tightening force nor a radial tightening force is generated between the contacting thread or shoulder surfaces. In this sense, it is appropriate to obtain the physical quantity or quantities relating to the friction coefficient in the initial and/or intermediate phases. In a final phase following the intermediate phase, an axial tightening force is generated between the contacting thread surfaces and the contacting shoulder surfaces, and the physical quantity relating to the coefficient of friction between the contacting surfaces cannot be obtained with high accuracy.

For simplifying the axial force applying device, it is preferable that the amount and the direction of the axial force applied to the two tubes in the initial direction be the same as those of the axial force applied in the intermediate phase. However, this is not essential. That is, at least one of the amount and the direction in the initial phase may be different from that in the intermediate phase. For instance, an axial tensile force is applied between the two tubes in the initial phase, while an axial compressive force is applied in the intermediate phase. Further, the amount of the axial force applied between the two tubes may be changed during the wrenching operation. The physical quantity relating to the friction coefficient may be obtained on the basis of two or more combinations of the axial force and the wrenching torque value. As described above, the accuracy of obtaining the physical quantity and the accuracy of determination of the terminating condition can be improved by increasing the axial force to thereby increase the initial and intermediate torque values.

(6) A method according to any one of the above modes (1)–(5), wherein the externally and internally threaded portions are tapered threaded portions, and the wrenching torque is detected while a radial tightening force is not generated between the tapered threaded portions.

The method according to the above form (6) is particularly compatible with the method 3) indicated above, but is also compatible with the methods 1 and 2). Where the threaded portions are tapered, a radial tightening force is not generated between the contacting thread surfaces in the initial phase of the wrenching operation, and is generated therebetween in the final phase. In view of this fact, the physical quantity relating to the friction coefficient is obtained in the initial phase, so that the physical quantity can be obtained with high accuracy, without an influence of the radial tightening force.

(7) A method according to any one of the above modes (1)–(6), wherein the wrenching torque is detected in an initial phase of the wrenching operation in which leading franks of the externally threaded portion of the externally threaded tube contact leading franks of the internally threaded portion of the internally threaded tube.

The method according to the above form (7) is compatible with the methods 1), 2) and 3) described above. In the present method, the physical quantity can be detected with high accuracy in the initial phase, since neither an axial tightening force nor a radial tightening force is generated in the initial phase, as described above. In most cases, the franks of the two tubes which contact each other in the initial phase are different from the franks which contact each other in the final phase. Provided that the condition of the thread surfaces as machined and the lubricating condition of the thread surfaces are uniform over the entire areas of the externally and internally threaded portions, the physical quantity obtained in the initial phase can be considered to be the physical quantity relating to the coefficient of friction between the thread franks which contact each other in the final phase.

(8) A method according to any one of the above forms (5)–(7), wherein the step of obtaining a physical quantity comprises obtaining, on the basis of the physical quantity obtained in the initial phase, a physical quantity relating to a coefficient of friction between surfaces of the externally and internally threaded tubes which contact each other in a final phase of the wrenching operation.

As described above with respect to the above form (7), the physical quantity relating to the coefficient of friction between the surfaces of the tubes which contact each other in the initial phase can be considered to be equal to the physical quantity relating to the coefficient of friction between the surfaces of the tubes which contact each other in the final phase, provided that the surface conditions of the tube are uniform over the entire areas of the threaded portions. Where the surface conditions of the surfaces of the tubes which contact each other in the initial phase are different from those of the surfaces which contact each other in the final phase, the physical quantity relating to the coefficient of friction between the surfaces of the tubes contacting each other in the final phase may be estimated by multiplying the physical quantity obtained in the initial phase by a predetermined factor. In this respect, it is noted that a variation in the surface condition of the threaded portion of each tube is generally smaller than a variation in the surface condition of different tubes.

(9) A method according to any one of the above modes (1)–(8), wherein the externally and internally threaded tubes are rotated relative to each other with the wrenching torque being applied to the tubes at radial positions of outer circumferential surfaces of the tubes.

Where the tubes are relatively long, it is relatively difficult to rotate the two tubes relative to each other by applying the wrenching torque to the tubes at axial end portions of the tubes which are remote from the externally and internally threaded portions. In this case, therefore, it is desirable to apply the wrenching torque to the tubes at the radial positions of the outer circumferential surfaces of the tubes, and at the axial positions which are relatively close to the externally and internally threaded portions. It is also desirable to apply the axial force to the tubes at their outer circumferential surfaces.

(10) A method according to any one of the above forms (1)–(9), wherein the externally and internally threaded tubes are rotated relative to each other such that one of the externally and internally threaded tubes is held stationary while the other of the tubes is rotated with the axial force being applied to the above-indicated other tube.

For rotating the externally and internally threaded tubes relative to each other while applying the axial force to the two tubes, a selected one of the following three modes of applying the axial force to the tubes is combined with a selected one of the following three modes of rotating the tubes relative to each other:

Axial Force Applying Modes

Mode 1 in which the axial force is applied to the externally threaded tube while the internally threaded tube is held stationary in the axial direction;

Mode 2 in which the axial force is applied to the internally threaded tube while the externally threaded tube is held stationary in the axial direction; and Mode 3 in which the axial force is applied to both of the externally and internally threaded tubes.

Rotating Modes

Mode A in which the externally threaded tube is rotated relative to the internally threaded tube which is held stationary in the circumferential direction;

Mode B in which the internally threaded tube is rotated relative to the externally threaded tube which is held stationary in the circumferential direction; and Mode C in which both of the externally and internally threaded tubes are rotated.

Where a tube assembly to be obtained from time to time by fixedly connecting two or more pairs of the externally and internally threaded tubes is relatively long, it is desirable that the tube which is connected to one end of the already obtained tube assembly be rotated relative to the already obtained tube assembly while the axial force is applied to the tube being rotated.

(11) A method according to any one of the above forms (1)–(10), wherein the terminating condition is satisfied when an actual value of the wrenching torque has become equal to a desired final value of the wrenching torque which is determined on the basis of the physical quantity.

(12) A method of checking a wrenching operation in which an externally threaded tube and an internally threaded tube are rotated relative to each other, to fixedly connect together the externally and internally threaded tubes by tight engagement of an externally threaded portion of the externally threaded tube and an internally threaded portion of the internally threaded tube, the method comprising (a) determining an upper limit and a lower limit which define an optimum range of a relative rotation speed of the tubes, and an upper limit and a lower limit which define an optimum range of a wrenching torque applied to the tubes for relative rotation of the tubes, (b) determining that the wrenching operation is performed in a normal manner if one of a first condition and a second condition is satisfied, the first condition being satisfied when the relative rotation speed is within the optimum range thereof when the wrenching torque has reached the lower limit thereof, the second condition being satisfied when the wrenching torque is within the optimum range thereof when the relative rotation speed has reached the lower limit thereof, and (c) determining that the wrenching operation is performed in an abnormal manner if neither the first condition nor the second condition is satisfied, the method further comprising the steps of:

applying an axial force to the externally and internally threaded tubes for at least a portion of a period in which the tubes are in substantially contact with each other only at thread surfaces of the externally and internally threaded portions;

obtaining a physical quantity relating to a coefficient of friction between the tubes, on the basis of the axial force and the wrenching torque which are applied to the tubes; and determining the lower and upper limits of the wrenching torque on the basis of the obtained physical quantity.

(13) An apparatus for performing a wrenching operation to fixedly connect together an externally threaded tube having an externally threaded portion and an internally threaded tube having an internally threaded portion, the apparatus comprising:

a rotary drive device for rotating the externally and internally threaded tubes relative to each other with the externally and internally threaded portions engaging each other;

an axial force applying device for applying an axial force to the tubes for at least a portion of a period in which the tubes are rotated by the rotary drive device relative to each other, without generation of a tightening force between the tubes;

a torque detecting device for detecting a wrenching torque applied by the rotary drive device to the tubes for relative rotation thereof while the axial force is applied to the tubes by the axial force applying device;

a physical quantity obtaining device for obtaining a physical quantity relating to a coefficient of friction between the tubes, on the basis of the wrenching torque detected by the torque detecting device and the axial force applied by the axial force applying device; and a terminating condition determining device for determining a terminating condition for terminating the wrenching operation, on the basis of the physical quantity obtained by the physical quantity obtaining device.

The tube connecting apparatus constructed according to the above form (13) of the present invention is capable of practicing the method according to the above form (1) of the invention. The axial force applying device may be arranged to keep applying the axial force throughout the wrenching operation, or apply the axial force for a predetermined portion of the wrenching operation, or two or more times in an intermittent fashion. The axial force applying device may be a support device arranged to support one of the two tubes such that the weight of that one tube acts between the tubes as the axial force. The torque detecting device may be operated only once during the wrenching operation, to detect a single value of the wrenching torque, or two or more times during the wrenching operation, to detect a plurality of wrenching torque values. In the latter case, the physical quantity relating to the friction coefficient can be obtained with higher accuracy, on the basis of the detected wrenching torque values. A termination commanding device may be provided to automatically terminate the wrenching operation by turning off the rotary drive device, when the terminating condition determined by the terminating condition determining device has been satisfied. This arrangement permits automatic termination of the wrenching operation when the actual wrenching torque value has reached the desired final wrenching value. Although this arrangement is ideal, it is not essential. For instance, an indicator such as a buzzer may be provided so that the indicator is operated when the terminating condition has been satisfied, to inform the operator of the apparatus that the terminating condition has been satisfied. In this case, the operator turns off the rotary drive device or terminate the wrenching operation in response to the operation of the indicator.

(14) An apparatus according to the above form (13), wherein the rotary drive device comprises:

a rotary drive source;

a clamping device for clamping one of the externally and internally threaded tubes to a frame structure of the apparatus such that the one of the tubes is not rotatable relative to the frame structure; and a rotary motion transmitting device including a chucking device which holds or chucks the other of the tubes such that the above-indicated other tube is not rotatable relative to the chucking device, the rotary motion transmitting device transmitting a rotary motion of the drive source to the above-indicated other tube through the chucking device.

In the rotary drive device of the tube connecting apparatus according to the above form (14) of the invention, one of the two tubes is clamped while the above-indicated other tube is rotated by the rotary motion of the rotary drive device transmitted thereto by the motion transmitting device through the chucking device. The motion transmitting device may include a first gear fixed to the output shaft of the rotary drive source, and a second gear which is fixed to the chucking device and which meshes with the first gear. Alternatively, the motion transmitting device includes a pulley fixed to the output shaft of the rotary drive source, a pulley fixed to the chucking device, and a timing belt connecting these two pulleys. Where a long pipe is obtained by fixedly connecting together the externally and internally threaded tubes, as described above, the tube which is connected to an already obtained tube assembly is desirably rotated, since the rotation of this tube only relative to the already obtained tube assembly can be achieved with a comparatively small wrenching torque (rotary drive force), and the rotary drive device can be made comparatively small-sized and is accordingly available at a reduced cost.

(15) An apparatus according to the above form (14), wherein the chucking device includes a plurality of part-cylindrical members which are butted together at opposite ends of each of the part-cylindrical members in planes parallel to an axis of the above-indicated other tube, the part-cylindrical members cooperating to form a cylindrical clamping structure of split type which has an axis aligned with the axis of the above-indicated other tube and which is disposed radially outwardly of the above-indicated other tube, for contact with an outer circumferential surface of the above-indicated other tube to hold the other tube.

The part-cylindrical members of the split type cylindrical clamping structure may first be disposed radially outwardly of the outer circumferential surface of an axially intermediate portion of the above-indicated other tube, and then butted together and connected to each other by a suitable connecting or locking device, so that the split type cylindrical clamping structure is fastened to the tube such that the tube is not rotatable relative to the clamping structure. If the chucking device uses a one-piece annular or cylindrical clamping member, this clamping member must be removed in the axial direction from the threaded end portion toward the other end portion after the above-indicated other tube is fixedly connected to the above-indicated one tube. To the contrary, the split type cylindrical clamping structure can be easily removed from the tube, for instance, in the radial direction. The split-type cylindrical clamping structure may consist of at least two part-cylindrical members, for instance, three part-cylindrical members. The part-cylindrical members butted together at their ends may be connected together with connector screws extending substantially in the circumferential direction of the cylindrical clamping structure, so that the part-cylindrical members are held in pressing contact with the outer circumferential surface of the tube. However, the removal of the clamping structure can be made easier by using such connector screw or screws at only one circumferential position of the structure, and using pivotal connectors at the other circumferential positions, so that the adjacent part-cylindrical members are connected to each other pivotally about a connector pin extending in the axial direction of the clamping structure. In this case, the connector screw or screws provided at the single circumferential position is/are tightened the split type cylindrical clamping structure is fastened to the tube with the part-cylindrical members in pressing contact with the outer circumferential surface of the tube.

(16) An apparatus according to the above form (15), wherein the cylindrical clamping structure has a locking portion projecting in an axial direction thereof from axial end faces of at least two of the plurality of the part-cylindrical members, the cylindrical clamping structure being locked at the locking portion for holding the above-indicated other tube.

Where the locking portion projects in the axial direction from the part-cylindrical members but does not project in the radially outward direction from the outer part-cylindrical surface of the part-cylindrical members, the wrenching torque can be applied to the above-indicated other tube at its outer circumferential surface. The locking portion projecting from the axial end faces may include a portion which projects in the radially outward direction of the cylindrical clamping structure.

(17) An apparatus according to the above mode (14), wherein the chucking device includes an annular member having an inside diameter larger than an outside diameter of the above-indicated other tube, and an interposed member which is interposed between an inner circumferential surface of the annular member and an outer circumferential surface of the above-indicated other tube, such that the wrenching torque is transmittable from the annular member to the above-indicated other tube.

The interposed member may be three or more radial screws which are screwed in respective tapped holes through the annular member so as to extend in the radial direction and which have heads for contact with the outer circumferential surface of the above-indicated other tube. For fastening the annular member to the tube, the radial screws are first screwed in the radially outward direction of the annular member, and the annular member is positioned radially outwardly of the tube. Then, the radial screws are screwed in the radially inward direction so that the heads of the screws contact the outer circumferential surface of the tube, to permit the wrenching torque to be transmitted to the tube. The radial screws may be replaced by radial pins, which are movable in the radially outward and inward directions by a suitable actuator. The interposed member may be constructed according to the following form (18).

(18) An apparatus according to the above mode (17), wherein one of the annular member and the interposed member has a first tapered inner circumferential surface whose diameter increases in one of opposite axial directions of the annular member, and the interposed member has a second tapered outer circumferential surface whose diameter decreases in the one of the opposite axial directions, the interposed member further having an inner circumferential surface whose diameter is constant in the opposite axial directions, the interposed member consisting of a plurality of part-cylindrical wedge members which are butted together in planes parallel to the axis of the above-indicated other tube when the part-cylindrical wedge members are pressed in the one of the opposite axial directions into an annular gap between the first tapered inner circumferential surface and the outer circumferential surface of the above-indicated other tube, for holding the above-indicated other tube such that the wrenching torque is transmittable from the annular member to the other tube, the chucking device further including a pressing device for pressing the plurality of part-cylindrical wedge members of the interposed member into the annular gap.

The pressing device is arranged to press the plurality of part-cylindrical wedge members of the interposed member in between the annular member and the above-indicated other tube. The simplest form of the pressing device includes a pressure portion which extends radially outwardly from each of the wedge members and which has through-holes formed therethrough in the axial direction. In this case, the pressing device further includes pressure screws which are screwed through the respective through-holes into respective tapped holes formed in one axial end face of the annular member. By tightening the pressure screws, the pressure portion is axially moved with the part-cylindrical wedge members toward the annular member, whereby the wedge members are interposed between the annular member and the tube. Preferably, the annular member has the first tapered inner circumferential surface, and the interposed member is a tapered cylindrical wedge consisting of a plurality of part-cylindrical wedge pieces which cooperate to define the second tapered outer circumferential surface for sliding contact with the first tapered inner circumferential surface, and the straight inner circumferential surface for sliding contact with the outer circumferential surface of the tube. This arrangement permits a larger maximum amount of the wrenching torque to be transmitted to the tube through the annular member and the tapered cylindrical wedge. The part-cylindrical wedge pieces may be obtained by cutting a tapered cylindrical wedge member in respective planes parallel to and including its axis. The chucking device according to the above form (18) wherein the annular member have the continuous outer circumferential surface without butting seams, the wrenching torque can be more easily transmitted to the annular member, than in the chucking device which includes a plurality of part-cylindrical members which are butted together for contact with the outer circumferential surface of the tube.

(19) An apparatus according to any one of the above forms (14)–(18), wherein the rotary drive device includes one of an electric motor and a fluid-actuator motor.

The fluid-actuator motor includes a hydraulically operated motor and a pneumatically operated motor. The fluid-actuator motor is capable of producing a relatively large torque with a relatively small size, and is therefore suitable for the rotary drive device which is required to rotate the tubes relative to each other at a comparatively low speed with a comparatively high torque. The electric motor is preferably equipped with a speed reducer.

(20) An apparatus according to any one of the above forms (13)–(19), wherein the rotary drive device is a hydraulically operated rotary drive device including a hydraulic cylinder, a chucking device for clamping the above-indicated other tube, and a motion converting device for converting a linear motion of the hydraulic cylinder into a rotary motion of the chucking device, the above-indicated other tube being rotated by rotation of the chucking device by operation of the hydraulic cylinder.

(21) An apparatus according to any one of the above forms (13)–(19), wherein both of the externally and internally threaded tubes are positioned so as to extend in a vertical direction, and the axial force applying device includes vertically holding device for holding one of the tubes such that a weight of the above-indicated one tube acts as the axial force between the externally and internally threaded portions of the tubes.

(22) An apparatus according to any one of the above forms (13)–(21), wherein the axial force applying device includes a forcing device for applying the axial force to the externally and internally threaded tubes such that the tubes are forced toward each other by the axial force.

(23) An apparatus according to any one of the above forms (13)–(22), wherein the rotary drive device includes a clamping device for clamping one of the externally and internally threaded tubes to a frame structure of the apparatus such that the above-indicated one tube is not rotatable relative to the frame structure, the rotary drive device rotating the other of the tubes relative to the above-indicated one tube, and wherein the axial force applying device applies the axial force to the above-indicated other tube while the above-indicated one tube is held by the frame structure such that the above-indicated one tube is not axially movable relative to the frame structure.

The apparatus can be small-sized, by constructing the rotary drive device and the axial force applying device so that one of the two tubes is held by the frame structure such that this one tube is neither rotatable nor axially movable relative to the frame structure, and so that the axial force is applied to the other tube by the axial force applying device while this other tube is rotated by the rotary drive device relative to the above-indicated one tube. Where a long pipe is obtained by fixedly connecting together the externally and internally threaded tubes, as described above, it is desirable to apply the wrenching torque and the axial force to the tube which is connected to an already obtained tube assembly.

(24) An apparatus according to the above form (23), wherein the axial force applying device includes:

at least one axially forcing roller disposed such that an outer circumferential surface of the at least one axially forcing roller is held in contact with an outer circumferential surface of the above-indicated other tube;

a roller support structure which supports the at least one axially forcing roller such that the at least one axially forcing roller is rotatable about an axis thereof;

a holder device which holds the roller support structure in the frame structure such that the roller support structure is immovable in axial and radial directions of the above-indicated other tube and is rotatable about an axis of the other tube; and a roller drive device disposed on the roller support structure and operable to rotate the at least one axially forcing roller.

In the apparatus according to the above form (24) wherein the roller support structure is held in the frame structure such that the roller support structure is not movable in the axial and radial directions of the above-indicated other tube while it is rotatable about the axis of the tube. This arrangement permits the application of the axial force to the above-indicated other tube while this tube is rotated. Where the roller drive device is operable bidirectionally, it is possible to selectively apply either an axial compressive force or an axial tensile force between the two tubes.

(25) An apparatus according to the above form (24), wherein the holder device includes an annular rail fixed to the frame structure coaxially with the other tube, and at least three support rollers attached to the roller support structure such that the at least three support rollers are arranged in a circumferential direction of the other tube, the at least three support rollers being held in rolling engagement with the annular rail.

The three or more support rollers are required to be arranged along the outer circumferential surface of the above-indicated other tube over an angular range of at least 180° about the axis of the tube. Preferably, the support rollers are equiangularly spaced apart from each other over the full angular range of 360°. With these three or more support rollers held in rolling contact with the inner circumferential surface of the annular rail, the roller support structure is positioned coaxially with the annular rail and is rotatable relative to the annular rail. The support rollers and the annular rail may be arranged such that the support rollers engage the annular rail, so as to prevent a movement of the roller support structure relative to the annular rail in the axial direction of the annular rail. However, it is preferable to provide two sets of support rollers and corresponding to annular rails. The first set of at least three support rollers is attached to the roller support structure such that the support rollers are positioned radially outwardly of the roller support structure, while the second set of at least three support rollers is attached to one of the opposite axial end faces of the roller support structure. The first annular rail is disposed coaxially with and radially outwardly of the roller support structure, for engagement with the support rollers of the first set, while the second annular rail is disposed on one of the axially opposite sides of the roller support structure and is radially aligned with the roller support structure. In this preferred arrangement, the axial force applied to the roller support structure is received by the second set of support rollers and the corresponding second annular rail. Where the second set of support rollers and the second annular rails are arranged to engage with each other so as to prevent a radial movement of the roller support structure relative to the second annular rail, the first set of support rollers and the first annular rail may be eliminated.

The axial force applying device preferably includes a plurality of axially forcing rollers, which are desirably arranged in the circumferential direction of the above-indicated other tube in an equiangularly spaced-apart relation with each other. The roller support structure which support the two or more axially forcing rollers may be a one-piece annular member disposed in a radially opposed relation with the annular rail over the full 360° angular range. It is desirable, however, that the roller support structure consists of a plurality of roller support members each of which has a central angle of not larger than 180°. Where the annular rail also consists of a plurality of part-cylindrical rail members which are separable from each other when the corresponding portions of the frame structure are separated from each other, as described later, the roller support members as well as the rail members can be radially positioned relative to the above-indicated tube, when the corresponding portions of the frame structure is positioned. Each of the roller support members supports at least one axially forcing roller.

(26) An apparatus according to any one of the above forms (13)–(23), wherein the axial force applying device includes:

an axial force applying member fixed to one of the externally and internally threaded tubes such that the axial force applying member is coaxial with the one tube and is not movable relative to the one tube in an axial direction of the one tube; and an axial drive device disposed between the axial force applying device and the frame structure and operable to apply the axial force to the axial force applying member in at least one of opposite axial directions of the tubes, while permitting rotation of the axial force applying member relative to the frame structure.

For example, the axial drive device includes: a movable member supported by the frame structure such that the movable member is movable in the axial direction of the tubes; at least one axial force applying roller fixed to the movable member such that each axial force applying roller is rotatable relative to the movable member, for rolling contact with the axial force applying member, at a position on a circle concentric with the above-indicated one tube, when the axial force applying member is rotated with the above-indicated one tube; and an actuator connected to the frame structure and the movable member and operable to move the movable member to force each axial force applying against the axial force applying member in the axial direction of the one tube. The actuator may be a fluid-actuated cylinder. This arrangement permits the application of the axial force to the axial force applying member while the at least one axial force applying roller permits the axial force applying member to be rotated with the above-indicated one tube. The axial force applying member may be either independent of an annular chucking member for holding or chucking a drive member to the above-indicated one tube for rotating this tube, or a portion of that chucking member.

(27) An apparatus according to any one of the above forms (13)–(26), wherein the axial force applying device includes an impact force applying device for applying an impact force to the externally and internally threaded tubes as the axial force.

For instance, the impact force applying device includes: an axial force applying member fixed to one of the two tubes; an inertia mass disposed such that the inertia mass is movable relative the axial force applying member in an axial direction of the tubes; and an impact drive device operable to apply the impact force between the axial force applying member and the inertia mass, so as to move the inertia mass toward or away from the axial force applying member. In this arrangement, an operation of the impact drive device causes the impact force to be applied to the axial force applying member based on an inertial force of the inertia mass, so that the impact force is applied to the above-indicated one tube through the axial force applying member. Since the generation of the axial impact force does not require the inertia mass and the impact drive device to be supported by the frame structure of the apparatus, the inertia mass and the impact drive device may be supported by the axial force applying member. In this case, the inertia mass and the impact drive device are rotated with the axial force applying device.

(28) An apparatus according to any one of the above forms (23)–(27), wherein the rotary drive device includes a hydraulic cylinder, a chucking device for holding the other tube, and a motion converting device for converting a linear motion of the hydraulic cylinder into a rotary motion of the chucking device, the hydraulic cylinder being operated to rotate the chucking device for thereby rotating the other tube, and wherein the terminating condition determining device determines a desired final value of the wrenching torque on the basis of the physical quantity obtained by the physical quantity obtaining device, the apparatus further comprising a termination determining device for determining that the terminating condition is satisfied when the wrenching torque obtained on the basis of the hydraulic pressure has become equal to the desired final value.

In the tube connecting apparatus constructed according to the above form (28) of this invention wherein the above-indicated other tube is rotated by an operation of the hydraulic cylinder, the relatively large wrenching torque can be easily applied to the tube. The tube is rotated by the rotary motion of the chucking device which is obtained by conversion of the linear motion of the hydraulic cylinder by the motion converting device. This arrangement makes it difficult to obtain a large angle of rotation of the tube from a single linear motion of the hydraulic cylinder. To rotate the tube by a desired angle, it is usually required to repeatedly operate the hydraulic cylinder in the opposite directions while alternately placing the chucking device in the clamping and non-clamping positions. While the present rotary drive device can be used in the initial and intermediate phases of the wrenching operation, it is particularly suitable for rotating the tube in the final phase only.

For improved stability of application of a large wrenching torque to the tube and for fast clamping and unclamping of the tube by the chucking device, the chucking device is desirably a hydraulically operated device for holding the tube to be rotated. For instance, the hydraulically operated chucking device may include clamping members which are movable between an open position and a closed position in a diametric direction of the tube. In this case, the tube is clamped in the closed position of the clamping members, such that the tube is aligned with the center of the chucking device by a radial movement of the tube by the clamping members. However, this arrangement is not essential. The chucking device may include an annular chucking member in which the tube to be rotated is chucked at a suitable axial portion. In this case, the tube is moved in the axial direction so as to extend through the annular chucking member.

In the apparatus according to the above form (28), the hydraulic cylinder may be considered to serve as the rotary drive source, and the chucking device and the motion converting device may be considered to serve as a rotary drive force transmitting device.

(29) An apparatus according to any one of the above forms (23)–(28), wherein the rotary drive device includes a rotary motor for rotating the other tube, and the torque detecting device detects the wrenching torque on the basis of an operating state of the rotary motor.

The rotary drive device may include both the hydraulic cylinder provided in the apparatus according to the above form (28) and the rotary motor provided in the apparatus according to the above form (29), the tube can be rotated by the rotary motor in the initial and intermediate phases of the wrenching operation, and by the hydraulic cylinder in the final phase of the wrenching operation. The rotary motor may be either a hydraulic motor or an electric motor. In either case, the wrenching torque is detected on the operating state of the rotary motor in at least one of the initial and intermediate phases, and the desired final value of the wrenching torque is obtained on the basis of the detected wrenching torque.

Where the rotary drive device includes only the rotary motor and does not include the hydraulic cylinder, the rotary motor is preferably a hydraulic motor. In this case, the hydraulic motor is operated in the initial and intermediate phases at a relatively high speed to produce a relatively small torque, with a pressurized fluid delivered from a hydraulic pump whose delivery pressure is relatively low and whose delivery rate is relatively high, and in the final phase at a relatively low speed to produce a relatively large torque, with a pressurized fluid delivered from a hydraulic pump whose delivery pressure is relatively high and whose delivery rate is relatively low. This arrangement permits the single hydraulic motor to rotate the tube throughout the wrenching operation from the initial phase to the final phase. In this case, the wrenching torque can be detected on the basis of the hydraulic pressure at the hydraulic motor, and the desired final wrenching torque value can be obtained on the basis of the detected wrenching torque. Further, the apparatus may comprise a termination determining device which determines that the terminating condition is satisfied when the wrenching torque detected on the basis of the hydraulic pressure of the hydraulic motor has reached the desired value.

(30) An apparatus according to the above form (29), wherein the rotary motor is a hydraulic motor, and the torque detecting device includes a pressure detector for detecting a hydraulic pressure in the hydraulic motor.

(31) An apparatus according to any one of the above forms (13)–(30), wherein the physical quantity obtaining device includes an axial force detecting device which detects the axial force applied to the tubes by the axial force applying device, the physical quantity obtaining device estimating the coefficient of friction on the basis of the axial force detected by the axial force detecting device and the wrenching torque detected by the torque detecting device.

If the axial force applied by the axial force applying device is held constant at a known value, the axial force detecting device may be eliminated. However, the provision of the axial force detecting device permits the estimation of the friction coefficient on the basis of the axial force and the wrenching torque which are detected at the same point of time, so that the axial force need not be held constant, assuring an increased freedom in the control of the wrenching operation. It is noted that the use of the axial force detected by the axial force detecting device improves the accuracy of estimation of the friction coefficient, even where the applied axial force is held constant at a given value.

(32) An apparatus according to the above forms (13)–(31), wherein the torque detecting device includes a torsional torque detecting device for detecting a torsional torque applied to a rotary shaft in the rotary drive device.

(33) An apparatus according to any one of the above forms (13)–(32), wherein the rotary drive device includes:

a rotary drive source;

a clamping device for clamping one of the externally and internally threaded tubes to a frame structure such that the one tube is not rotatable relative to the frame structure;

a rotary motion transmitting device for transmitting a rotary motion of the rotary drive source to the other of the tubes; and a drive source holder device for holding the rotary drive source such that the rotary drive source is axially movable relative to the frame structure and is not rotatable about an axis thereof, and wherein the torque detecting device includes a reaction force detecting device which detects a reaction force which is applied to the drive source holder device as a result of rotation of the other tube.

The wrenching torque is represented by a product of the detected reaction force and a distance between the axis of the tubes and the reaction force detecting device.

(34) An apparatus according to any one of the above forms (13)–(31), wherein the rotary drive device includes an electric motor as a rotary drive source, and the torque detecting device detects the wrenching torque on the basis of an electric current flowing through the electric motor.

(35) An apparatus according to any one of the above forms (13)–(34), further comprising a frame structure consisting of a plurality of separate elements positioned radially outwardly of the tubes such that the elements are arranged in a circumferential direction of the tubes, and a fixing device for fixing the separate elements to each other such that the separate elements are butted together in planes parallel to an axis of the tubes, so as to surround portions of outer circumferential surfaces of the tubes.

The frame structure of the apparatus which surround the circumference of the tubes may be a one-piece structure. In this case, however, the tubes must be set into and removed from the apparatus by moving the tubes in the axial direction. These setting and removing operations involving the axial movements of the tubes are cumbersome and time-consuming. On the other hand, the frame structure consisting of the separate elements butted together in the above-indicated planes facilitates these operations, since the separate elements permits the tubes to be moved in the radial direction while the separate elements are not fixed to each other.

(36) An apparatus according to any one of the above forms (13)–(35), further comprising an intermediate phase detecting device for detecting at least one point of time in an intermediate phase of the wrenching operation.

(37) An apparatus according to the above form (36), wherein the intermediate phase detecting device detects the at least one point of time on the basis of the wrenching torque detected by the torque detecting device.

(38) An apparatus according to the above form (36) or (37), wherein the intermediate phase detecting device includes a device for detecting a moment of initiation of the intermediate phase depending upon a rapid change of a rate of change of the detected wrenching torque, which rapid change takes place upon transition of the wrenching operation from an initial phase to the intermediate phase.

Upon transition of the wrenching operation from the initial phase to the intermediate phase, there arises a rapid increase or a rapid decrease of the detected wrenching torque, depending upon the configurations and dimensions of the two tubes. In either case, the wrenching torque rapidly changes due to a change in the contacting surfaces of the two tubes.

(39) An apparatus according to any one of the above forms (36)–(38), wherein the intermediate phase detecting device includes:

torque memory means for storing values of the wrenching torque which are detected from time to time by the torque detecting device; and determining means for determining a moment of termination of the intermediate phase on the basis of the values of the wrenching torque stored in the torque memory means, after the detected wrenching torque has reached a predetermined value.

The moment of transition from the intermediate phase to the final phase, namely, the moment of termination of the intermediate phase can be detected on the basis of the detected values of the wrenching torque which are stored from time to time in the torque memory means. However, the desired final wrenching torque value corresponding to the desired tightening force of the tubes must have been determined before the actual tightening force has increased to the desired value. To this end, it is desirable to determine the moment of termination of the intermediate phase as early as possible. Accordingly, it is desirable that the predetermined value of the wrenching torque indicated above be as small as possible to the extend that permits the moment of the termination to be determined.

(40) An apparatus according to any one of the above forms (13)–(39), further comprising a final phase detecting device which detects a final phase of the wrenching operation in which at least one of an axial tightening force and a radial tightening force is generated between the externally and internally threaded portions of the tubes.

As described above, the final phase directly follows the initial phase, or alternatively the final phase follows the intermediate phase which follows the initial phase. In either case, the transition to the final phase can be detected on the basis of a change in the rate of change of the detected wrenching torque, or on the basis of the detected wrenching torque values. For instance, the transition torque value corresponding to the moment of transition to the final phase is obtained on the basis of the physical quantity relating to the friction coefficient, which quantity is obtained in the initial or intermediate phase. The moment of the transition is detected when the actual wrenching torque has reached the transition torque value.

(41) An apparatus according to any one of the above forms (13)–(40), wherein the terminating condition determining device determines a desired final value of the wrenching torque on the basis of the physical quantity obtained by the physical quantity obtaining device, the apparatus further comprising:

a termination determining device for determining that the terminating condition is satisfied when the actual value of the wrenching torque has become equal to the desired final value.

(42) An apparatus according to any one of the above forms (13)–(41), further comprising a thread engagement abnormality detecting device which detects an abnormality associated with mutual meshing engagement of the externally and internally threaded portions of the tubes, on the basis of an initial value of the wrenching torque detected by the torque detecting device in an initial phase of the wrenching operation.

The wrenching torque value in the initial phase of the wrenching operation becomes abnormally large if there arises an abnormality associated with mutual engagement of the externally and internally threaded portions of the tubes, such as the presence of foreign matters between the contacting thread surfaces, or abnormal meshing engagement of the thread surfaces. For example, the thread engagement abnormality detecting device includes tolerable range setting means for setting a tolerable range of the initial wrenching torque value, on the basis of appropriate data such as the nominal pitch diameter and lead of the threads, and abnormality judging means for determining that there exists an abnormality associated with the mutual meshing engagement of the externally and internally threaded portions of the tubes, if the detected initial wrenching torque value is outside the tolerable range. This arrangement permits early detection of the abnormality. The apparatus may further comprise emergency stop means for turning off the rotary drive device when the abnormality judging means detects the presence of an abnormality associated with the thread engagement. This emergency stop means is effective to prevent undesirable continuation of the wrenching operation in the presence of the thread engagement abnormality.

(43) An apparatus according to any one of the above forms (13)–(42), wherein the physical quantity obtaining device and the terminating condition determining device comprise a computer connected to at least the torque detecting device.

(44) A computer-readable recording medium storing a wrenching torque control program to be executed for performing a wrenching operation to fixedly connect together an externally threaded tube having an externally threaded portion and an internally threaded tube having an internally threaded portion, the wrenching control program comprising the steps of:

obtaining a physical quantity relating to a coefficient of friction between the externally and internally threaded tubes, on the basis of a wrenching torque and an axial force being applied to the tubes while the tubes are rotated relative to each other by the wrenching torque, with the externally and internally threaded portions engaging each other while the axial force is applied so as to act between the tubes; and determining a terminating condition for terminating the wrenching operation, on the basis of the obtained physical quantity.

The tube connecting apparatus constructed according to the above form (13) of this invention may be equipped with a computer adapted to read and execute the wrenching control program stored in the recording medium according to the above form (44). This tube connecting apparatus is capable of practicing the tube connecting method according to the above form (1) of the invention. The wrenching control program may be formulated to practice any one of the technical features according to the above forms (2)–(11).

(45) A method of fixedly connecting together an externally threaded member and an internally threaded member by tight engagement of an externally threaded portion of the externally threaded member and an internally threaded portion of the internally threaded member, comprising the steps of:

performing a wrenching operation in which the externally and internally threaded members are rotated relative to each other with the externally and internally threaded portions engaging each other while an axial force is applied so as to act between the members;

detecting a wrenching torque being applied to rotate the members relative to each other;

obtaining a physical quantity relating to a coefficient of friction between the members, on the basis of the detected wrenching torque and the axial force;

determining a terminating condition for terminating the wrenching operation, on the basis of the obtained physical quantity; and terminating the wrenching operation when the terminating condition has been satisfied.

The externally and internally threaded members may be substantially solid shaft members. Although the primary object of the present invention is to provide an improvement in the field of connecting threaded tubes, the principle of the invention is also applicable to the connection of threaded members other than threaded tubes or pipes. The method according to the above form (45) includes any one of the technical features according to the above forms (2)–(11). The tube connecting apparatus according to the above form (13) may be used as an apparatus for fixedly connecting externally and internally threaded members. This apparatus may include any one of the technical features according to the above forms (14)–(34).

BRIEF DESCRIPTION OF THE DRAWINGS

The above and optional objects, features, advantages and technical and industrial significance of this invention will be better understood and appreciated by reading the following detailed description of presently preferred embodiments of the invention, when considered in connection with the accompanying drawings, in which:

FIGS. 15A and 15B are views showing the two threaded tubes fixedly connected together by the tube connecting apparatus;

FIGS. 16A and 16B are views showing another set of two threaded tubes fixedly connected together by the tube connecting apparatus;

DETAILED DESCRIPTION OF THE PREFERRED EMBODIMENTS

Figure 1:
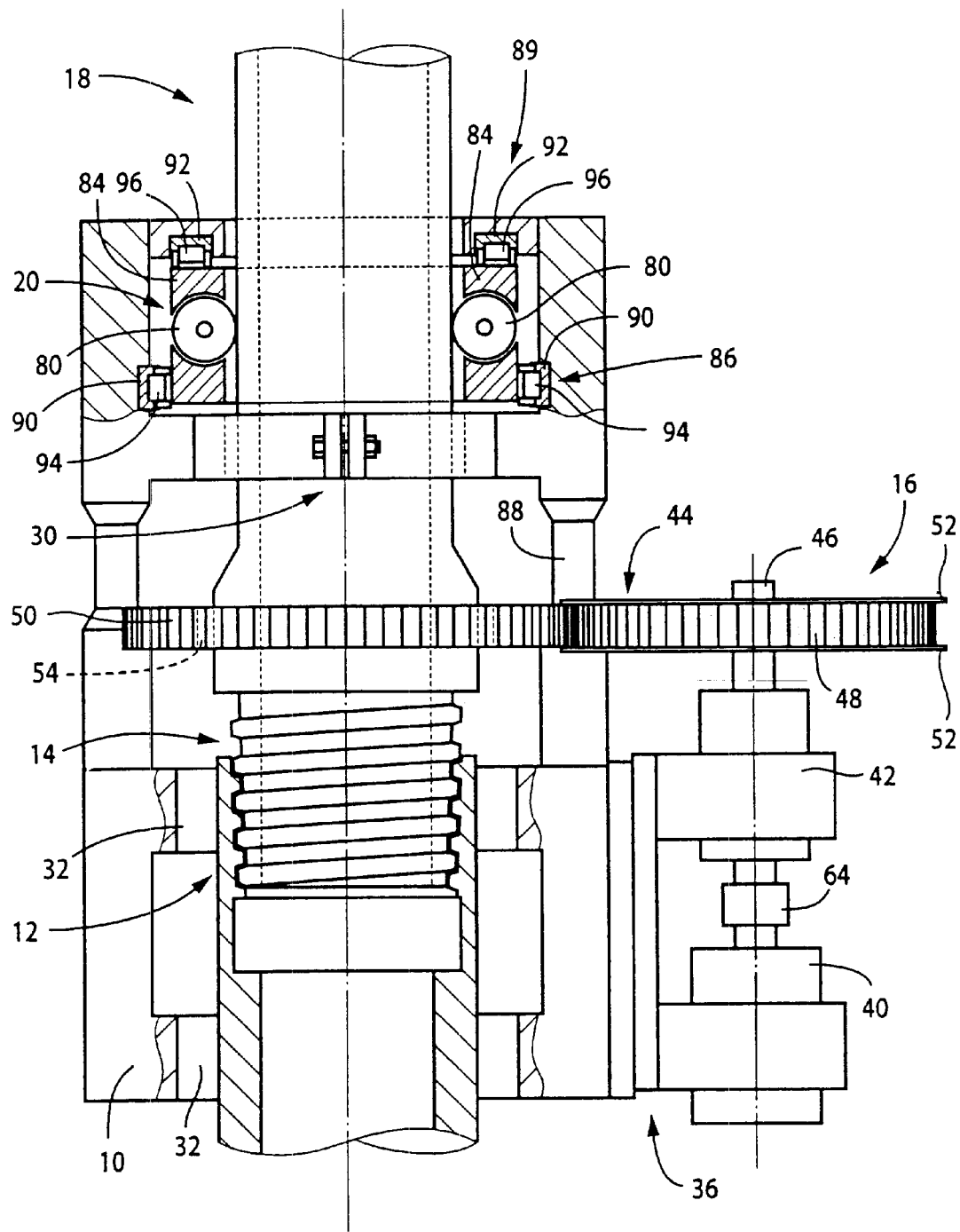
FIG. 1 is a front elevational view partly in cross section of a tube connecting apparatus constructed according to one embodiment of the present invention.

Referring first to FIG. 1, there is shown a tube connecting apparatus constructed according to one embodiment of this invention for practicing a method of fixedly connecting an externally threaded tube and an internally threaded tube. A tube assembly obtained by fixedly connecting these two threaded tubes can be suitably used as a tube for supporting an earth drilling tool for drilling or boring the earth in oil fields, and a fluid transporting tube used for transporting oils, and other fluids. The tube connecting apparatus includes a frame structure 10, a clamping device 12 for holding an internally threaded tube 14 in the frame structure 10 such that the tube 14 is neither rotatable nor axially movable relative to the frame structure 10, a rotary drive device 16 for rotating an externally threaded tube 18, and an axial force applying device 20 for applying an axial force to the externally threaded tube 16.

The frame structure consists of two halves which are normally butted together at their corresponding ends in a plane parallel to the axes of the threaded tubes 14, 18, and are separable from each other. The two halves are hinged at one of the opposite ends of each half such that the two halves are pivotable relative to each other, and are connectable to each other at the other of the opposite ends of each half, through a plurality of lock mechanisms 30 arranged in the axial direction of the tubes 14, 18. In FIG. 1, only one of the clamps 30 is shown.

The clamping device 12 includes at least one chuck 32 for holding the internally threaded tube 14. Each chuck 32 includes two halves which are movable together with the two halves of the frame structure 10. With the two halves of the frame structure 10 being clamped together by the lock mechanisms 30, the internally threaded tube 14 is held at its outer circumferential surface by the two halves of each chuck 32, the inner circumferential surface of which has a lining of a frictional material for frictional engagement with the outer circumferential surface of the tube 14. Where a plurality of chucks 32 are provided such that the chucks 32 are spaced apart from each other in the axial direction of the tube 14, the tube 14 can be accurately held in position by the chucks 32, so as to extend in the vertical direction.

The rotary drive device 16 is attached to the frame structure 10 through a linear guide device 36 such that the rotary drive device 16 is axially movable but is not rotatable relative to the frame structure 10. The linear guide device 36 includes guide rails fixed to the frame structure 10, and a carriage carrying the rotary drive device 16 fixed thereto. The guide rails are formed so as to extend in the axial direction of the rotary drive device 16, and the carriage are slidable on the guide rails, together with the rotary drive device 16, in the axial direction of the rotary drive device 16. The rotary drive device 16 includes a rotary drive source in the form of a rotary drive electric motor 40, a torque detecting device 42 and a rotary motion transmitting device 44.

The rotary motion transmitting device 44 is provided for transmitting a rotary motion of the rotary drive electric motor 40 to the externally threaded tube 18. This device 44 includes a drive gear 48 fixed to an output shaft 46 of the electric motor 40, and a driven gear fixed to the externally threaded tube 18. The driven gear 50 is fixed to the externally threaded tube 18 by a chucking device 54. In the present embodiment, the driven gear 50 is fixed to the chucking device 54. The drive gear 48 has collars 52 at its opposite axial ends. The drive and driven gears 48, 50 are adapted to mesh with each other such that the axial dimension of the driven gear 50 is located between the two collars 52, 52, so that the weight of the rotary device 16 is supported by the externally threaded tube 18 through the meshing drive and driven gears 48, 50.

Figure 2A:
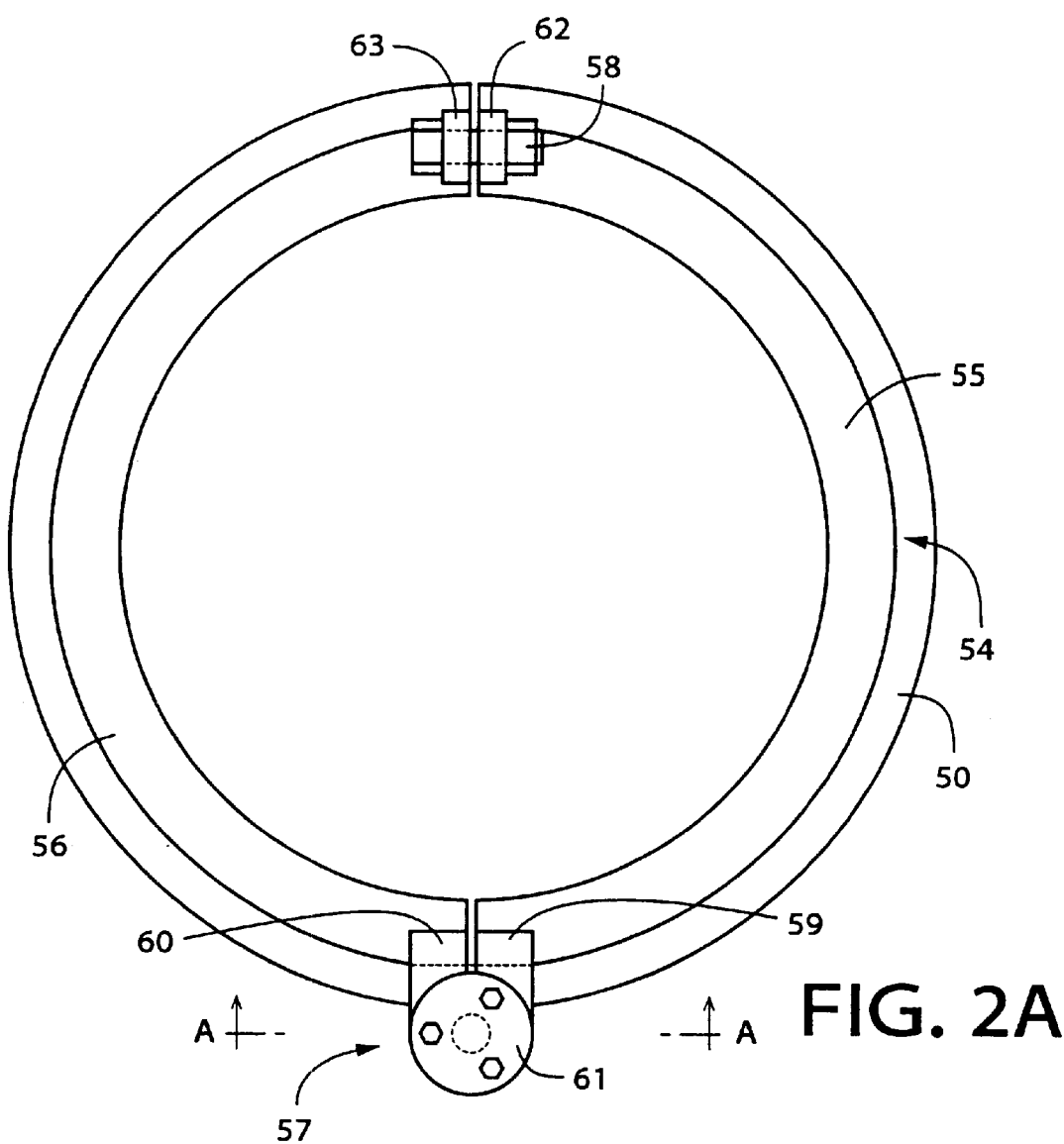
FIG. 2A is a plan view of a wrenching device for rotating an externally threaded tube relative to an internally threaded tube, in the tube connecting apparatus of FIG. 1.

The chucking device 54, which is generally annular, includes two semi-cylindrical halves 55, 56, a pivotal connector 57, and a connecting screw 58, as shown in FIG. 2A. The driven gear 50 consists of two semi-circular halves corresponding to the semi-cylindrical halves 55, 56 of the chucking device 54. The two semi-cylindrical halves 55, 56 are normally butted together in a plane including the axis of the annular chucking device 54, such that the two halves 55, 56 cooperate to define an annular clamping member. The two halves 55, 56 are pivotally connected by the pivotal connector 57 at one of the opposite ends of each half 55, 56, and are connectable to each other by the connecting screw 58 at the other of the opposite ends of each half 55, 56, such that the corresponding ends of the two halves 55, 56 are movable in a direction tangent to the annulus of the annular clamping member indicated above. With the two halves 55, 56 are connected to each other by the connecting screw 58, the driven gear 50 is fixed to the externally threaded tube 18.

Figure 2B:
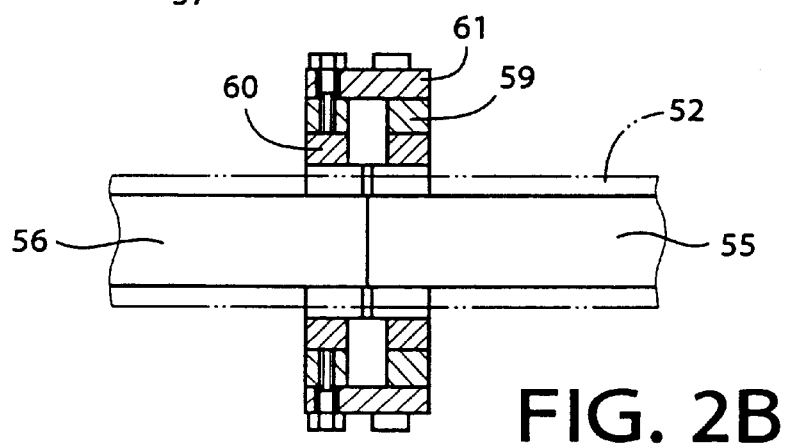
FIG. 2B is a cross sectional view taken along line 2A—2A of FIG. 2A.

The semi-cylindrical halves 55, 56 have respective engaging portions 59, 60 at the corresponding ends. These engaging portions 59, 60 are supported by a connecting pin 61 such that the two halves 55, 56 are pivotable relative to each other about the centerline of the pin 61 which is parallel to the axis of the annular chucking device 54. The engaging portions 59, 60 and the connecting pin 61 cooperate to provide the pivotal connector 57 on each of the axially opposite ends of the semi-cylindrical halves 55, 56. As shown in FIGS. 2A and 2B, each of the engaging portions 59, 60 extend in the axially and radially outward directions. The two engaging portions 59, 60 at each axial end of the semi-cylindrical halves 55, 56 are superposed on each other in the axial direction, as shown in FIG. 2B. The pivotal connector 57, which permits a pivotal movement of the two semi-cylindrical halves 55, 56 of the chucking device 54 at the corresponding ends, facilitates attachment and removal of the driven gear 50 to and from the externally threaded tube 18. The amount of axially outward extension of the engaging portions 59, 60 from the upper and lower end faces of the semi-cylindrical halves 55, 56 is determined so as not to interfere with the collars 52 of the drive gear 48 indicated above.

The connecting screw 58 is provided for connecting together nut portions 62, 63 each provided at the other of the opposite ends of each semi-cylindrical half 55, 56 such that the nut portions 62, 63 extend in the axial direction from the axial end faces of the semi-cylindrical halves 55, 56. Like the pivotal connectors 57, the connecting screw 58 and the nut portions 62, 63 are provided at the axially opposite ends of the semi-cylindrical halves 55, 56. The connecting screw 61 and the nut portions 62, 63 cooperate to function as a locking portion of the chucking device 54 at which the chucking device 54 is locked for holding the tube 18.

Figure 3:
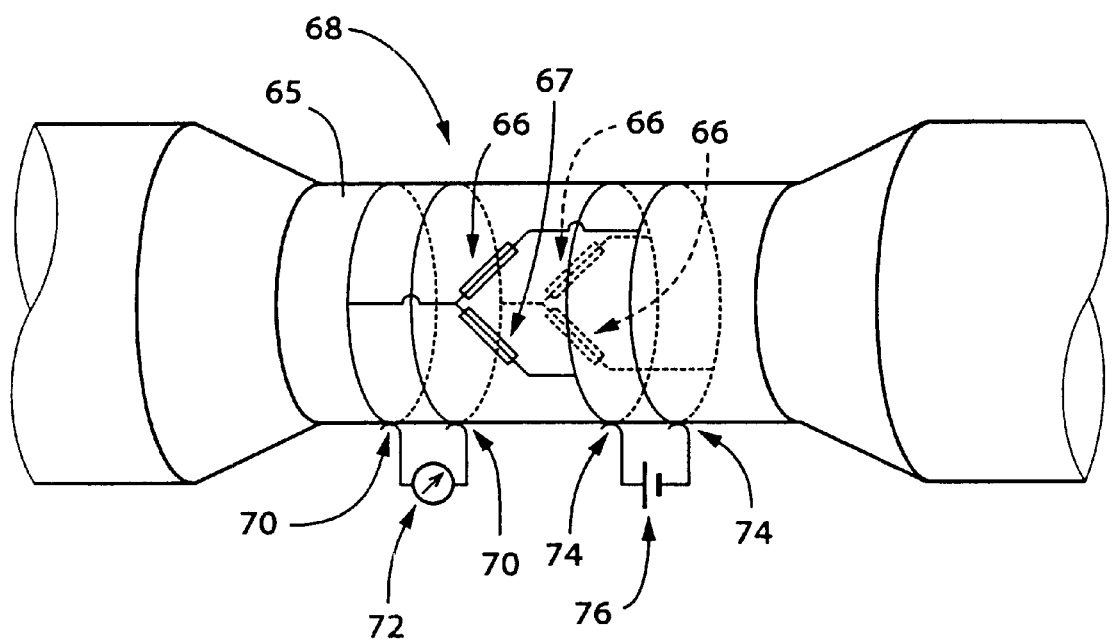
FIG. 3 is a view schematically illustrating a torque detecting portion of the tube connecting apparatus.

The torque detecting device 42 is attached to the output shaft 46 through a coupling 64, as shown in FIG. 1. The torque detecting device 42 includes a detector shaft 65 having four strain gages 66 bonded on its outer circumferential surface, such that the two strain gages 66 are inclined at an angle of +45° with respect to the axis of the detector shaft 64, while the other two strain gages 66 are inclined at an angle of −45° with respect to the axis, as shown in FIG. 3. The four strain gages 66 form a bridge circuit 68 which is connected to a voltage detector circuit 72 through a slip ring 70, and to a DC power source 76 through another slip ring 74. A voltage proportional to a torsion strain of the detector shaft 65 is detected by the voltage detector circuit 72.

The axial force applying device 20 includes: a plurality of axially forcing rollers 80; a plurality of roller drive electric motors 82 (FIG. 4) disposed coaxially with the rollers 80; a plurality of roller support members 84 for rotatably holding the respective rollers 80 and the respective electric motors 82; a holder device 86 for holding the roller support members 84 such that each roller support member 84 is neither axially movable nor radially movable relative to the frame structure 10, and is rotatable about the axis of the internally and externally threaded tubes 14, 18 (movable in the circumferential direction of the threaded tubes 14, 18); and an axial force detecting device 88 for detecting an axial force acting on the externally threaded tube 18. Each roller drive electric motor 82 is energized through a slip ring (not shown) with an electric current supplied from a power source (not shown). In the present embodiment, the roller support members 84 constitute a roller support structure 89.

Each of the axially forcing rollers 80 is a generally concave globoidal member, and is adapted to effect a surface contact with the outer circumferential surface of the externally threaded tube 18. With the axially forcing rollers 80 rotated in the opposite directions by the electric motor 82, a compressive force and a tensile force are applied to the externally threaded tube 18 in the respective opposite axial directions. In the present embodiment, the rollers 80 are rotated to apply the axial compressive force to the externally threaded tube 18, so as to force the externally and internally threaded tubes 18, 14 toward each other.

The holder device 86 includes two annular rails 90, 92 fixed to the two halves of the frame structure 10, and support rollers 94, 96 supported by the roller support members 84 such that the support rollers 94, 96 are rotatable relative to the roller support members 84. The support rollers 94, 96 engage the annular rails 90, 92, respectively, so that the roller support members 84 are supported by the frame structure 10 such that the roller support members 84 are movable in the circumferential direction of the externally threaded tube 18, so as to permit rotation of this tube 18 together with the roller support members 84.

The annular rail 90 is provided radially outwardly of the roller support structure 89, while the annular rail 92 is provided above the roller support structure 89. The support rollers 94 are attached to the outer circumferential surface of each roller support member 84 at its four circumferential positions which are spaced apart from each other in the circumferential direction. Similarly, the support rollers 94 are attached to the upper end face of each roller support member 84 at its four circumferential positions which are spaced apart from each other in the circumferential direction. In this arrangement, each roller support member 84 is supported by the holder device 86 so as to prevent the axial and radial movements of the roller support member 84 relative to the frame structure 10, and to prevent a radial movement of the corresponding axially forcing roller 80 away from the externally threaded tube 18.

In the present embodiment, the four roller support members 84 are provided, and each of these roller support members 84 supports the corresponding axially forcing roller 80 and the corresponding set of support rollers 94, 96 (consisting of a plurality of rollers 94 and a plurality of rollers 96). Thus, the externally threaded tube 18 is axially forced by the four axially forcing rollers 80 supported by the respective four roller support members 84, so that the axial force is applied to the externally threaded tube 18 more evenly at different circumferential positions of the tube 18, than where the tube 18 is axially forced by a single axially forcing roller. The circumferential dimension of each roller support member 84 as viewed in the circumferential direction of the annular rails 90, 92 corresponds to a central angle of not greater than 90°, for instance, about 60°, so that the four roller support members 84 are movable in the above-indicated circumferential direction, independently of each other, with their support rollers 94, 96 engaging the same annular rails 90, 92.

The axial force detecting device 88 includes a detector shaft (not shown) and four strain gages (not shown) bonded to the circumferential surface of the detector shaft, for detecting an axial force acting on the detector shaft. The two of these strain gages extend in the axial direction of the detector shaft, while the other two strain gages extend in the circumferential direction.

Figure 4:
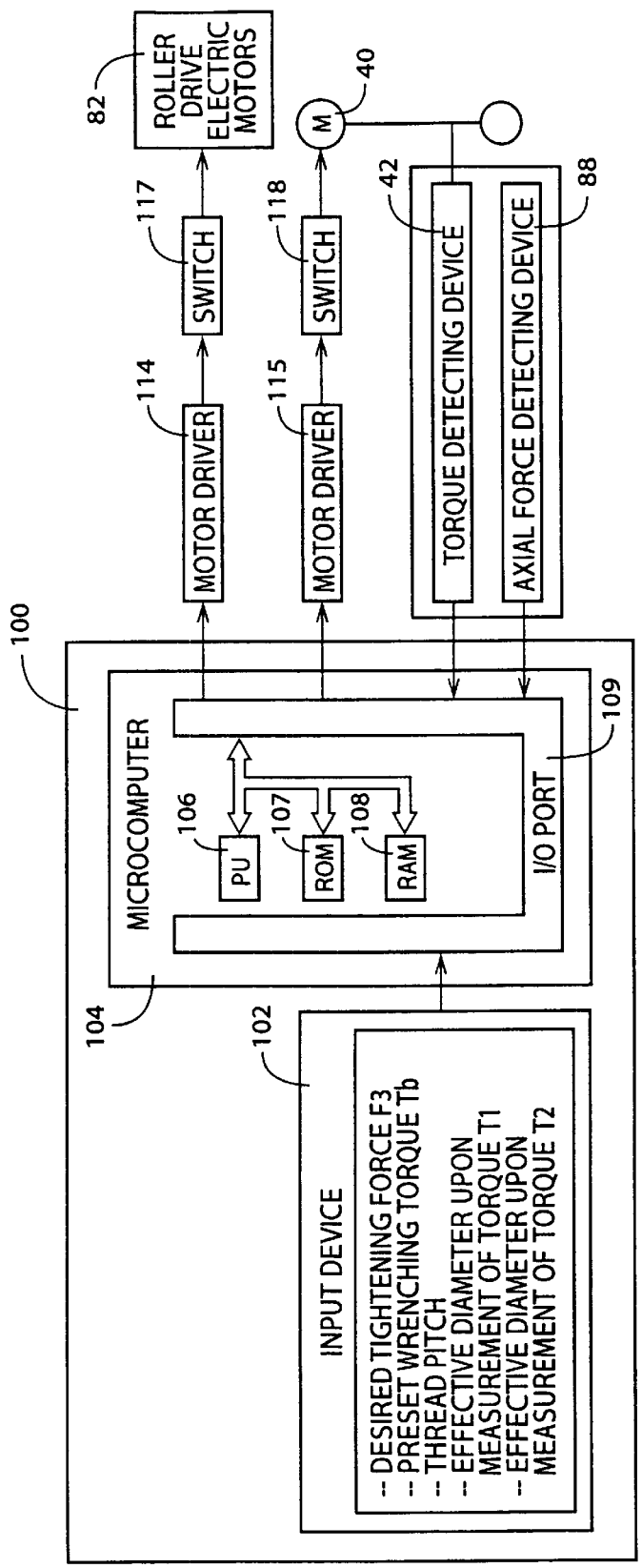
FIG. 4 is a block diagram showing a control device in the tube connecting apparatus.

Referring next to the block diagram of FIG. 4, there is schematically shown a control device 100 for the present tube connecting apparatus. The control device 100 includes an input device 102, and a processing device in the form of a microcomputer 104, which incorporates a processing unit (PU) 106, a read-only memory (ROM) 107, a random-access memory (RAM) 108 and an I/O port 109. The ROM 107 stores various control programs such as a wrenching torque control program illustrated in the flow chart of FIG. 5. The PU 106 operates to execute these control programs, while utilizing a temporary data storage function of the RAM 108, for controlling a wrenching operation with automatic control of a wrenching torque applied from the rotary drive device 16 to the externally threaded tube 18. To the I/O port 109, there are connected a motor driver 114, a motor driver 115, the torque detecting device 42 and the axial force detecting device 88 as well as the input device 102. The rotary drive electric motor 40 and the roller drive electric motors 82 are connected to the I/O port 108 through the motor drivers 114, 115, and respective switches 117, 118. The switches 117, 118 are controlled by the motor drivers 114, 115, to thereby control the electric motors 40, 82.

There will be described the wrenching operation or tube connecting operation performed by the present tube connecting apparatus constructed as described above, to fixedly connect the internally and externally threaded tubes 14, 18. Initially, the tubes 14, 18 are set up in the tube connecting apparatus. To this end, the two halves of the frame structure 10 are pivotally opened, and as a result the two halves of the clamping device 12 and the two halves of the annular rails 90, 92 are opened or separated from each other. Then, the internally threaded tube 14 and the externally threaded tube 18 are set in position in the frame structure 10, and the driven gear 50 is fixed to the externally threaded tube 18 by the chucking device 54. The rotary drive device 16 including the electric motor 40 is axially moved to an axial position at which the drive gear 48 can mesh with the driven gear 50, and the two halves of the frame structure 10 are then pivotally closed. As a result, the annular rails 90, 92 are formed so that the roller support structure 89 is movable in the circumferential direction of the externally threaded tube 18 relative to the frame structure 10. Further, the internally threaded tube 14 is clamped in place by the clamping device 12.

Before the wrenching operation is initiated, various items of data necessary for the wrenching operation are stored into the RAM 10 of the microcomputer 104 of the control device 100, through the input device 102, by manipulation of the input device 102 by the operator of the apparatus, or under the control of a host computer. These items of data include a desired tightening force F3, a preset wrenching torque value Tb, a nominal pitch diameter of the tubes 14, 18, a thread pitch of the tubes 14, 18, and relative rotary positions corresponding to an initial wrenching torque and an intermediate wrenching torque. By pressing a start switch after the setup is completed, the wrenching operation will be performed by the tube connecting apparatus.

Figure 6:
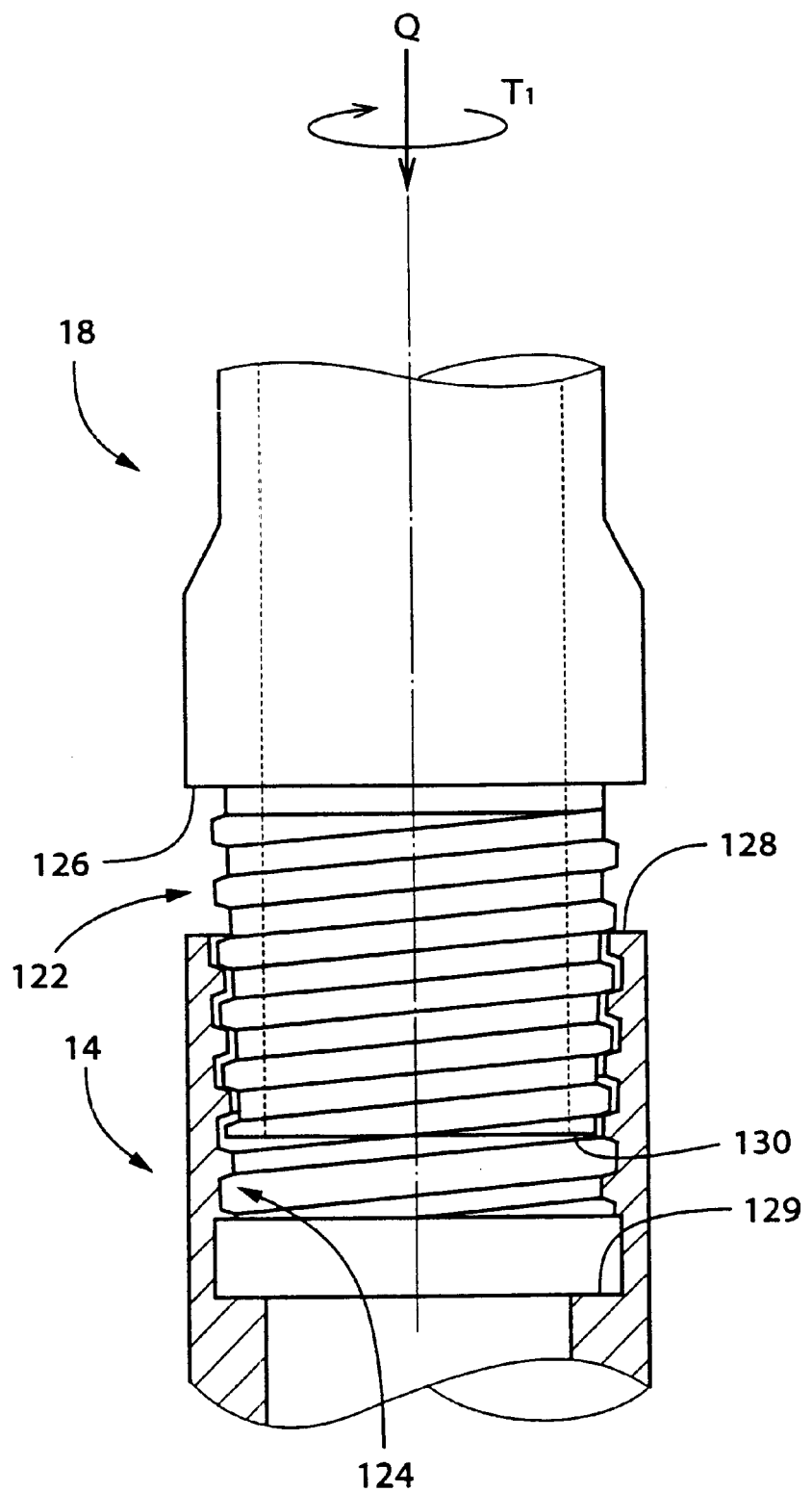
FIG. 6 is a view showing an initial phase of a wrenching operation performed on the threaded tube by the tube connecting apparatus.

There will next be described the configurations of the internally and externally threaded tubes 14, 18. As shown in FIG. 6, the externally threaded tube 18 includes an externally threaded portion 122, while the internally threaded tube 14 includes an internally threaded portion 124. Each of these externally and internally threaded portions 122, 124 has a tapered trapezoidal thread. The externally threaded tube 18 has a shoulder surface 126 at the axially inner or proximal end of the externally threaded portion 122, and the internally threaded tube 14 has a shoulder surface in the form of an end face 128 at the axially outer or distal end of the internally threaded portion 124. The two threaded tubes 18, 14 are fixedly connected together with the shoulder surface 126 held in contact with the shoulder surface 128. As shown in FIG. 6, the internally threaded tube 14 further has a shoulder surface 129 at the axially inner or proximal end of the internally threaded portion 124, while the externally threaded tube 18 further has a shoulder surface in the form of an end face 130 at the axially outer or distal end of the externally threaded portion 122. However, these shoulder surfaces 129, 130 are not held in contact with each other when the two tubes 14, 18 are placed in the fixedly connected state.

In the fixedly connected state of the two tubes 14, 18, the shoulder surfaces 126, 128 are held in contact with each other while the externally and internally threaded portions 122, 124 are held in meshing engagement with each other, such that both the contacting shoulder surfaces 126, 128 and the contacting thread surfaces of the threaded portions 122, 124 produce an axial tightening force for fastening together the two tubes 14, 18. A tube assembly to be obtained from the thus fixedly connected two tubes 14, 18 can be suitably used as a tube for supporting tools that are adapted to drill or bore the earth in the oil fields, for instance.

Figure 5:
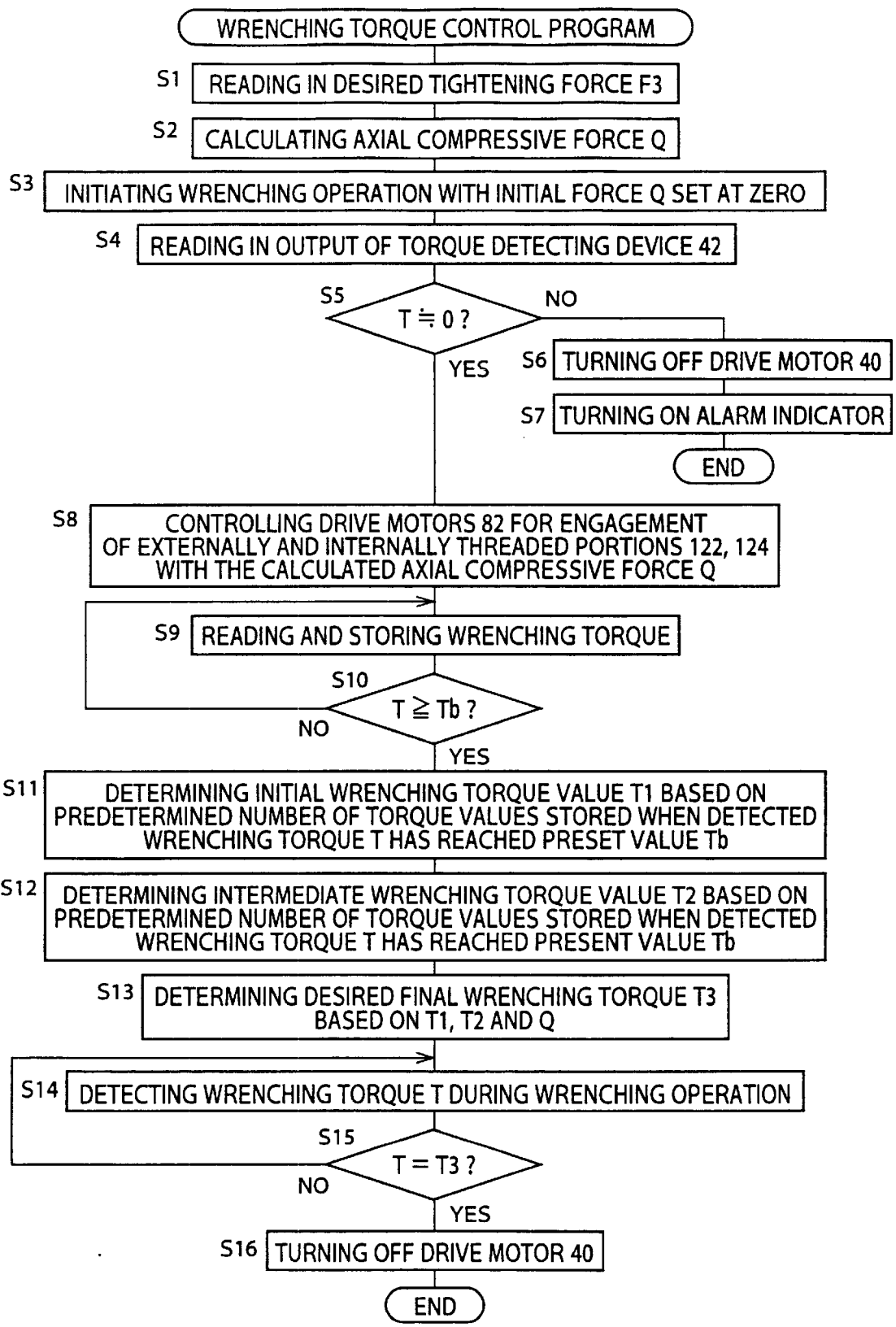
FIG. 5 is a flow chart illustrating a part of a wrenching torque control program stored in a ROM of the control device of FIG. 4.
Figure 13:
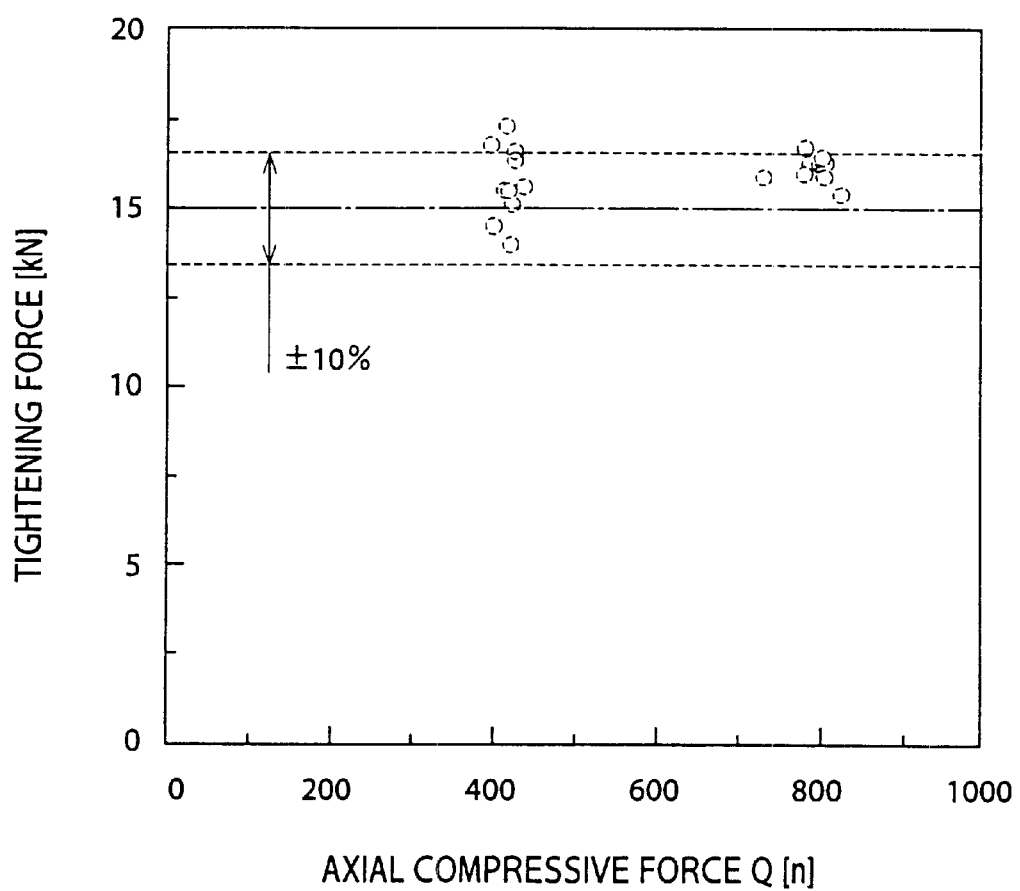
FIG. 13 is a view indicating a relationship between an axial compressive force and a tightening force when the threaded tubes are fixed connected together by the tube connecting apparatus.

To perform the wrenching operation to fixedly connect the internally and externally threaded tubes 14, 18, the wrenching torque control program illustrated in the flow chart of FIG. 5 is executed by the microcomputer 104 of the control device 100. Initially, step S1 is implemented to read the desired tightening force F3 from the RAM 108. The control flow then goes to step S2 to calculate an axial compressive force Q to be applied to the externally threaded tube 18, depending upon the nominal pitch diameter d of the threaded portions 122, 124. From the standpoint of accuracy of estimation of the coefficients of friction between the contacting shoulder surfaces 126, 128 and between the contacting thread surfaces of the threaded portions 122, 124, it is preferable to determine the axial compressive force Q in proportion to the desired tightening force F3. Since the desired tightening force F3 increases with an increase in the nominal pitch diameter d, it is preferable to increase the axial compressive force Q with an increase in the nominal pitch diameter d. In the present embodiment, the axial compressive force Q is determined so as to correspond to a value selected within a range of 3–30% of the desired tightening force F3. The graph of FIG. 13 indicates that the actual tightening force has a smaller amount of variation when the axial compressive force Q is determined to be 800N than when it is determined to be 400N. It is noted that the data shown in FIG. 13 were obtained for externally and internally threaded tubes whose diameters of the threaded portions are ¼ of the diameters of the threaded portions 122, 124 of the actual tubes 18, 14. Then, the control flow goes to step S3 wherein the wrenching operation is initiated with the initial axial compressive force Q set at zero. Described more specifically, the rotary drive electric motor 40 and the roller drive electric motors 82 are operated in synchronization with each other, such that the externally threaded tube 18 is axially fed at a rate determined by the rotating speed of the tube 18 and the thread pitch of the threaded portions 122, 124.

When a predetermined time has passed after the initiation of the wrenching operation, step S4 is implemented to read in the output signal of the torque detecting device 42. Step S4 is followed by step S5 to determine whether the actual wrenching torque T represented by the output signal of the torque detecting device 42 is substantially zero. If a negative decision (NO) is obtained in step S5, the control flow goes to step S6 to turn off the rotary drive electric motor 40, and to step S7 to activate an alarm indicator such as a buzzer, for informing the operator of the apparatus that the wrenching operation is abnormal.

Figure 7:
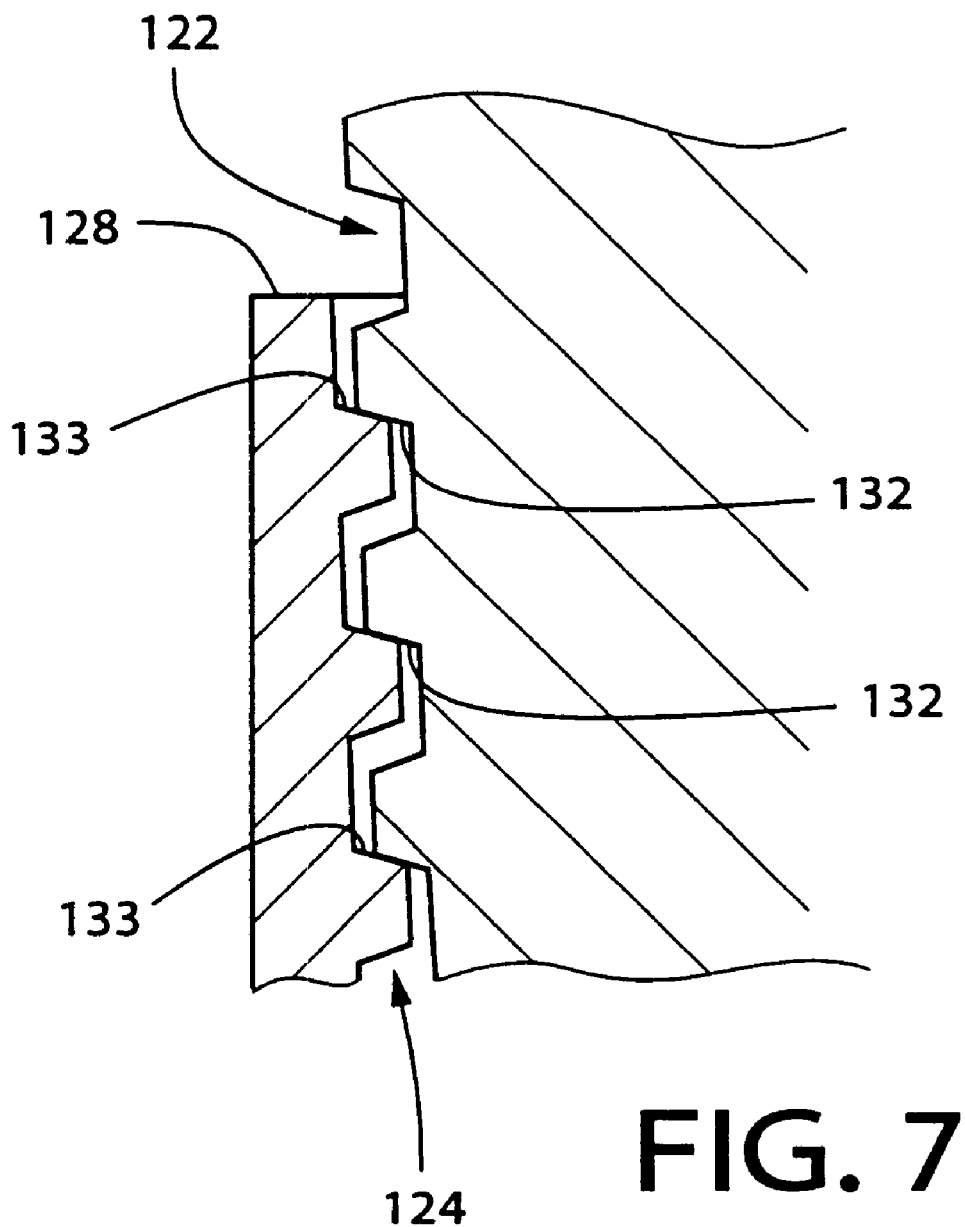
FIG. 7 is an enlarged fragmentary view of the threaded tubes in the initial phase of FIG. 8.

If an affirmative decision (YES) is obtained in step S5, the control flow goes to step S8 wherein the switch 117 is controlled to control the roller drive electric motors 82, for engagement of the externally and internally threaded portions 122, 124 with each other, such that the axial compressive force Q calculated in step S2 acts on the externally threaded tube 18. In this condition in which the threaded portions 122, 124 are placed in meshing engagement with each other, the shoulder surfaces 126 and 128 are spaced apart from each other in the axial direction, as indicated in FIGS. 6 and 7. The threaded portions 122, 124 are shown in detail in the enlarged fragmentary view of FIG. 7. As shown in FIG. 7, a leading frank 132 of the externally threaded portion 122 is in contact with a leading flank 133 of the internally threaded portion 124. In this condition, the wrenching operation is in an initial phase.

Figure 12:
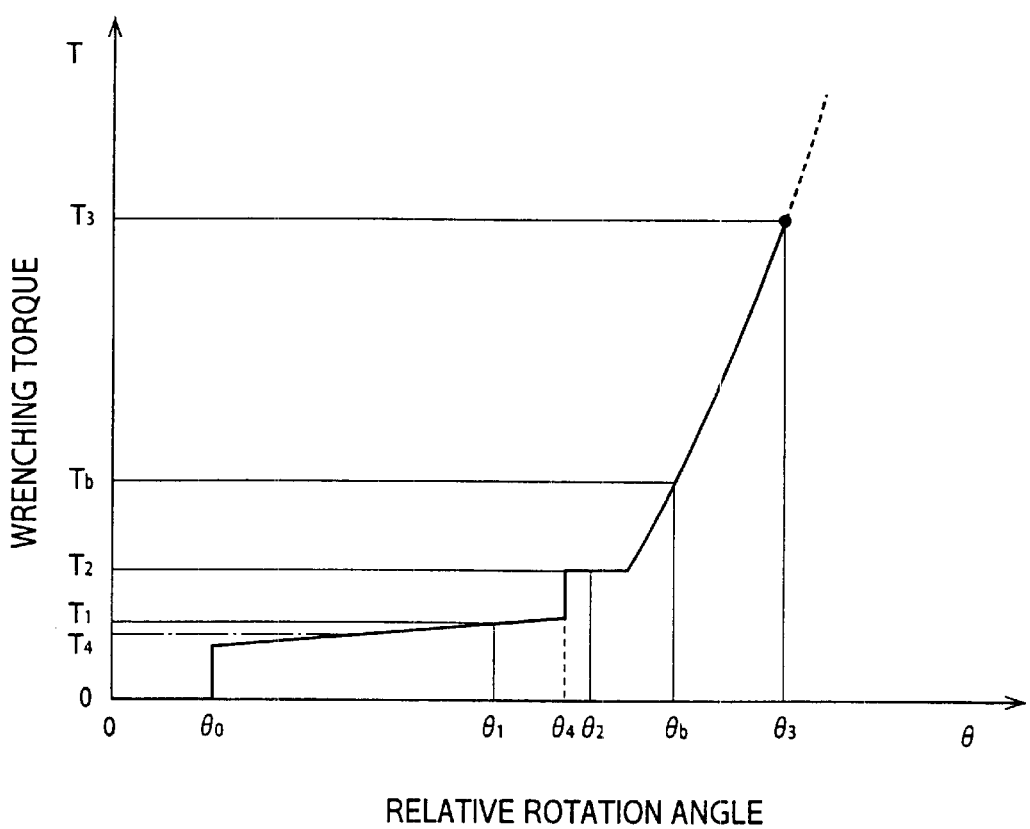
FIG. 12 is a graph indicating a change in a wrenching torque in the tube connecting apparatus.

Step S9 is followed by step S10 to determine whether the detected wrenching torque T has been increased to or exceeded a preset value Tb. If a negative decision (NO) is obtained in step S10, the control flow goes back to step S9. Steps S9 and S10 are repeatedly implemented at a predetermined short time interval, until an affirmative decision (YES) is obtained in step S10, that is, until the actual wrenching torque T detected by the torque detecting device 42 has reached or exceeded the preset value Tb. When the affirmative decision (YES) is obtained in step S10, the control flow goes to steps S11 and S12 to determine an initial wrenching torque value T1 and an intermediate wrenching torque value T2, on the basis of respective predetermined numbers of torque values stored in the RAM 108, which numbers are counted from the last torque value which is equal to or slightly larger than the preset value Tb and which was stored last in step S9 immediately before the affirmative decision (YES) is obtained in step S10. These predetermined numbers are determined prior to the wrenching operation. That is, those numbers corresponding to the respective initial and intermediate wrenching torque values T1 and T2 are determined on the basis of the respective angles $\theta 1$ and $\theta 2$ of relative rotation of the threaded tubes 14, 18, as indicated in the graph of FIG. 12. Those angles $\theta 1$ and $\theta 2$ are estimated to correspond to the respective torque values T1 and T2, depending upon the specifications of the threaded portions 122, 124. To determine the numbers of the stored torque values corresponding to the torque values T1, T2, an experiment is conducted to detect wrenching torque values as the relative rotation angle is increased, and the above-indicated numbers are determined based on the detected torque values corresponding to the angles $\theta 1$ and $\theta 2$.

Figure 8:
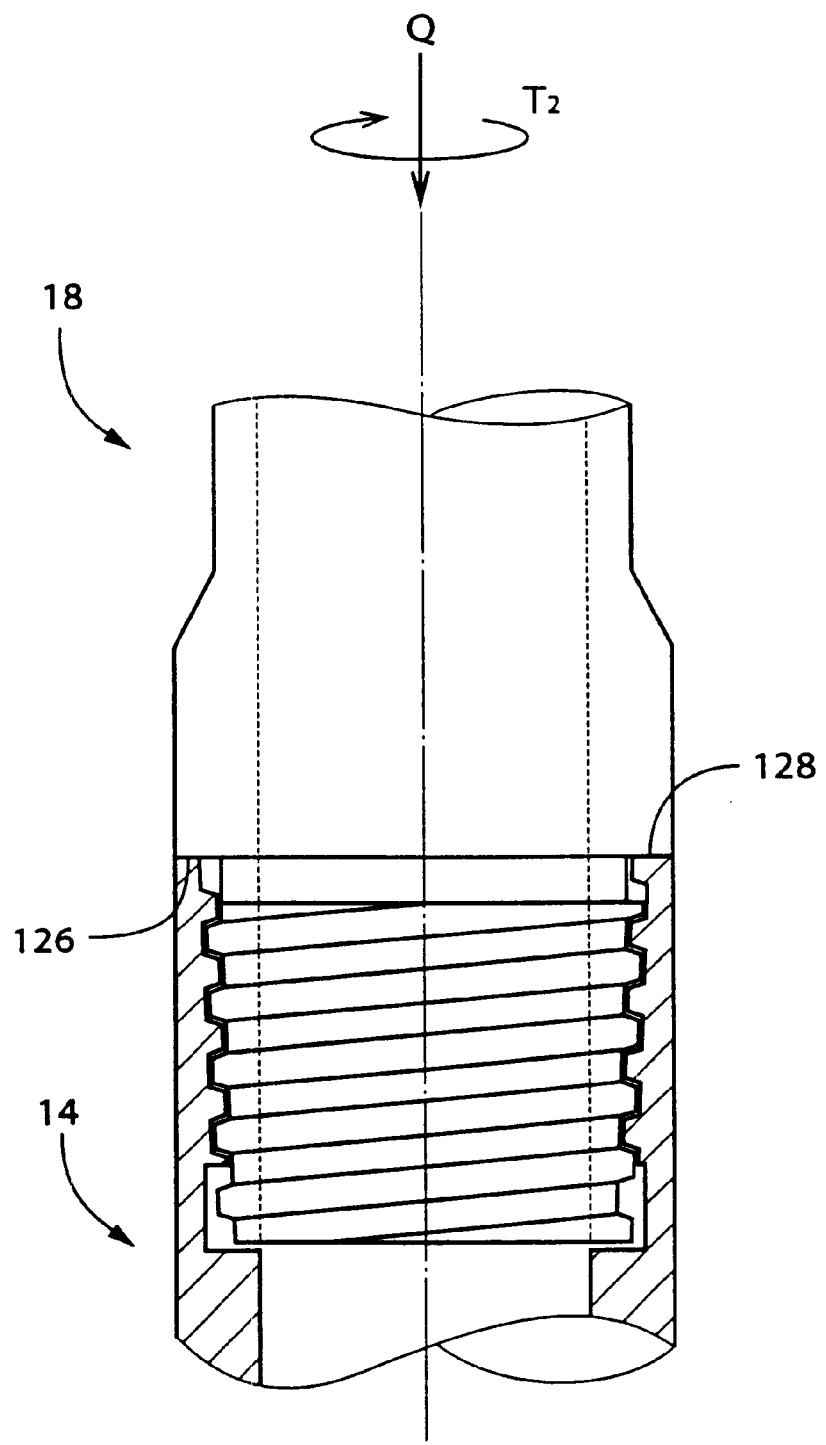
FIG. 8 is a view showing an intermediate phase of the wrenching operation performed by the tube connecting apparatus.

While steps S9 and S10 are repeatedly implemented, the shoulder surface 126 of the externally threaded tube 18 is brought into contact with the shoulder surface 128 of the internally threaded tube 14, as shown in FIG. 8. As shown in detail in the enlarged fragmentary view of FIG. 9, the externally and internally threaded portions 122, 124 are not in substantial contact with each other, while the shoulder surfaces 126, 128 are in contact with each other. That is, the wrenching operation has entered an intermediate phase following the initial phase. The phrase "substantial contact" of the threaded portions 122, 124 with each other means a state in which the threaded portions 122, 124 are not in pressing contact with each other as in the initial phase, although the threaded portions 122, 124 may slight contact each other if the externally and internally threaded tubes are more or less radially offset relative to each other or the angle between the shoulder surfaces 126, 128 and the axis of the tubes 18, 14 more or less deviates from the nominal angle of 90°.

Figure 10:
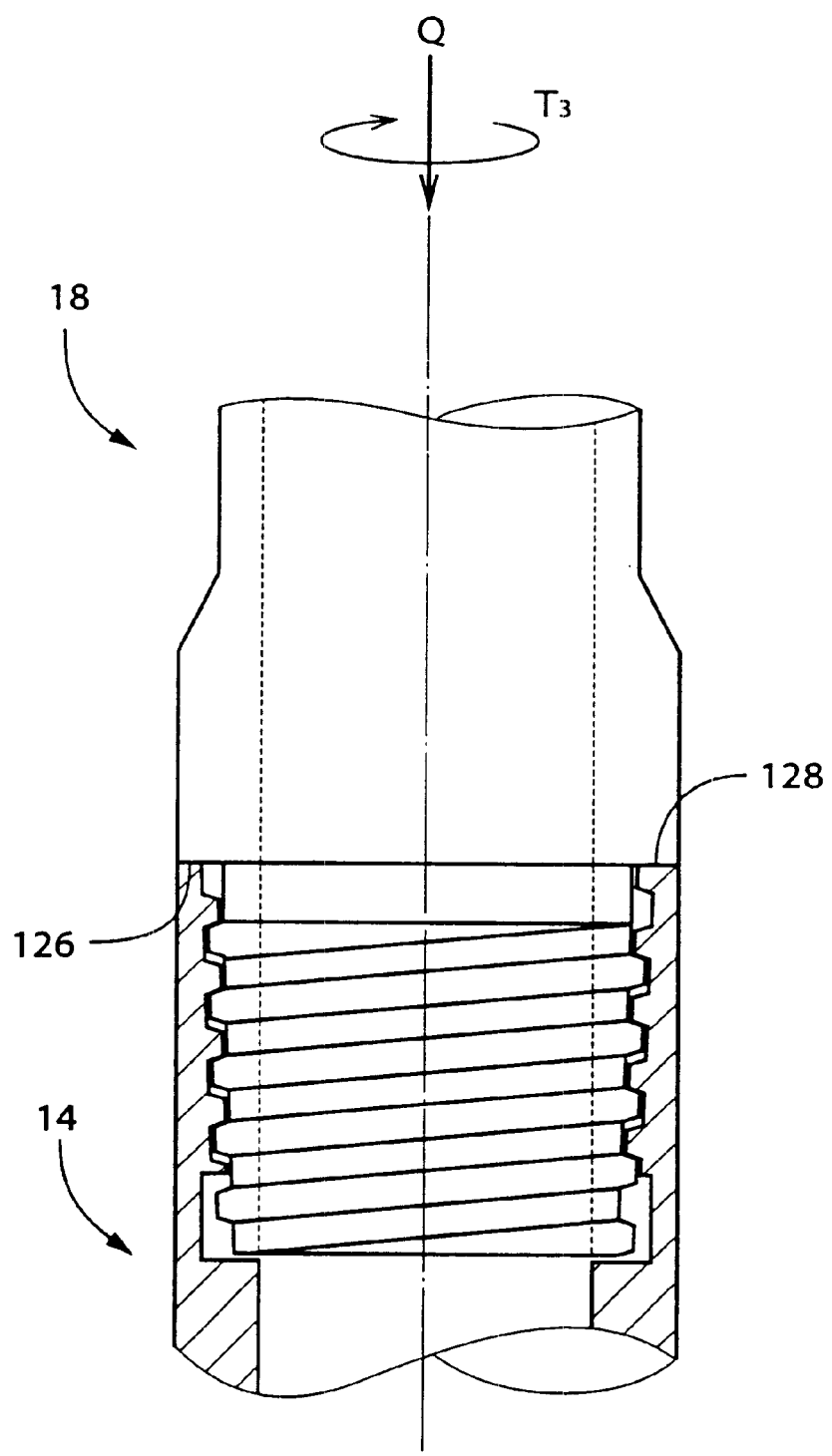
FIG. 10 is a view showing a final phase of the wrenching operation.

With the externally threaded tube 18 is rotated a further angle after the transition from the initial phase of FIG. 6 to the intermediate phase of FIG. 8, the wrenching operation has entered a final phase as shown in FIG. 10. In this final phase, a trailing flank 135 of the externally threaded portion 122 and a trailing flank 136 of the internally threaded portion 124 are held in contact with each other, as shown in detail in the enlarged fragmentary view of FIG. 11.

When the wrenching torque value T detected by the torque detecting device 42 has reached the preset value Tb, the control flow goes to step S11 to determine the initial torque value T1 in the initial phase of the wrenching operation, on the basis of the predetermined number of the stored torque values T as counted from the last stored one, namely, on the basis of the stored torque value which was stored the predetermined number of torque values before the last stored value. Then, the control flow goes to step S11 to determine the intermediate torque value T2 in the intermediate phase, on the basis of the stored torque value which was stored the predetermined number of torque values before the last stored value. The predetermined number corresponding to the intermediate torque value T2 is smaller than the predetermined number corresponding to the initial torque value T1.

Then, step S13 is implemented to determine a final or desired wrenching torque value T3 on the basis of the determined initial and intermediate wrenching torque values T1, T2. This determination is effected according to an equation (12) or (16) which will be described, on the basis of the facts described below:

There will be described the calculation of the desired wrenching torque value T3.

In the initial phase of the wrenching operation shown in FIGS. 6 and 7, the coefficient ps of friction between the threaded portions 122, 124 is obtained on the basis of the axial compressive force Q applied to the externally threaded tube 18 and the initial wrenching torque value T1.

In the initial phase, a torque Tq owing to an inclination of the thread surfaces is also produced. This torque Tq is expressed by the following equation (1):

$$Tq = ds/2 \cdot Q \cdot \tan \alpha' \tag{1}$$

In the above equation, "$\alpha'$" represents a lead angle of the threaded portions 122, 124 upon measurement of the wrenching torque T1. Since the threaded portions 122, 124 are tapered threads whose lead angle $\alpha'$ differs in different transverse cross sectional planes perpendicular to the axis, the lead angle $\alpha'$ is represented by an average of the lead angles at the contacting leading flanks 132, 133 of the threaded portions 122, 124 upon measurement of the wrenching torque T1. Further, "ds" represents the pitch diameter of the threaded portions 122, 124, which is a diameter equivalent to the wrenching torque T1 at the contacting leading flanks 132, 133 upon measurement of the wrenching torque T1, which diameter is represented by the following equation (2):

$$ds = \frac{2}{3} \cdot (dso^3 - dsi^3)/(dso^2 - dsi^2) \tag{2}$$

In the above equation (2), "dso" and "dsi" respectively represent the maximum and minimum diameters at the contacting leading flanks 132, 133.

Accordingly, the initial wrenching torque value T1 necessary for screwing the externally threaded portion 122 of the externally threaded tube 18 into the internally threaded portion 124 of the internally threaded tube 14 is represented by the following equation (3):

$$T1 = ds \cdot Q \cdot \mu s/(2 \cdot \cos(\gamma 1 - \beta)') - Tq \tag{3}$$

Figure 14:
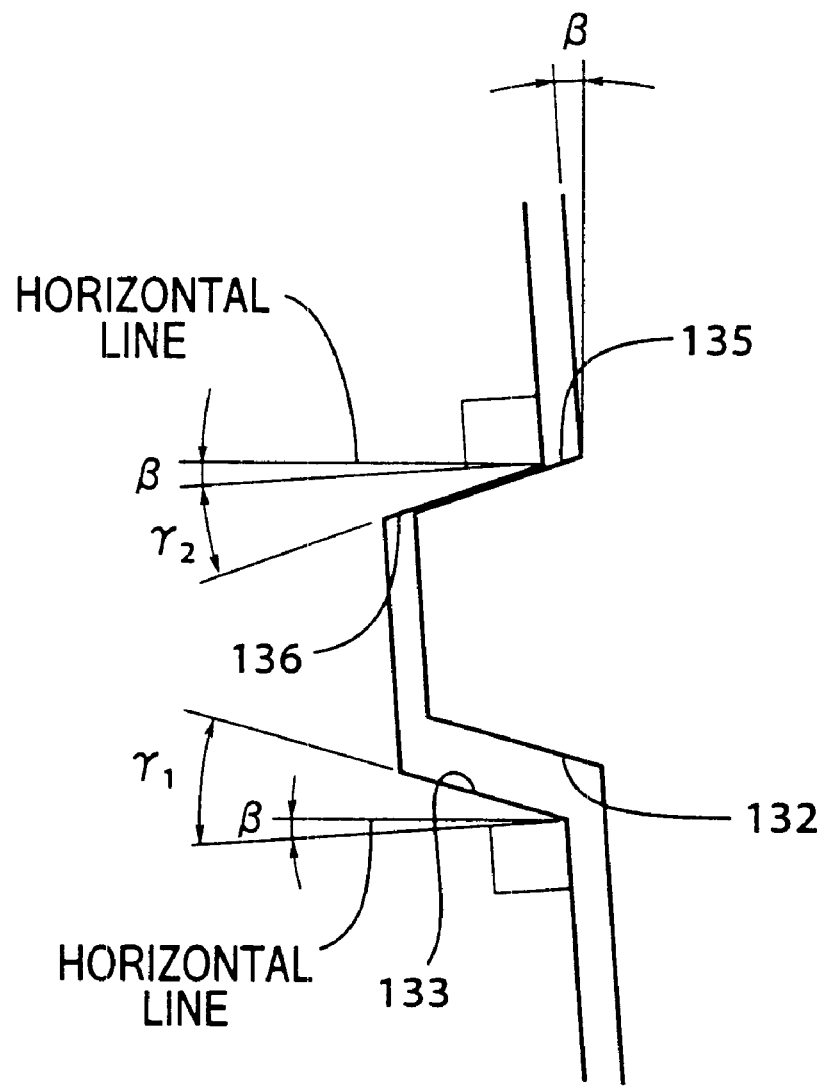
FIG. 14 is a fragmentary view of the threaded tubes fixedly connected together by the tube connecting apparatus.

In the above equation (3), "$\gamma 1$" represents an angle of inclination of the leading flanks 132, 133 of the externally and internally threaded portions 122, 124 which contact each other in the initial phase, while "$\gamma 2$" which will be described represents an angle of inclination of the trailing flanks 135, 136 which contact each other in the final phase, as indicated in FIG. 14. Further, "$\beta$" represents a taper angle with respect to the axis of the tubes 14, 18, and "Tq" is represented by the above equation (1), namely, Tq=ds/2·Q·tan $\alpha'$. "$(\gamma 1-\beta)'$" is an angle of inclination of the leading flanks 132, 133 contacting each other in the initial phase, with respect to the center axis in the transverse cross sectional plane of the thread crest, and is represented by the following equation (4):

$$\tan(\gamma 1 - \beta)' = \tan(\gamma 1 - \beta) \cdot \cos \alpha' \tag{4}$$

Accordingly, the coefficient $\mu s$ of friction between the threaded portions 122, 124 can be represented by the following equation (5):

$$\mu s = ((2 \cdot \cos(\gamma 1 - \beta)')/ds) \cdot (T1/Q + ds/2 \cdot \tan \alpha') \tag{5}$$

Figure 9:
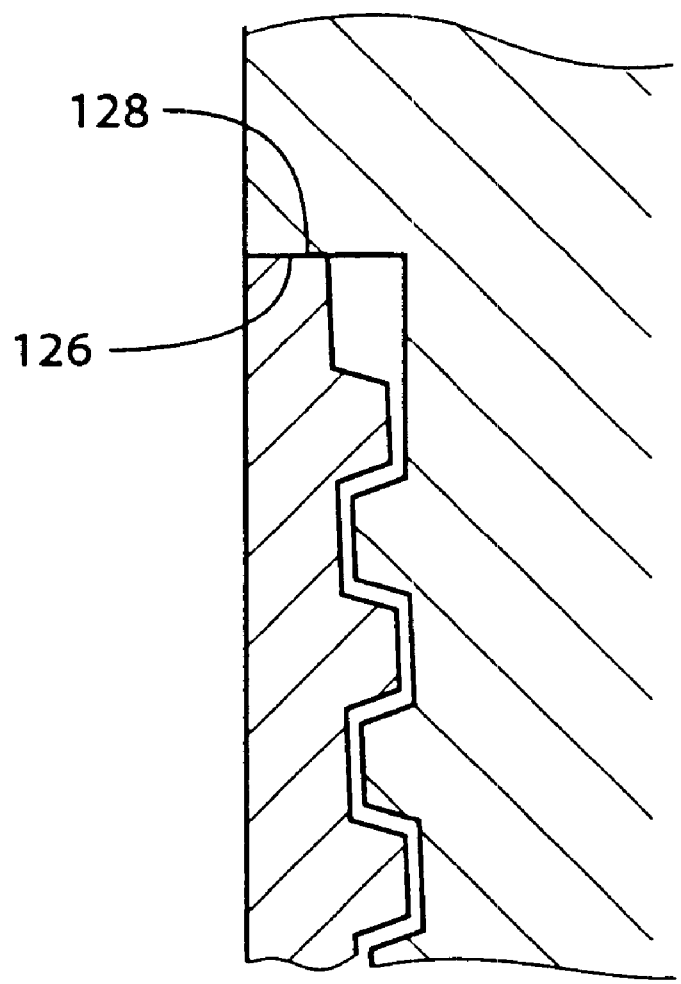
FIG. 9 is an enlarged fragmentary view of the threaded tubes in the intermediate phase of FIG. 8.

In the intermediate phase of FIGS. 8 and 9 in which the shoulder surfaces 126, 128 contact each other, a frictional torque Tw is produced due to a coefficient μw of friction between the contacting shoulder surfaces 126, 128 and the axial compressive force Q applied to the externally threaded tube 18. The intermediate wrenching torque value T2 is equal to this frictional torque Tw, and is represented by the following equation (6):

$$T2 = \mu w \cdot Dp/2 \cdot Q \tag{6}$$

In the above equation (6), "Dp" is a diameter equivalent to the wrenching torque at the contacting shoulder surfaces 126, 128, which diameter is represented by the following equation (7):

$$Dp = \tfrac{2}{3} \cdot (Dpo^3 - Dpi^3)/(Dpo^2 - Dpi^2) \tag{7}$$

In the above equation (7), "Dpo" and "Dpi" respectively represent the maximum and minimum diameters at the contacting shoulder surfaces 126, 128.

The coefficient μw of friction between the shoulder surfaces 126, 128 is represented by the following equation (8):

$$\mu s = (2 \cdot T2)/Dp \cdot Q) \tag{8}$$

Figure 11:
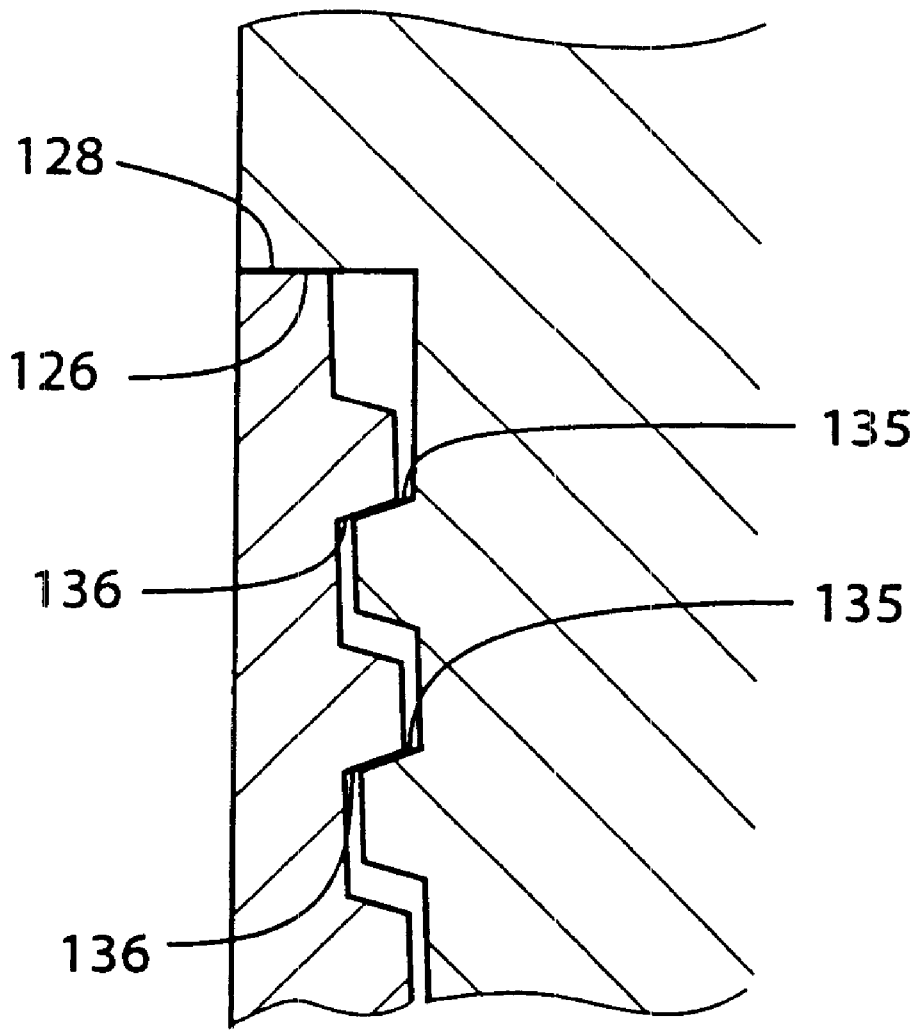
FIG. 11 is an enlarged fragmentary view of the threaded tubes in the final phase of FIG. 10.

In the final phase of the wrenching operation of FIGS. 10 and 11, the axial tightening force acting between the contacting shoulder surfaces 126, 128 is equal to (F+Q), where "F" represents the axial force acting between the trailing flanks 135, 136. Accordingly, the desired final wrenching torque T3 necessary to fixedly connecting together the two tubes 18, 14 with the desired tightening force F=F3 is represented by the following equation (3):

$$T3 = (Ds \cdot \mu s \cdot F)/(2 \cdot \cos(\gamma 2 + \beta)') + \mu w \cdot Dp/2 \cdot (F+Q) + Ds/2 \cdot F \cdot \tan \alpha \tag{9}$$

In the above equation (9), "γ2" represents an angle of inclination o the trailing flanks 135, 136 contacting each other in the final phase, and "(γ2+β)'" represents an angle of inclination of the flanks 135, 136 with respect to the center axis in the transverse cross sectional plane of the thread crest, and is represented by the following equation (10):

$$\tan(\gamma 2 + \beta)' = \tan(\gamma 2 + \beta) \cdot \cos \alpha \tag{10}$$

Further, "Ds" is a diameter equivalent to the wrenching torque at the contacting trailing flanks 135, 136, and is represented by the following equation (11):

$$Ds = \tfrac{2}{3} \cdot (Dso^3 - Ssi^3)/(Dso^2 - Dsi^2) \tag{11}$$

In the above equation (11), "Dso" and "Dsi" respectively represent the maximum and minimum diameters at the contacting trailing flanks 135, 136, and "a" represents the lead angle of the trailing flanks 135, 136 which contact each other in the final phase. This lead angle α of the tapered threads of the threaded portions 122, 124 differs in different transverse cross sectional planes perpendicular to the axis of the tubes 18, 14. Therefore, the lead angle α is represented by an average of the lead angles at the trailing flanks 135, 136 of the threaded portions 122, 124 which contact each other in the final phase.

The desired final wrenching torque T3 can be obtained by substituting the above equations (5) and (8) for the friction coefficients μs and μw in the above equation (9), that is, according to the following equation (12):

$$T3 = (Ds \cdot \cos(\gamma 1 - \beta)')/(ds \cdot \cos(\gamma 2 + \beta)') \cdot (T1/Q + ds/2 \cdot \tan \alpha') \cdot F + T2 \cdot (F+Q)/Q + Ds/2 \cdot F \cdot \tan \alpha \tag{12}$$

However, since the calculation of the final wrenching torque value T3 according to the above equation (12) is very complicated, the torque value T3 is obtained by approximation. Namely, where the taper angle β with respect to the axis is comparatively small, the torque equivalent diameter ds in the initial phase and the torque equivalent diameter Ds in the final phase can be made approximately equal to each other, by detecting the initial wrenching torque value T1 at an extreme end of initial phase of the wrenching operation. As a result, the lead angle α' upon measurement of the initial wrenching torque value T1 can be made approximately equal to the lead angle α in the final phase.

That is, the torque Tq owing to the effect of inclination of the thread surfaces can be represented by the following equation (13) wherein "P" represents the thread pitch.

$$Tq = (P/(2\pi)) \cdot Q \tag{13}$$

Accordingly, the initial wrenching torque value T1 necessary to screw the externally threaded portion 122 of the externally threaded tube 18 into the internally threaded portion 124 of the internally threaded tube 14 is represented by the following equation (14):

$$T1 = (ds \cdot \mu s)/(2 \cdot \cos(\gamma 1 - \beta)') \cdot Q - P/2\pi \cdot Q \tag{14}$$

The friction coefficient μs of the threaded portions 122, 124 is represented by the following equation (15):

$$\mu s = (2 \cdot \cos(\gamma 1 - \beta)')/ds \cdot (T1/Q + P/2\pi) \tag{15}$$

Accordingly, the final wrenching torque value T3 necessary to fixedly connect together the two tubes 14, 18 with the desired tightening force F3 can be obtained by approximation according to the following equation (16), rather than the above equation (12):

$$T3 = (\cos(\gamma 1 - \beta)'/\cos(\gamma 2 + \beta)') \cdot (T1/Q + P/2\pi) \cdot F + T2 \cdot (F+Q)/Q + P/2\pi \cdot F \tag{16}$$

In step S13, the desired final wrenching torque value T3 necessary to establish the desired tightening force F3 read in step S1 can be calculated according to the above equation (12) or (16). Then, the control flow goes to steps S14 and S15 to detect the actual wrenching torque T during the wrenching operation until the detected torque T has been increased to the determined desired final wrenching torque value T3. When the detected torque T has reached the final value T3, that is, when an affirmative decision (YES) is obtained in step S15, the control flow goes to step S16 in which the switch 118 is turned off by the motor driver 115, so that the rotary drive electric motor 40 is turned off. Thus, the wrenching operation or tube connecting operation is automatically terminated.

As described above, the present embodiment is adapted to obtain the coefficient of friction between the leading flanks 132, 133 of the threaded portions 122, 124 on the basis of the initial wrenching torque value T1 in the initial phase of the wrenching operation, and obtain the coefficient of friction between the shoulder surfaces 126, 128 on the basis of the intermediate wrenching torque value T2 and the axial compressive force Q. The present embodiment is further adapted to determine the desired final wrenching torque T3 on the basis of the obtained two friction coefficients, and automatically terminate the wrenching operation when the wrenching torque T detected in the final phase has reached the desired final wrenching torque value t3. This arrangement permits the externally and internally threaded tubes 18, 14 to be fixedly connected together with a substantially constant tightening force (desired tightening force F3), without adverse influences of an oil adhering to the threaded portions 122, 124, and a variation in the surface roughness of the threaded portions 122, 124, which may cause variations in the coefficient of friction between the flanks 132, 133, 135, 136 and the coefficient of friction between the shoulder surfaces 126, 128.

In the present embodiment, the torque value detected by the torque detecting device 42 is used as the actual wrenching torque T. However, the actual wrenching torque T is smaller than the torque value as detected by the torque detecting device 42, by an amount corresponding to a torque loss due to a friction between the annular rail 92 and the circumferential rollers 96 and a friction between the annular rail 90 and the circumferential rollers 94. To obtain the detected torque value minus the torque loss due to the frictions indicated above, this torque loss is obtained in advance, and the obtained torque loss is subtracted from the detected torque value to obtain a torque value which is to be used as the actual wrenching torque T.

The tube connecting apparatus shown in FIG. 1 according to the present embodiment is equally applicable to an operation to fixedly connect internally and externally threaded tubes other than the tubes 14, 18, such as those shown in FIGS. 15A, 15B, 16A and 16B.

A set of tubes shown in FIGS. 15A and 15B consists of the internally threaded tube 14 which is almost identical with that of FIGS. 6–11, and an externally threaded tube 150. The internally threaded tube 14 in this example of FIGS. 15A and 15B has a non-threaded tapered radial sealing surface 156 at an axial portion near the axially inner or proximal end of the internally threaded portion. The externally threaded tube 150 has also a non-threaded tapered radial sealing surface 154 at an axial portion near the axially outer or distal end of the externally threaded portion. These two internally and externally threaded tubes 14, 150 are fixedly connected together such that a shoulder surface in the form of an end face 152 of the externally threaded tube 150 and the shoulder surface 129 of the internally threaded tube 14 are held in contact with each other, with an axial tightening force acting between these shoulder surfaces 152, 129, and with a radial force acting between the radial sealing surfaces 156, 154.

A set of tubes shown in FIGS. 16A and 16B consists of an internally threaded tube 170 and an externally threaded but 172. The internally threaded tube 170 has a first shoulder surface 174 and a second shoulder surface 176 (also called a "torque shoulder surface" or "intermediate shoulder surface"), which are formed at an axial portion of the tube 170 near the axially inner or proximal end of the internally threaded portion such that the second shoulder surface 176 is nearer to the threaded portion. The externally threaded tube 172 has a shoulder surface 178 (also called a "torque shoulder surface" or "intermediate shoulder surface") at an axial portion between the externally threaded portion and a shoulder surface in the form of an end face 180. In the final phase of the wrenching or tube connecting operation to fixedly connect together the internally and externally threaded tubes 170, 172, the shoulder surface 174 of the tube 170 is in contact with the shoulder surface 180 of the tube 172, while the torque shoulder surface 176 of the tube 170 is in contact with the torque shoulder surface 178 of the tube 172. Alternatively, the torque shoulder surfaces 176, 178 are in contact with each other, without a contact of the shoulder surfaces 174, 180 with each other. The internally threaded tube 170 includes a non-threaded tapered inner circumferential surface or portion 184 between the shoulder surface 174 and the torque shoulder surface 176, while the externally threaded tube 172 includes a non-threaded tapered outer circumferential surface or portion 186 between the torque shoulder surface 178 and the shoulder surface 180. In either of the two alternative states of connection of the two tubes 170, 172, the non-threaded tapered portions 184, 186 of the two tubes 170, 172 are in contact with each other, with a radial tightening force acting between the two tapered portions 184, 186, which serve as radial sealing surfaces similar to the radial sealing surfaces 154, 156 of the tubes 14, 150 of FIGS. 15A and 15B.

Tube assemblies to be obtained by fixedly connecting the two tubes 14, 150 of FIGS. 15A and 15B and the two tubes 170, 172 of FIGS. 16A and 16B have a major utility as fluid transporting tubes or pipes. The radial tightening force between the radial sealing surfaces is effective to prevent leakage of the fluid.

The tube assembly to be obtained from the tubes 14, 150 of FIGS. 15A, 15B is referred to as a shoulder sealing type, while the tube assembly to be obtained from the tubes 170, 172 of FIGS. 16A, 16B is referred to as a radial sealing type. In both of these two types, there exist the axial tightening force between the contacting shoulder surfaces, the axial tightening force between the contacting thread surfaces (more precisely, between the contacting flanks of the threads), and the radial tightening force between the radial sealing surfaces. The control of the wrenching torque according to the present invention is based on a fact that there exists no radial tightening force between the contacting thread surfaces, namely, based on a fact that the crests of the external thread do not contact the roots of the internal thread, and the crests of the internal thread do not contact the roots of the internal thread. Where the top surfaces of the crests contact the roots, the ratio of the wrenching torque value due to the contacts of the thread surfaces to the entire wrenching torque value is increased. In this case, the former torque value can be taken into account on the basis of the measured coefficient of friction between the above-indicated crests and roots. In the cases of FIGS. 15 and 16, the internal and external threads of the tubes 14, 150, 170, 172 are configured so as to minimize the radial tightening force due to the contacts of the crests and roots, so that this radial tightening force can be ignored.

In the embodiments of FIGS. 15 and 16, the coefficient of friction between the thread surfaces, the coefficient of friction between the shoulder surfaces and the desired final wrenching torque can be calculated in the same manner as described above by reference to the flow chart of FIG. 5. In the case of fixedly connecting the two tubes 14, 150 of FIGS. 15A and 15B, the axial compressive force Q must be determined to be sufficient for complete contact of the shoulder surfaces 152, 129 and for complete contact of the radial sealing surfaces 154, 156. In the case of fixedly connecting the two tubes 170, 172 of FIGS. 16A and 16B, the axial compressive force Q must be determined to be sufficient for complete contact of the shoulder surfaces 180, 174, for complete contact of the torque shoulder surfaces 176, 178, and for complete contact of the radial sealing surfaces 182, 184, or alternatively, for complete contact of the torque shoulder surfaces 176, 178 and for complete contact of the radial sealing surfaces 182, 184. That is, the axial compressive force Q must be sufficient to assure complete actual contact of the surfaces that are designed to contact each other.

Unlike the externally threaded tube 18, the externally threaded tubes 150, 172 do not have a shoulder surface which is located near the proximal end of the threaded portion and which contacts an end face of the internally threaded tube, as is apparent from FIGS. 15 and 16. Accordingly, the axial position at which the axial tightening force is generated in the cases of FIGS. 15 and 16 is different from that in the case of FIGS. 10 and 11. However, this difference can be compensated for by suitably determining the maximum and minimum diameters at the contacting portions of the tubes.

Figure 19:
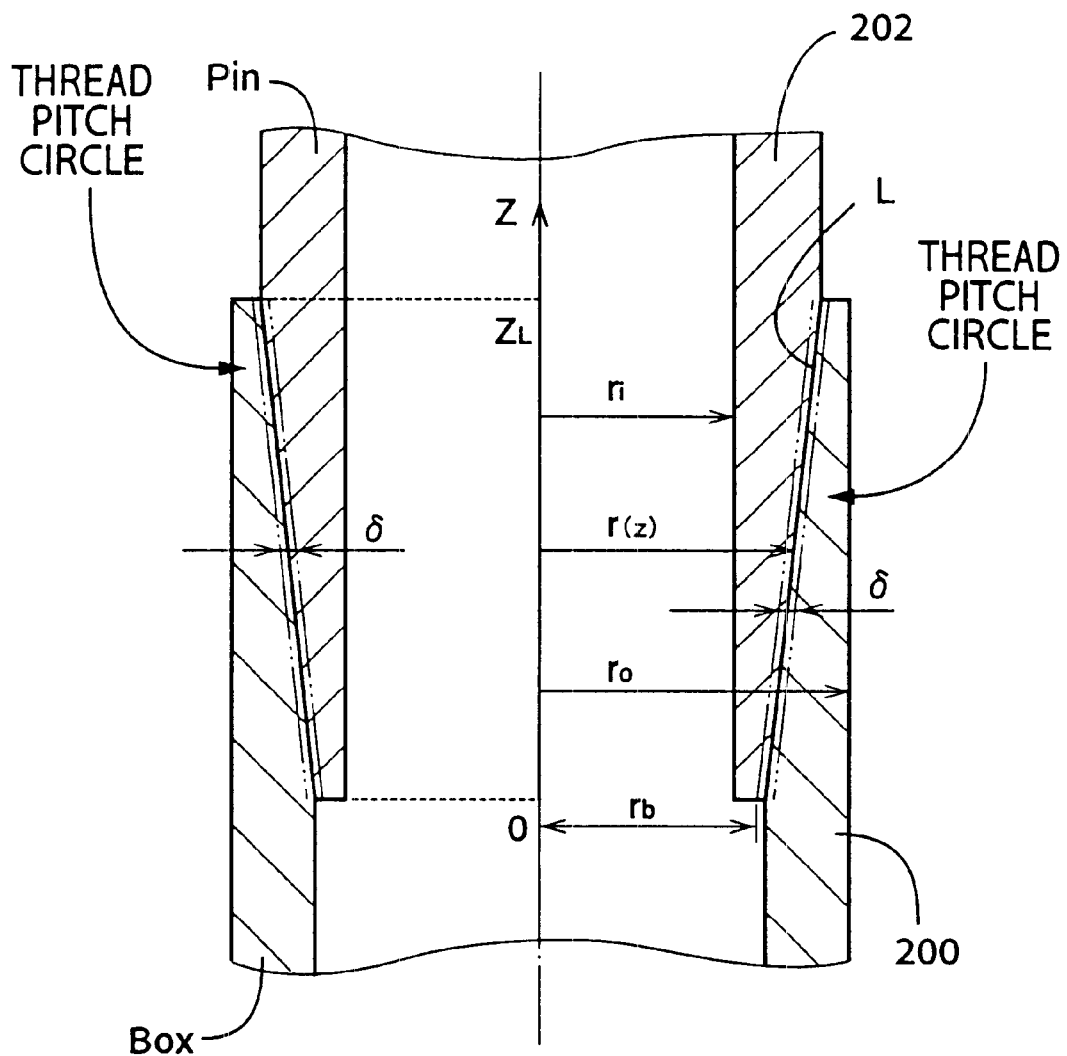
FIG. 19 is a view showing meshing engagement of the two threaded tubes of FIG. 17.

Although the embodiments of FIGS. 15 and 16 are adapted to determine the final wrenching torque without taking account of the radial tightening force generated between the radial sealing surfaces, this radial tightening force can be taken into account. For instance, an amount of fit δ of the two tubes 14, 150 (170, 172) in the radial direction as shown in FIG. 19 is estimated depending upon the configurations of the two tubes, and the torque generated between the radial sealing surfaces is estimated on the basis of the estimated amount of fit δ, as described later in detail by reference to FIG. 19. The desired final wrenching torque is obtained by adding the estimated torque value to the value which is obtained without taking account of the radial tightening force between the radial sealing surfaces. In this manner, the final wrenching torque can be controlled with improved accuracy.

Figure 17:
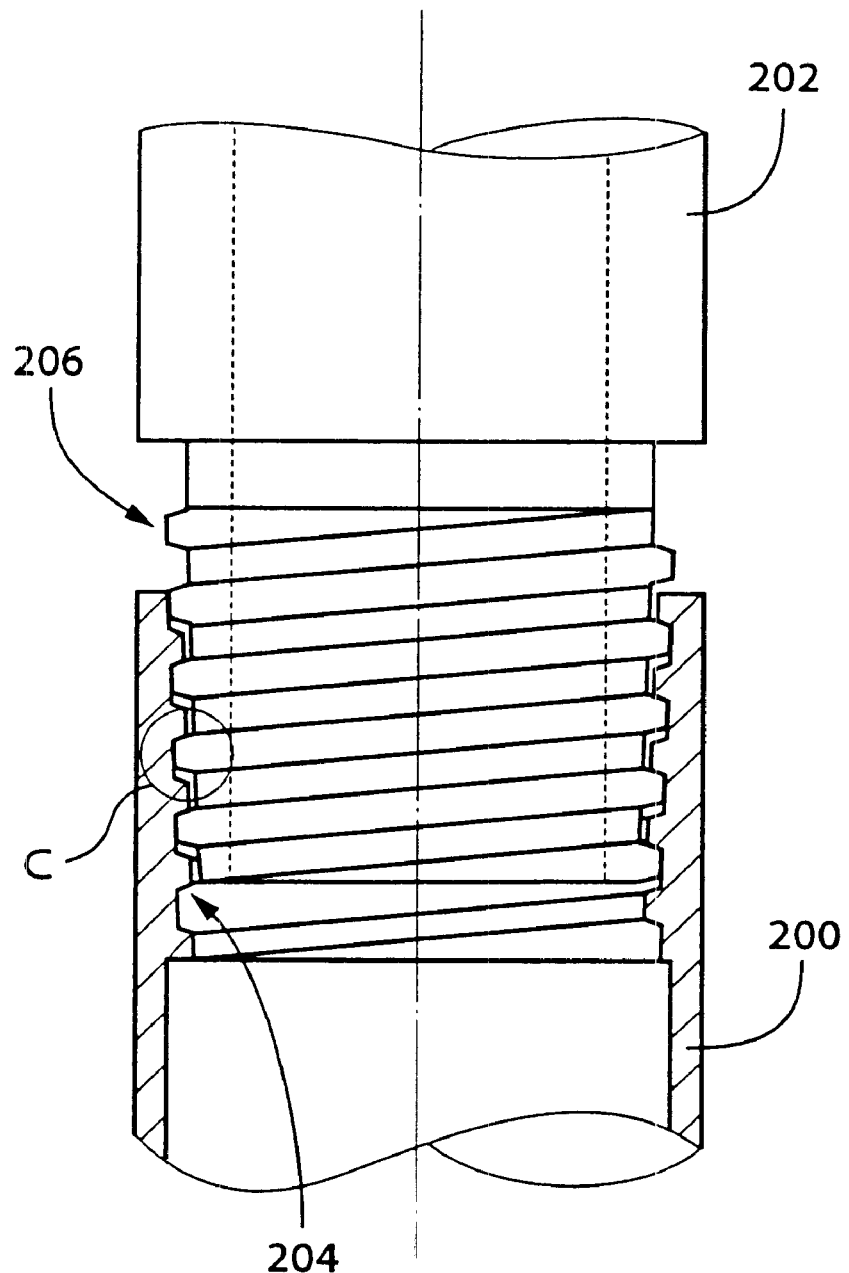
FIG. 17 is a view showing a further set of two threaded tubes fixedly connected together by the tube connecting apparatus.
Figure 18:
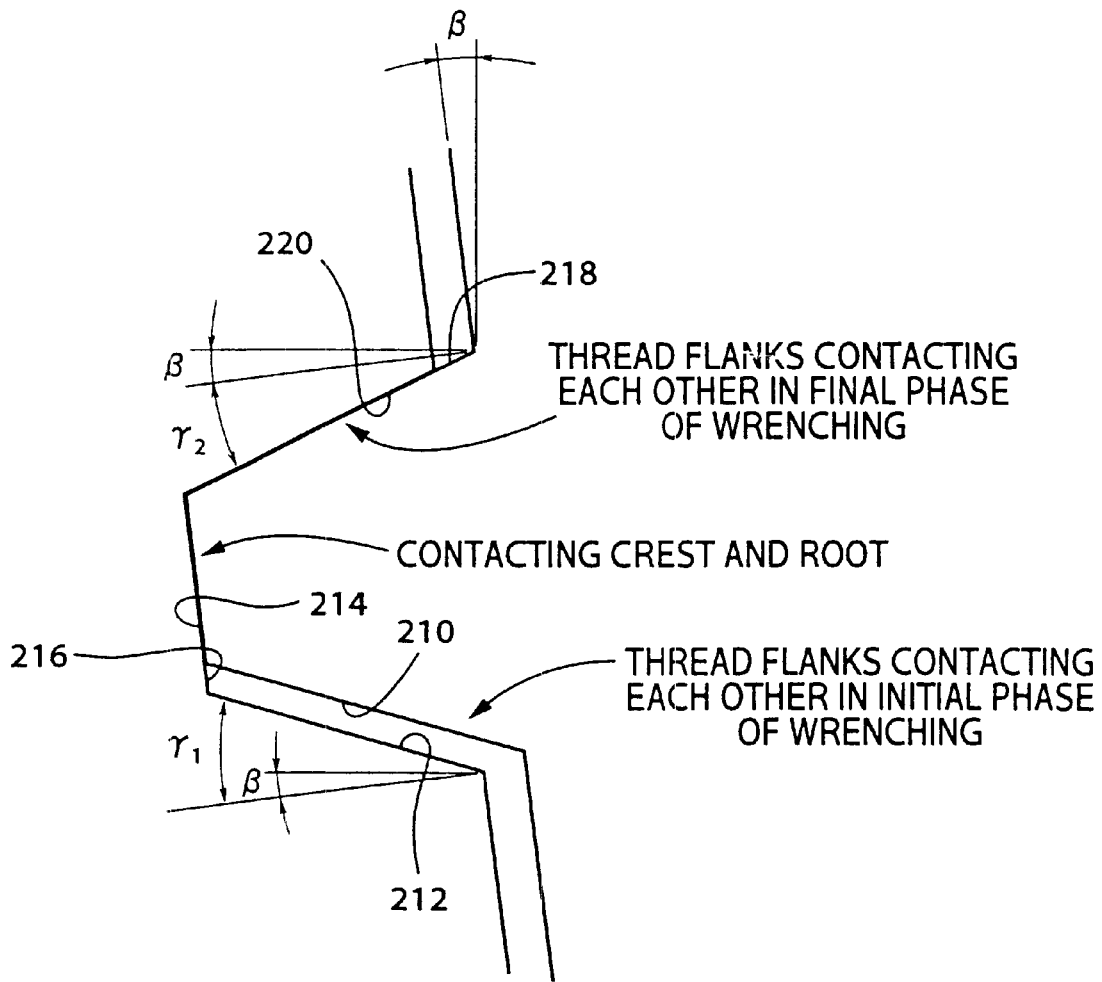
FIG. 18 is a view showing details of a portion C of the tubes of FIG. 17.

Referring next to FIG. 17, another set of internally and externally threaded tubes 200, 202 will be explained. These tubes 200, 202 do not have shoulder surfaces which contact each other in the final phase of the wrenching operation. The tubes 200 and 202 have respective internally and externally threaded portions 204, 206 having tapered trapezoidal threads. In this case, a radial tightening force is generated between the contacting thread surfaces. Described in detail referring to FIG. 18, a leading flank 210 of the externally threaded portion 206 is brought into contact with a leading flank 212 of the internally threaded portion 204 in the initial phase of the wrenching operation. In the final phase of the wrenching operation, each crest 214 of the externally threaded portion 206 and each root 216 of the internally threaded portion 204 are in contact with each other, while a trailing flank 218 of the externally threaded portion 206 and a trailing flank 220 of the internally threaded portion 204 are in contact with each other.

In the embodiment of FIG. 17, the coefficient of friction between the contacting thread surfaces in the initial phase of the wrenching operation is obtained. It is preferable that the initial wrenching torque value T1 be determined on the basis of the axial compressive force Q as well as the obtained friction coefficient, and that the final wrenching torque value T3 be determined without taking account of the axial compressive force Q. Namely, where the axial compressive force Q is extremely small, the ratio of the axial compressive force to the wrenching torque is accordingly small, and the axial compressive force will not substantially influence the desired final wrenching torque value T3. Where the axial compressive force Q is relatively large, the above-indicated ratio is accordingly large, and the desired final wrenching torque value T3 cannot be determined with high accuracy. When the tubes 200, 202 are fixedly connected together, a radial tightening force is generated between the threaded portions 204, 206, so that it is desirable to hold the internally threaded tube 200 at a lower axial portion thereof than in the embodiment of FIG. 1, that is, at an axial portion lower than the internally threaded portion 204, as viewed in FIG. 17.

In the embodiment of FIG. 17, the two tubes 200, 202 do not have any shoulder surfaces, and therefore the wrenching operation does not include an intermediate phase in which the shoulder surfaces contact each other. Further, it is necessary to take into account a radial stress generated due to the contact of the thread surfaces, and a circumferential stress applied to the externally threaded tube 202, when the desired final wrenching torque value T3 is calculated. Thus, the method of determining the desired final wrenching torque value T3 is considerably different from that in the preceding embodiments.

Initially, there will be described the circumferential stress on the outer circumferential surface of the externally threaded tube 202, and the radial stress due to the contacting thread surfaces. The circumferential stress $\sigma_c(z)$ and the radial stress a $\sigma_p(z)$ are calculated on an assumption that the tubes 200, 202 do not have the threaded portions 204, 206, since the thread depth is considerably smaller than the radius of the tubes 200, 202. That is, the circumferential stress $\sigma_c(z)$ and the radial stress a $\sigma_p(z)$ are calculated on an assumption that the externally threaded tube 202 is fitted at its tapered surface in the tapered surface of the internally threaded tube 200, as indicated in FIG. 19 by solid line L representing a pitch circle of the threaded portions 204, 206. Since the lead angle α is extremely small, it is ignored or considered to be zero.

Where the amount of fit of the two tubes 200, 202 in the radial direction is represented by δ, the circumferential stress a (z) and the radial stress $\sigma_p(z)$ are represented by the following equations (17) and (18), respectively:

$$\sigma_c(z) = \{E \cdot \delta/(r_o^2 - r_i^2)\} \cdot \{(r(z)^2 - r_i^2)/r(z)\} \quad (17)$$

$$\sigma_p(z) = \{E \cdot \delta/(2 \cdot (r_o^2 - r_i^2))\} \cdot \{(r(z)^2 - r_i^2) \cdot (r_o^2 - r(z)^2)/r(z)^3\} \quad (18)$$

In the above equations (17) and (18), "E" represents the Young's modulus, and "$r_i$" and "$r_o$" represent the inside diameter of the tube 202 and the outside diameter of the tube 200, respectively. Further, "r(z)" represents the radius of the pitch circle. If the amount of fit δ is determined or given, the circumferential stress $\sigma_c(z)$ and the radial stress $\sigma_p(z)$ can be obtained on the basis of the materials, configurations and dimensions of the internally and externally threaded tubes 200, 202.

The amount of fit δ can be obtained according to the following equation (19):

$$\delta = n \cdot P \cdot \tan \beta \quad (19)$$

In the above equation (19), "P" represents a pitch of the threads, "n" represents the speed of relative rotation of the two tubes 200, 202 in the final phase of the wrenching operation, while "β" represents the taper angle with respect to the axis Z of the tubes.

The radius r(z) of the pitch circle is represented by the following equation (20):

$$r(z) = r_b + z \cdot \tan \beta \quad (20)$$

In the above equation (20), "$r_b$" represents the smallest radius of the pitch circle.

It is noted that the z value is a coordinate value in the axial direction of the tubes 200, 202, which value is zero at the axial position at which the radius rb of the pitch circle is the smallest, as indicated in FIG. 19.

It will be understood that the tightening force by which the two tubes 200, 202 are fixedly connected together can be controlled by controlling the relative rotation speed after the wrenching operation has entered the final phase. To begin with, the control of the tightening force based on the control of the wrenching torque will be discussed.

Figure 20A:
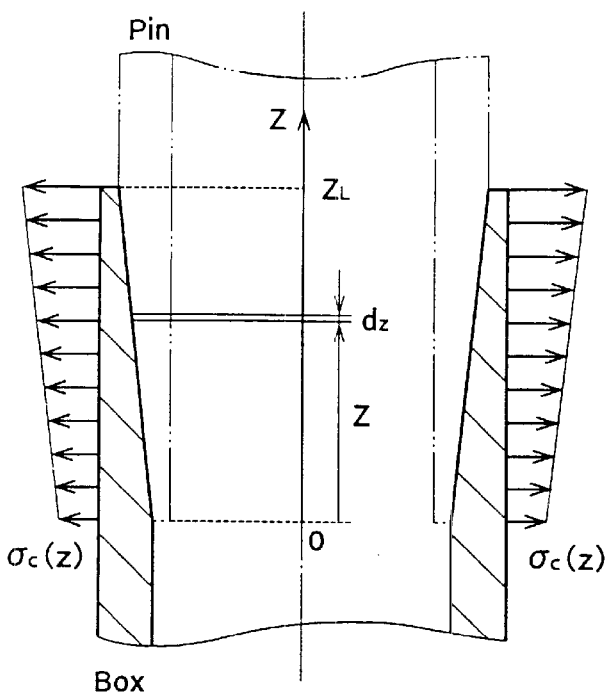
FIGS. 20A and 20B are views indicating distributions of forces acting on the respective two threaded tubes of FIG. 17.
Figure 20B:
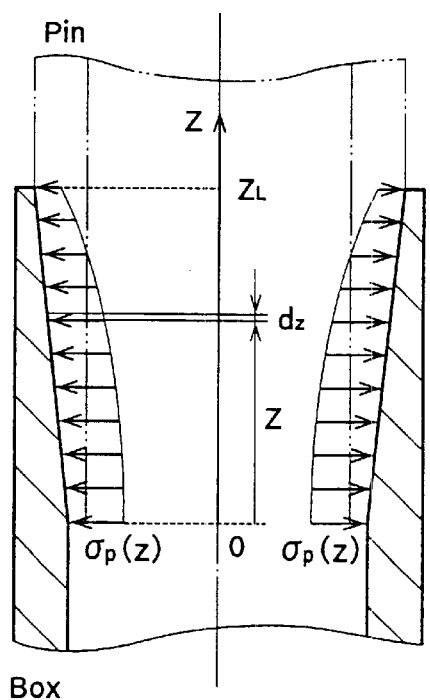
Figure 21:
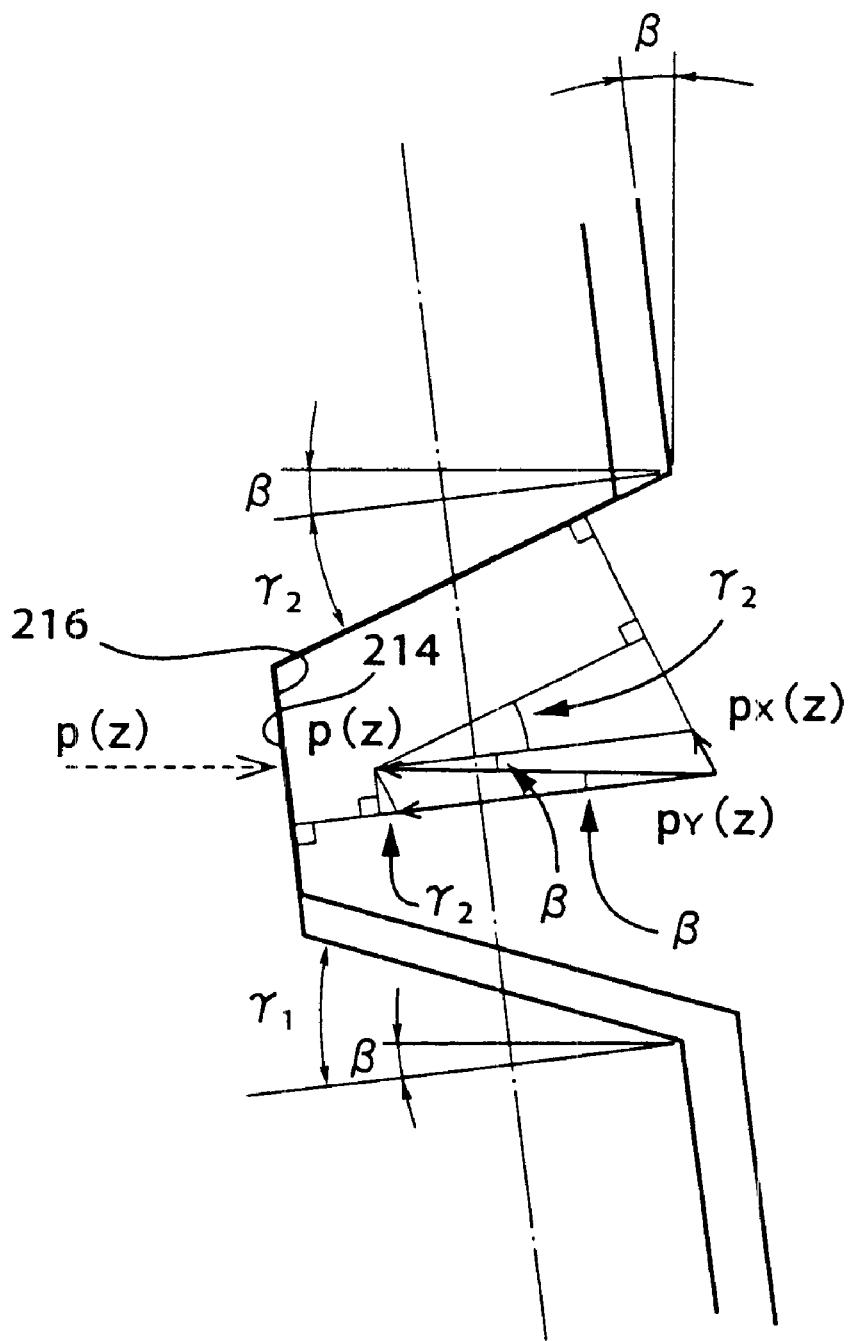
FIG. 21 is a view showing an equilibrium of forces acting on the two threaded tubes of FIG. 17.

The circumferential stress $\sigma_c(z)$ and the radial stress $\sigma_p(z)$ of the externally threaded tube 202 represented by the respective equations (17) and (18) given above are distributed as indicated in FIGS. 20A and 20B, respectively. Given the desired circumferential stress $\sigma_c(z)$ and radial stress $\sigma_p(z)$, the amount of fit δ can be obtained according to the equations (17) and (18). That is, a suitable torque value necessary to establish the desired amount of fit δ is added to determine the desired final wrenching torque. There will be described a manner of establishing the desired amount of fit δ by controlling the wrenching torque.

The radial tightening force p(z) due to the radial stress $\sigma_p(z)$ in a plane which is perpendicular to the axis Z of the tube 202 and which passes the axial or Z-axis position z is represented by the following equation (21):

$$p(z)=2\pi \cdot r(z) \cdot \sigma_p(z) \cdot dz \qquad (21)$$

A component $p_y(z)$ of the radial tightening force p(z) which is perpendicular to the top surface of the crest 216 of the externally threaded portion 206, and a component $p_x(z)$ of the force p(z) which is perpendicular to the leading flank 318 of the externally threaded portion 206, are represented by the following equations (22) and (23), respectively:

$$p_y(z)=p(z)\cdot\cos \beta - p(z)\cdot\sin \beta \cdot \tan \gamma 2 \qquad (22)$$

$$p_x(z)=p(z)\cdot\sin(\gamma 2+\beta) - p(z)\cdot\cos(\gamma 2+\beta \cdot \tan \gamma 2 \qquad (23)$$

A torque value dT necessary to rotate the above-indicated plane is represented by the following equation (24), on the basis of the frictional forces generated by the components $p_y(z)$ and $p_x(z)$:

$$dT = \mu s \cdot r(z) \cdot p_x(z) + \mu s \cdot r(z) \cdot p_y(z) \qquad (24)$$

By substituting the above equations (22) and (23) for the respective components $p_y(z)$ and $p_x(z)$ in the above equation (24), the following equation (25) is obtained:

$$dT = \mu s \cdot r(z)(p(z)\cdot\cos \beta - p(z)\cdot\sin \beta \cdot \tan \gamma 2) + \mu s \cdot r(z)(p(z)\cdot\sin(\gamma 2+\beta) - p(z)\cdot\cos(\gamma 2+\beta \cdot \tan \gamma 2) \qquad (25)$$

By substituting the above equation (21) for the radial tightening force p(z) in the above equation (25), the following equation (26) is obtained:

$$dT = 2\pi \mu s \{\cos \beta - \sin \beta \cdot \tan \gamma 2 + \sin(\gamma 2+\beta) - \cos(\gamma 2+\beta)\cdot \tan \gamma 2\} \cdot r(z)^2 \cdot \sigma_p(z) \cdot dz \qquad (26)$$

By integrating the above equation (26) by the z value from z=0 to z=$Z_L$, the torque T necessary to wrench the externally threaded tube 202 can be obtained according to the following equation (27):

$$T = 2\pi \mu s \cdot \{\cos \beta - \sin \beta \cdot \tan \gamma 2 + \sin(\gamma 2+\beta) - \cos(\gamma 2+\beta)\cdot \tan \gamma 2\} \cdot \int_0^{Z_L} r(z)^2 \cdot \sigma_p(z) \cdot dz \qquad (27)$$

The friction coefficient μs of the contacting thread surfaces can be obtained according to the following equation (28), which includes the axial compressive force Q and the initial wrenching torque value T1, as in the preceding embodiments.

$$\mu s = \{2\cdot\cos(\gamma 1-\beta)'\}/ds\cdot(T1/Q+ds\cdot\tan \alpha'/2) \qquad (28)$$

The present embodiment is adapted to obtain the friction coefficient in the initial phase of the wrenching operation, more precisely, the coefficient of friction between the leading flanks 210, 212, but not the coefficient of friction between the crest 214 and the root 216 which actually contact each other in the final phase, nor the coefficient of friction between the trailing flanks 218, 220 which also actually contact each other in the final phase. Where the surface conditions of the threaded portions 204, 206 as machined and the lubricating conditions of these threaded portions are uniform over the entirety of the thread surfaces, however, the friction coefficient of the leaking flanks 210, 212 can be considered to be equal to the friction coefficient of the crest 214 and root 216, and the friction coefficient of the trailing flanks 218, 220.

By substituting the above equation (28) for the friction coefficient ps in the above equation (27), the following equation (29) can be obtained:

$$T=\{4\pi\cdot\cos(\gamma 1-\beta)'/ds\}\cdot(T1/Q+ds\cdot\tan \alpha'/2)\cdot\{\cos \beta - \sin \beta \cdot \tan \gamma 2 + \sin(\gamma 2+\beta) - \cos(\gamma 2+\beta)\cdot\tan \gamma 2\}\cdot\int_0^{Z_L} r(z)^2 \cdot \sigma_p(z)\cdot dz \qquad (29)$$

Thus, the friction coefficient ps can be obtained on the basis of the axial compressive force Q and the initial wrenching torque T1, even where the tubes 200, 204 do not have contacting shoulder surfaces, and the radial tightening force is generated at the contacting thread surfaces. Accordingly, the final wrenching torque for fixedly connecting together the two tubes 200, 204 can be accurately controlled.

The desired final wrenching torque T represented by the above equation (29) can be obtained after a general equation is obtained by substituting the above equation (18) for the radial stress $\sigma_p(z)$, or can be directly obtained by numerical integration. In either case, the amount of fit δ can be determined after or if the desired or nominal circumferential stress $s_c(z)$ or radial stress $s_p(z)$ has been determined or is known, and the wrenching torque can be controlled on the basis of the friction coefficient.

It will be understood from the foregoing explanation of the illustrated embodiments that a portion of the microcomputer 104 assigned to implement steps S14–S16 of the wrenching torque control program illustrated in the flow chart of FIG. 5 constitutes a termination commanding device for commanding termination of the wrenching operation, and that a portion of the microcomputer 104 assigned to implement steps S11 and S12 constitutes a physical quantity obtaining device which obtains a physical quantity relating to the friction coefficients, and a portion of the microcomputer 104 assigned to implement step S13 constitutes a terminating condition determining device which determines a terminating condition for terminating the wrenching operation, while a portion of the microcomputer 104 assigned to implement steps S14 and S15 constitutes a termination determining device which determines that the terminating condition is satisfied when the wrenching torque has become equal to the desired final value T3. It will also be understood that the ROM 107 serves as a recording medium which stores the wrenching torque control program. While the ROM 107 serving as the recording medium is fixedly provided in the microcomputer 104, the recording medium storing the wrenching torque control program may be removable from the control device 100. The recording medium may store the program either magnetically or optically. Namely, the recording medium may be a random-access memory, a hard disc, a floppy disc or a compact disc.

The illustrated embodiments are based on an assumption that the physical condition of the thread surfaces in the final phase is the same as that in the initial phase, and therefore the friction coefficient remains unchanged in the final phase. If the physical conditions of the thread surfaces in the initial and final phases are different from each other, the friction coefficient in the final phase is different from that in the initial phase. In this case, the friction coefficient of the thread surfaces contacting each other in the final phase can be estimated without actual detection, based on a predetermined ratio of the friction coefficient in the initial phase to the friction coefficient in the final phase. The desired final wrenching torque can be determined on the basis of the estimated friction coefficient.

That is, if the thread surface condition is different in the initial and final phases but the lubricating condition of the thread surfaces remains unchanged in the final phase, a difference in the friction coefficient in the initial and final phases is only due to a difference in the thread surface condition. Therefore, if a difference in the thread surface condition in the initial and final phases is known, a difference of the friction coefficient in the final phase from that in the initial phase can be obtained from the known difference of the thread surface conditions, even if the two friction coefficients vary from one set of two tubes to another set of two tubes, due to a variation in the lubricating condition of the thread surfaces of the tubes. Accordingly, the wrenching torque can be accurately controlled by taking account of the ratio of the two different friction coefficients in the initial and final phases, when the desired final wrenching torque is determined.

In the preceding embodiments, the initial wrenching torque value T1 is obtained, when the detected wrenching torque T has reached the preset value Tb, on the basis of the predetermined number of the stored torque values as counted from the torque value which is stored last just before the detected torque T has reached or exceeded the present value Tb. This predetermined number corresponds to the relative rotation angle of θ1 at which the initial wrenching torque value T1 is supposed to be obtained. However, the initial wrenching torque may be an average value T4 of torque values during a time period of the initial phase between two moments at which the relative rotation angle θ is θ0 and θ4, respectively, as indicated in the graph of FIG. 12. The end of the initial phase or the moment corresponding to the angle θ4 can be obtained based on a rate at which the wrenching torque T is increased.

Figure 22:
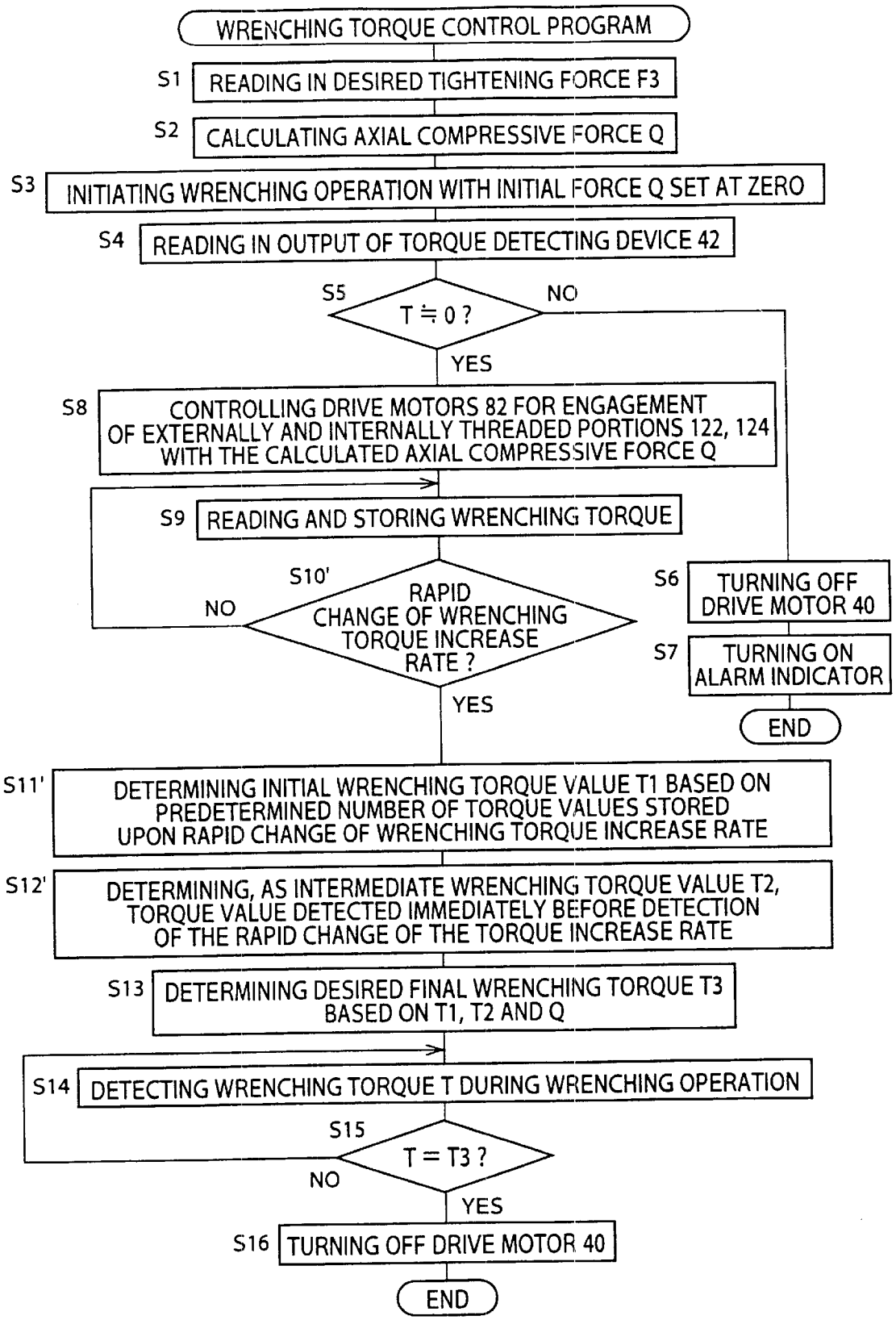
FIG. 22 is a flow chart illustrating a wrenching torque control program stored in a ROM of a control device of a tube connecting apparatus according to another embodiment of this invention.

Alternatively, the initial and intermediate wrenching torque values T1 and T2 can be determined on the basis of a rapid change in the rate of increase of the wrenching torque values stored in the RAM 108 in the wrenching operation. In this case, the wrenching torque control program illustrated in the flow chart of FIG. 5 is modified as illustrated in the flow chart of FIG. 22, wherein steps S10', S11' and S12' are implemented in place of steps S10, S11 and S12 of the flow chart of FIG. 5. Step S10' is provided to determine whether the rate of increase of the detected torque value has rapidly changed. This determination is effected on the basis of a difference between the two successively stored torque values one of which is stored last. That is, step S10' is provided to detect a transition from the initial phase to the intermediate phase, which transition corresponds to the relative rotation angle θ4 in FIG. 12. Step S11' is provided to determine the initial wrenching torque value T1 on the basis of a predetermined number of the stored torque values as counted from the last stored value. As described above with respect to step S11 of FIG. 1, this predetermined number corresponds to the relative rotation angle θ1. Step S12' is provided to determine, as the intermediate wrenching torque value T2, the torque value which was stored last just before the affirmative decision (YES) is obtained in step S10', that is, immediately before or upon the rapid change of the increase rate of the detected torque value is detected in step S10'.

The wrenching operation can be inspected for any abnormality. Namely, an upper limit and a lower limit are set for each of the wrenching torque and the relative rotation speed, for defining their optimum ranges. The tube connecting operation is determined to be performed in a normal manner, if the relative rotation speed is in the optimum range when the wrenching torque has reached its lower limit, or if the wrenching torque is in the optimum range when the relative rotation speed has been lowered to its lower limit. If either of the above two conditions is not satisfied, the tube connecting operation is determined to have some abnormality. The lower and upper limits of the optimum range of the wrenching torque are determined on the basis of the coefficients of friction between the two tubes which are determined on the basis of the initial and intermediate wrenching torque values T1 and t2 and the axial compressive force Q as described above. This inspection is more reliable than the inspection which uses measured or estimated friction coefficient values.

Figure 23:
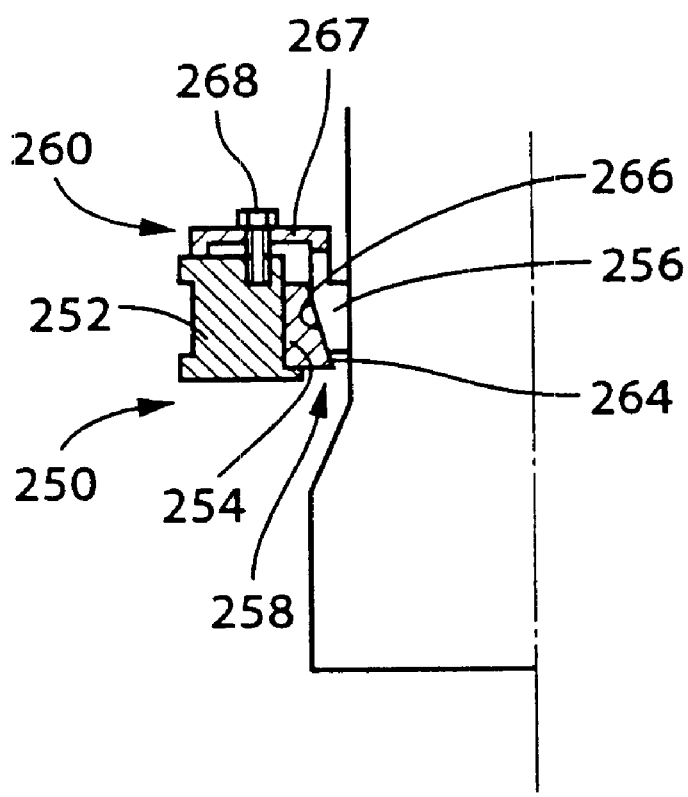
FIG. 23 is a view partly in cross section of a wrenching device in a tube connecting apparatus according to a further embodiment of this invention.

In the above embodiments, the driven gear 50 is fixed to the externally threaded tube 18 by the chucking device 54 shown in FIGS. 2A and 2B. However, a chucking device 250 as shown in FIG. 23 may be used in place of the chucking device 54.

The chucking device 250 includes an outer ring 252, an interposed member 258 including a first wedge member 254 and a second wedge member 256, and a pressing device 260.

The outer ring 252 has an inside diameter larger than the outside diameter of the large-diameter portion of the externally threaded tube 18. The driven gear 50 is fixedly fitted on the outer circumferential surface of the outer ring 252. In this embodiment, the drive gear 50 need not consist of two semi-circular halves, so that the rotary motion of the drive gear 48 driven by the rotary drive device 16 can be more smoothly transmitted to the drive gear 50. The annular upper end face of the outer ring 252 has a plurality of tapped holes for engagement with pressure screws 268 which will be described. The tapped holes are spaced from each other at a suitable spacing interval in the circumferential direction of the outer ring 242. The outer ring 252 further has a radially inward flange formed at the lower end of the inner circumferential surface. This flange 254 prevents removal of the first wedge member 254.

The first wedge member 254 consists of a plurality of part-cylindrical or arcuate pieces which cooperate to define a cylinder having a straight outer circumferential surface engaging the inner circumferential surface of the outer ring, and a tapered inner circumferential surface 264 whose inside diameter increases in the axial direction from the upper end toward the lower end. The plurality of part-cylindrical pieces of the first wedge member 254 are butted together in radial planes parallel to the axis of the first wedge member 254. The first wedge member 254 having the tapered inner circumferential surface is referred to as a first tapered cylindrical member.

The second wedge member 256 also consists of a plurality of part-cylindrical pieces which cooperate to define a cylinder having a tapered outer circumferential surface 266 engaging the tapered inner circumferential surface 254 of the first wedge member 254, and a straight inner circumferential surface engaging the outer circumferential surface of the externally threaded tube 18. Each of the part-cylindrical pieces of the second wedge member 254 has a plurality of axial slits extending parallel to the axis of the second wedge member 256, so that the second wedge member 256 can be deformed. The second wedge member 256 has an annular pressure portion 267 formed to extend from the annular upper end face in the radially outward direction. The pressure portion 267 has a plurality of through-holes which are spaced from each other in the circumferential direction of the second wedge member 256, at the same interval as that of the tapped holes formed in the first wedge member 254. The second wedge member 256 having the tapered outer circumferential surface 264 is referred to as a second tapered cylindrical member.

To fasten the driven gear 50 to the outer circumferential surface of the externally threaded tube 18, the first and second wedge members 254, 256 are disposed on the outer circumferential surface of the tube 18 such that the second wedge member 256 is tentatively fitted on the outer circumferential surface of the tube 18 while the first wedge member 254 is disposed below and radially outwardly of the second wedge member 256, with a partial engagement therebetween. Then, the outer ring 252 with the driven gear 48 fixedly fitted on its outer circumferential surface is fitted on the outer circumferential surface of the first wedge member 254. Successively, the second wedge member 256 is moved axially downward so that the second wedge member 256 is substantially fitted in the inner circumferential surface of the first wedge member 254. As a result, the second wedge member 256 is substantially interposed between the tube 18 and the first wedge member 254 inside the outer ring 252, such that the through-holes in the pressure portion 267 are aligned with the tapped holes formed in the outer ring 252 in the circumferential direction of the outer ring 252. Then, pressure screws 268 are screwed into the tapped holes through the through-holes, to slightly move down the pressure portion 267 with the second wedge member 256 so that the free end of the pressure portion 267 comes into contact with the upper end face of the outer ring 252. By tightening the pressure screws 268, the second wedge member 256 is completely fitted into the first wedge member 254, with a slight radially outward movement of the first wedge member 254 so as to radially outwardly force the outer ring 252, with a wedge effect produced by the tapered circumferential surfaces of the two wedge members 254, 256, whereby the outer ring 252 is fastened to the tube 18 through the wedge members 254, 256, so that a torque can be transmitted from the driven gear 50 to the tube 18. It will be understood that the pressure portion 267 having the through-holes and the pressure screws 268 to be screwed into the tapped holes in the outer ring 252 cooperate to function as a pressing device 260 for applying a tightening force between the outer ring 252 and the tube 18.

The outer ring 252 and the first wedge member 254 may be formed as an integral structure. In this case, the integral structure has a tapered inner circumferential surface having a smallest inside diameter which is larger by a suitable amount than the outside diameter of the tube 18. Further, it is possible that the first and second wedge members 254, 256 are interposed between the tube 18 and the outer ring 252 after the outer ring 252 has been positioned radially outwardly of the tube 18.

Figure 24:
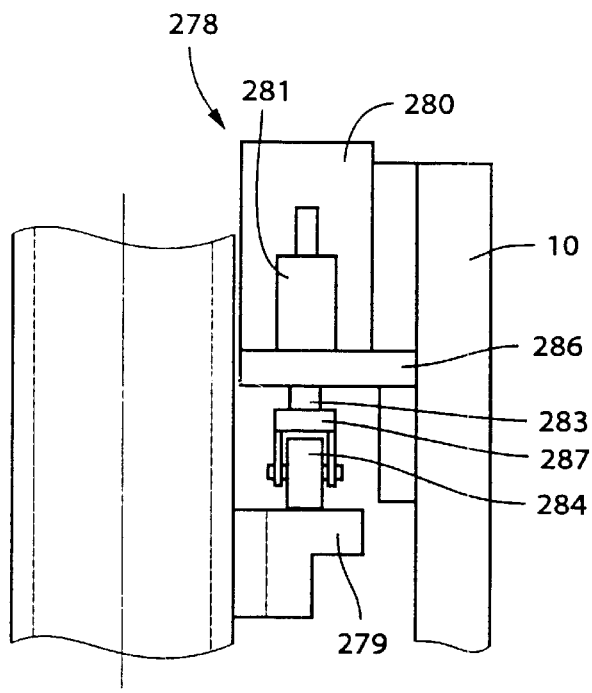
FIG. 24 is a side elevational view of an axial force applying device in a tube connecting apparatus according to a yet further embodiment of the invention.
Figure 25:
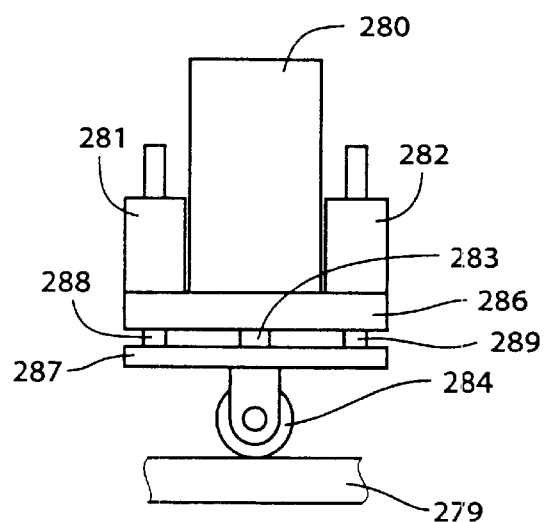
FIG. 25 is a front elevational view of the axial force applying device of FIG. 24.

Referring to FIGS. 24 and 25, there will be described an axial force applying device 278 provided in another embodiment of the invention, in place of the axial force applying device 20 provided in the preceding embodiments. The axial force applying device 278 includes an annular axial force applying member 279, a plurality of air cylinders 280, and a pair of guide devices 281, 282 for each air cylinder 280. The axial force applying member 279 is fixed to the tube 18 such that the member 279 is not movable relative to the tube 18 in the axial direction. The air cylinders 280 are fixed to the frame structure 10 such that the air cylinders 280 are not movable relative to the frame structure 10 in the axial direction of the tube 18. The two guide devices 281, 282 are disposed adjacent to respective diametrically opposed portions of the outer circumferential surface of the corresponding air cylinder 280. In the present embodiment, the two air cylinders 280 (one of which is shown in FIGS. 24 and 25) are fixedly disposed on the frame structure 10, at the respective positions which are spaced from each other by 180° a about the axis of the tube 18. Each air cylinder 280 has an axially movable piston, and a piston rod 283 fixed to the piston so as to extend downwardly. The piston rod 283 has a roller 284 rotatably fixed to its lower or free end. The roller 284 is held in rolling engagement with the annular axial force applying member 279. The rollers 284 carried by the two air cylinders 280 permit rotation of the tube 18.

Each air cylinder 280 is fixed to the frame structure 10 through a stationary flange 286, which is fixed the lower end of the air cylinder 280. The bodies of the guide devices 281, 282 are fixed to the stationary flange 286. The piston rod 283 extends through a movable flange 287 25 such that the movable flange 287 is fixed to an intermediate portion of the piston rod 283, for axial movement with the piston rod 283. To the movable flange 287, there are fixed two guide rods 288, 289 of the guide devices 281, 282 so that the guide rods 288, 289 are moved with the movable flange 287 in the axial direction of the tube 18. The guide rods 288, 289 are slidably supported by the bodies of the guide devices 281, 282 such that the guide rods 288, 289 are axially movable relative to the air cylinder 280. Thus, the piston rod 282 is connected to the guide rods 288, 289 through the movable flange 287, so that the piston rod 282 is guided by the guide devices 281, 282 in the axial direction, so as to prevent inclination of the piston rod 283 in the radial and circumferential direction of the tube 18.

With the air cylinders 280 being activated by pressurized air, the piston rods 283 are moved down with the pistons, to move down the tube 18 through the rollers 284 and the axial force applying member 279, with an axial force applied from the rollers 284 to the axial force applying member 279. The rollers 284 serve as axial force applying rollers. The air cylinders 280 may be replaced by hydraulic cylinders.

In the embodiments described above, the rotary drive device 16 including the electric motor 40 is supported by the driven gear 50 by engagement of the drive gear 48 with the driven gear 50 such that the axial dimension of the driven gear 50 is located between the collars 52, 52 of the drive gear 48. However, the rotary drive device 16 may be supported by the linear guide device 36. In this case, the linear guide device 36 includes a linear motor for moving a carriage which holds the electric motor 40, and this linear motor is controlled to axially move the carriage with the electric motor 40, in synchronization with the axial movement of the externally threaded tube 18, that is, at a feed rate calculated by the detected rotating speed of the electric motor 40. In this case, the rotary drive device 16 may include a timing belt. In the present modified arrangement, the drive gear 48 need not have the collars 52, so that the torque transmitted from the drive gear 48 to the driven gear 50 will not be influenced by a frictional contact between the collars 52 and the driven gear 48. Accordingly, the wrenching torque can be detected with improved accuracy. The linear guide device 36 is preferably provided with a stop device for holding the carriage and the electric motor 40 at a suitable position when the tube connecting apparatus is not in operation.

The linear guide device 36 may include a drive motor, and a motion converting device for converting a rotary motion of the drive motor into a linear movement of the above-indicated carriage. The axial feed rate of the tube 18 during the wrenching operation can be calculated by directly detecting the axial movement of the tube 18 by a suitable sensor, rather than by detecting the rotating speed of the electric motor 40.

Figure 26:
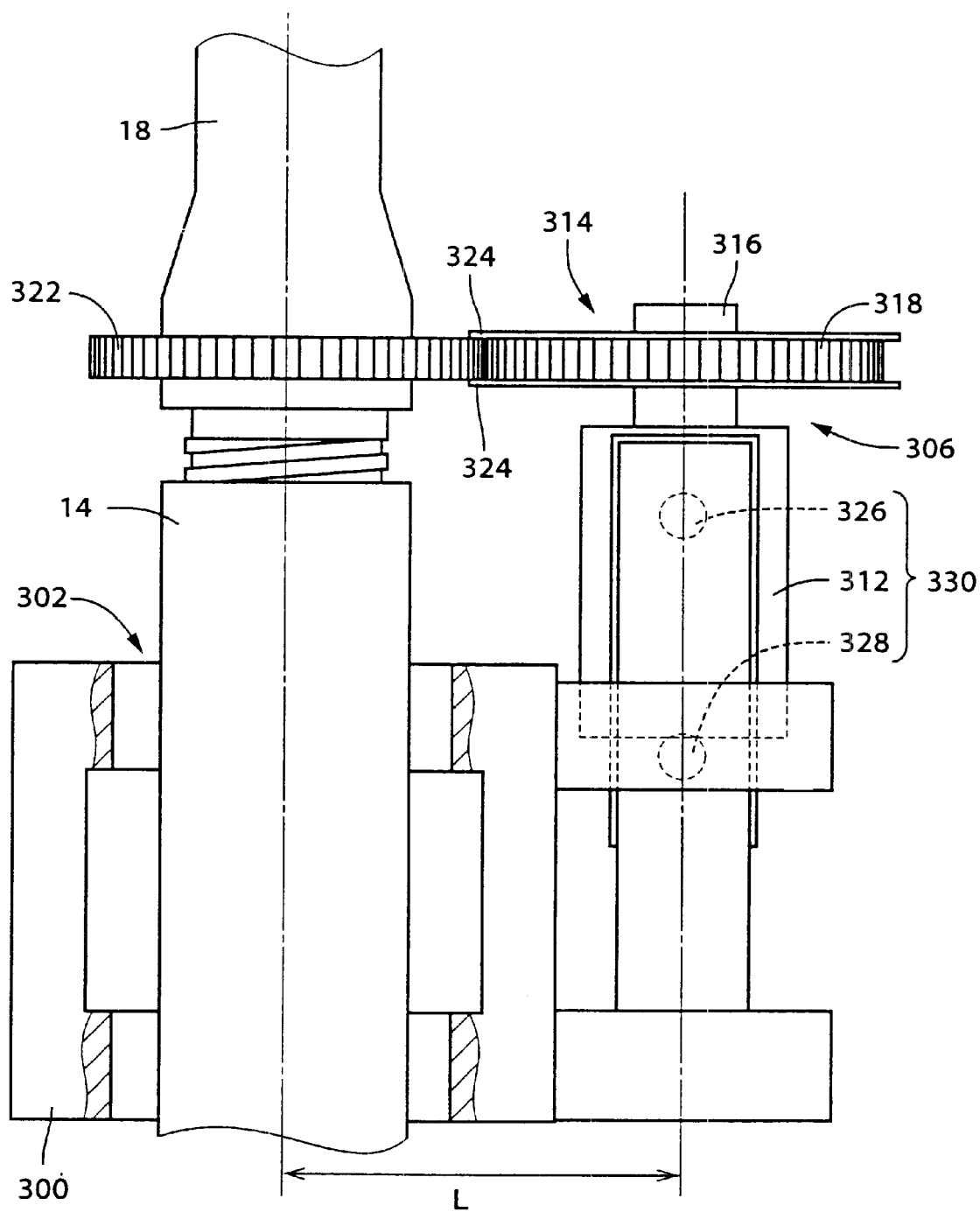
FIG. 26 is a front elevational view of a tube connecting apparatus according to another embodiment of this invention.
Figure 27:
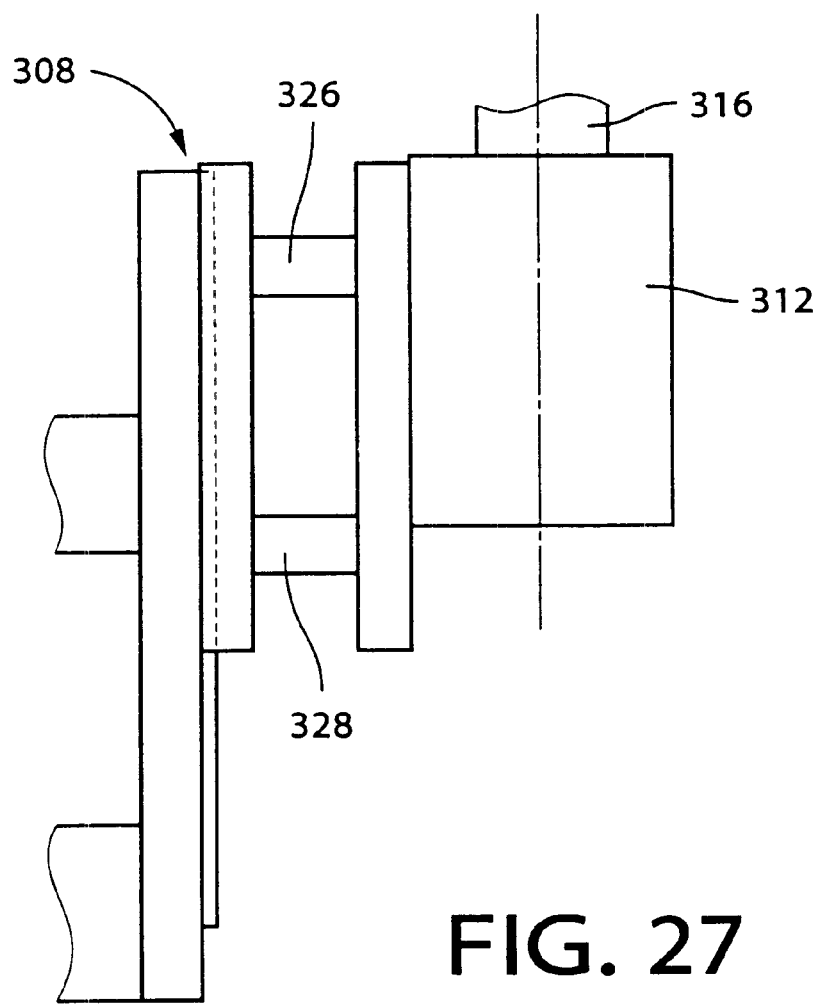
FIG. 27 is a fragmentary side elevational view of the tube connecting apparatus of FIG. 26.

Referring next to FIGS. 26 and 27, there will be described a tube connecting apparatus constructed according to a still further embodiment of the present invention, wherein an axial force is applied between the two tubes 18, 14, on the basis of the weights of the tube 18 and a rotary drive device 306.

The apparatus includes a frame structure 300 which has a clamping device 302 for holding the internally threaded tube 14 such that the tube 14 is not rotatable and axially movable relative to the frame structure 300. The rotary drive device 306 is slidably supported by the frame structure 300 through a guide device 308 such that the rotary drive device 306 is axially movable relative to the frame structure 300 through a guide device 308, but is not rotatable about the axis of the tube 14.

The rotary drive device 306 includes a rotary drive electric motor 312 and a rotary motion transmitting device 314. To an output shaft 316 of the electric motor 312, there is fixed a drive gear 318 so that the drive gear 318 is rotated with the output shaft 316. To the externally threaded tube 18, there is fastened a driven gear 322 by a suitable chucking device (not shown) such that the driven gear 322 meshes with the drive gear 318 and is rotated with the tube 18. With the drive gear 318 rotated by the electric motor 312, the driven gear 322 is rotated to rotate the tube 18. The drive gear 318 and the driven gear 322 constitute the rotary motion transmitting device 314. The drive gear 318 has a pair of collars, and the drive and driven gears 318, 322 mesh with each other such that the axial dimension of the driven gear 322 is located between the collars, so that the weight of the rotary drive device 306 acts on the tube 18 through the drive and driven gears 318, 322. In other words, the weight of the rotary drive device 306 including the electric motor 312 and the motion transmitting device 314 is applied as an axial compressive force acting between the two tubes 18, 14.

When the tube 18 is rotated by the electric motor 312, a force corresponding to a torque equal to a resistance to the rotation of the tube 18 relative to the tube 14 is applied to the electric motor 312 through the driven and drive gears 322, 318. A reaction force applied to the guide device 308 as a result of rotation of the tube 18 is detected by load cells 326, 328. The wrenching torque for rotating the tube 18 is represented by a product of the detected reaction force and a distance L between the centerline of the load cells 326, 328 and the axis of the tube 18. In the present embodiment, the two load cells 326, 328 are spaced apart from each other in the axial direction of the electric motor. A sum of the forces detected by these two load cells 326, 328 is a force acting on the electric motor 312 during rotation of the tube 18 by the electric motor 312. It will be understood that the load cells 326, 328 and a portion of the control device 100 assigned to calculate the wrenching torque constitute a torque detecting device 330.

In the present embodiment, the weight of the tube 18 and the weight of the rotary drive device 306 including the electric motor 312 act between the two tubes as an axial compressive force. Accordingly, the present embodiment does not use an exclusive axial force applying device. However, an exclusive axial force applying device may be provided as in the embodiment of FIG. 1.

Figure 28:
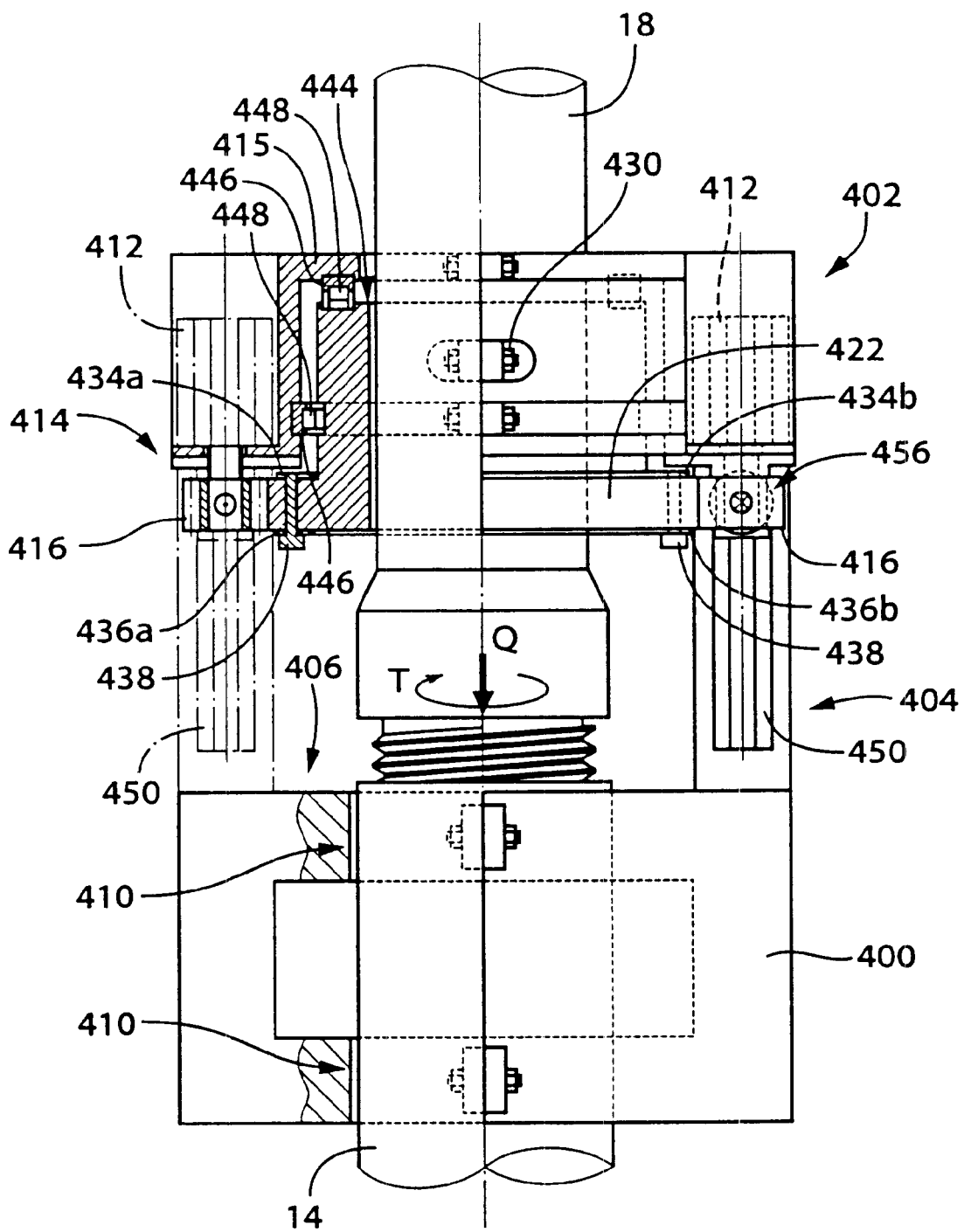
FIG. 28 is a front elevational view partly in cross section of a tube connecting apparatus according to still another embodiment of the invention.

A further embodiment of this invention will be described by reference to FIGS. 28–30. In this embodiment, a rotary drive device 402 is disposed on a frame structure 400 of the apparatus such that the rotary drive device 402 for rotating the externally threaded tube 18 is axially movable through a guide device 404, but is not rotatable about the axis of the tube 18. Further, a clamping device 406 is provided on the frame structure 400, for holding the internally threaded tube 14 such that the tube 14 is neither axially movable nor rotatable relative to the frame structure 400. The clamping device 406 has a frictional contact portion 410 in the form of a multiplicity of projections protruding radially inwardly from its inner circumferential surface. The frictional contact portion 410 in contact with the outer circumferential surface of the tube 14 prevents rotation of the clamping device 406 relative to the tube 14.

The rotary drive device 402 includes two rotary drive electric motors 412 and a rotary motion transmitting device 414. Each electric motor 415 is mounted on the guide device 404 through an annular motor support 415, which is axially movable relative to the frame structure 40 in the axial direction of the tube 18. A drive gear 416 in the form of a pinion is fixed to the output shaft of each electric motor 412 such that the drive gear 416 is rotatable with the output shaft. A rotary motion of the drive gear 416 is transmitted to a driven gear 422 fixed to the externally threaded tube 18, for rotating the tube 18. Thus, the drive gear 416 and the drive gear 422 constitute the rotary motion transmitting device 414.

In the present embodiment, the two electric motors 412 are located at respective two diametrically opposed circumferential positions of the annular motor support 415, that is, spaced apart from each other by 180° in the circumferential direction of the driven gear 422, The driven gear 422 is rotated by the two drive gears 416 which are also spaced apart from each other by 180° in the circumferential direction of the driven gear 422. In this arrangement, the radial forces and the tangential forces acting on the tube 18 at those two circumferential positions are mutually offset, preventing radial misalignment and inclination of the axis of the tube 18.

The driven gear 422 is disposed rotatably relative to the motor support 415. The driven gear 422, which is a generally cylindrical member, have teeth formed in a selected axial portion of its outer circumferential surface, namely, not formed over the entire area of the outer circumferential surface. Since the driven gear 422 is a generally cylindrical member having a sufficiently large axial dimension, the driven gear 422 has a sufficiently large area of contact with the tube 18 at its inner circumferential surface.

Figure 29:
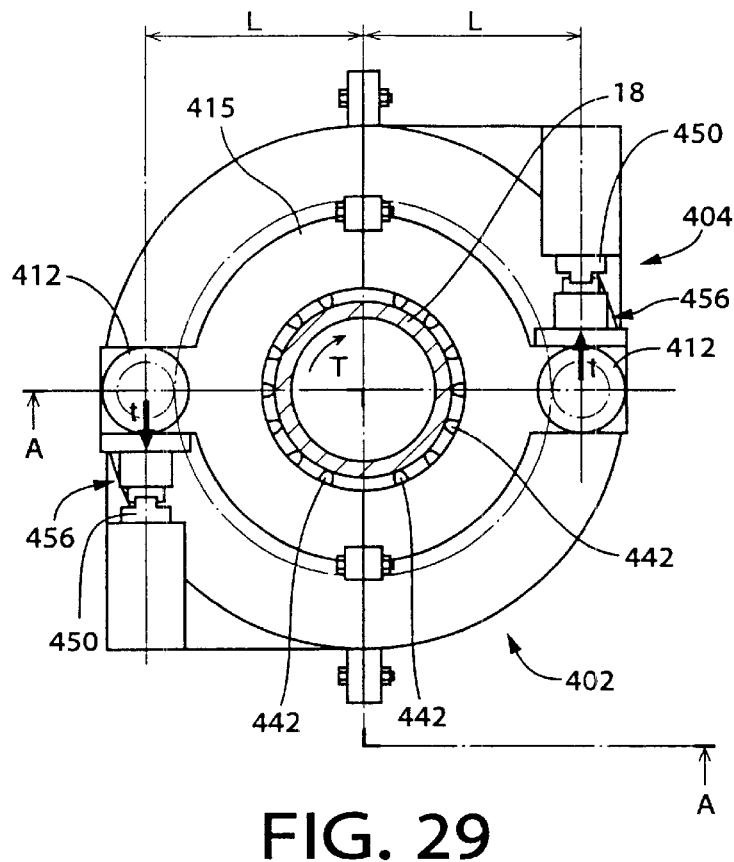
FIG. 29 is a plan view of the apparatus of FIG. 28.
Figure 30:
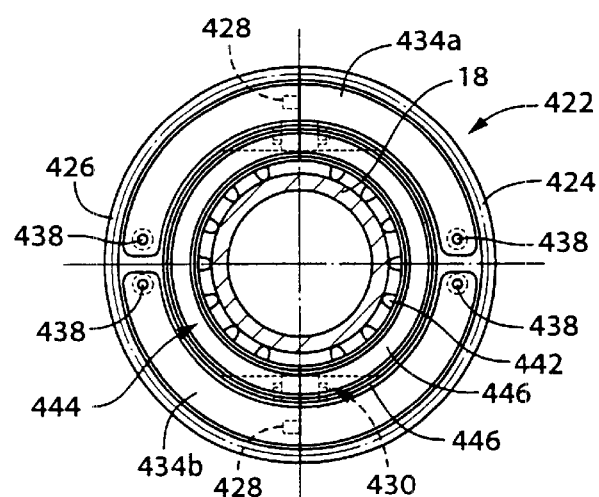
FIG. 30 is a plan view of a rotary motion transmitting device in the apparatus of FIG. 28.

The driven gear 422 consists of two semi-cylindrical halves 424, 426, as shown in FIGS. 29 and 30. The two halves 424, 426 are butted together and positioned by pins 428 relative to each other, and fixed to each other by screws and nuts 430, as shown in FIG. 30. The screws and the nuts 430 are received in respective cutouts formed in the outer circumferential surface of the cylindrical portion of the driven gear 422, as shown in FIGS. 29 and 30, in order to prevent an interference of the screws and the nuts 430 with the frame structure 400, when the driven gear 422 is rotated relative to the motor support 415. As shown in FIG. 28, a pair of semi-circular planar members 434a, 434b, and a pair of semi-circular planar members 436a, 436b are disposed at the opposite axial ends of the axial portion of the driven gear 422 in which the external teeth is formed. The two planar members 434 and the two planar members 436 are fixed to the driven gear 422 by respective pins 438 at circumferential positions of the driven gear 422 different from those at which the pins 428 are located, as shown in FIG. 30.

Like the clamping device 406, the driven gear 422 has a frictional contact portion 444 in the form of a multiplicity of protrusions 442 protruding radially inwardly from its inner circumferential surface. The frictional contact portion 422 in contact with the externally threaded tube 18 prevents rotation of the driven gear 422 relative to the tube 18. Reference sign 446 denotes annular rails, while reference sign 448 denotes rollers. These annular rails 446 and rollers 448, which are similar to the annular rails 90, 92 and the rollers 94 provided in the first embodiment of FIG. 1, function to permit rotation of the driven gear 422 relative to the motor support 415.

When the drive gears 416 are rotated by the electric motors 412, the driven gear 422 is rotated relative to the motor support 415, and the tube 18 is rotated. A rotary drive force corresponding to a resistance to the rotation of the tube 18 relative to the tube 14 is detected by two load cells 456 disposed between the two electric motors 412 and corresponding guide members 450 of the guide device 404 fixed to the frame structure 400. A sum 2$f$ of forces f detected by the two load cells 456 represents the rotary drive force applied to the tube 18. The wrenching torque for rotating the tube 18 is represented by a product of the sum 2$f$ and a distance L between the load cells 456 and the axes of the tubes 14, 18. In the present embodiment, the load cells 456 and a portion of the control device 100 assigned to calculate the wrenching torque constitute a torque detecting device for detecting the wrenching torque. The externally and internally threaded tubes 18, 14 are fixedly connected together in the same manner as described above.

Figure 31:
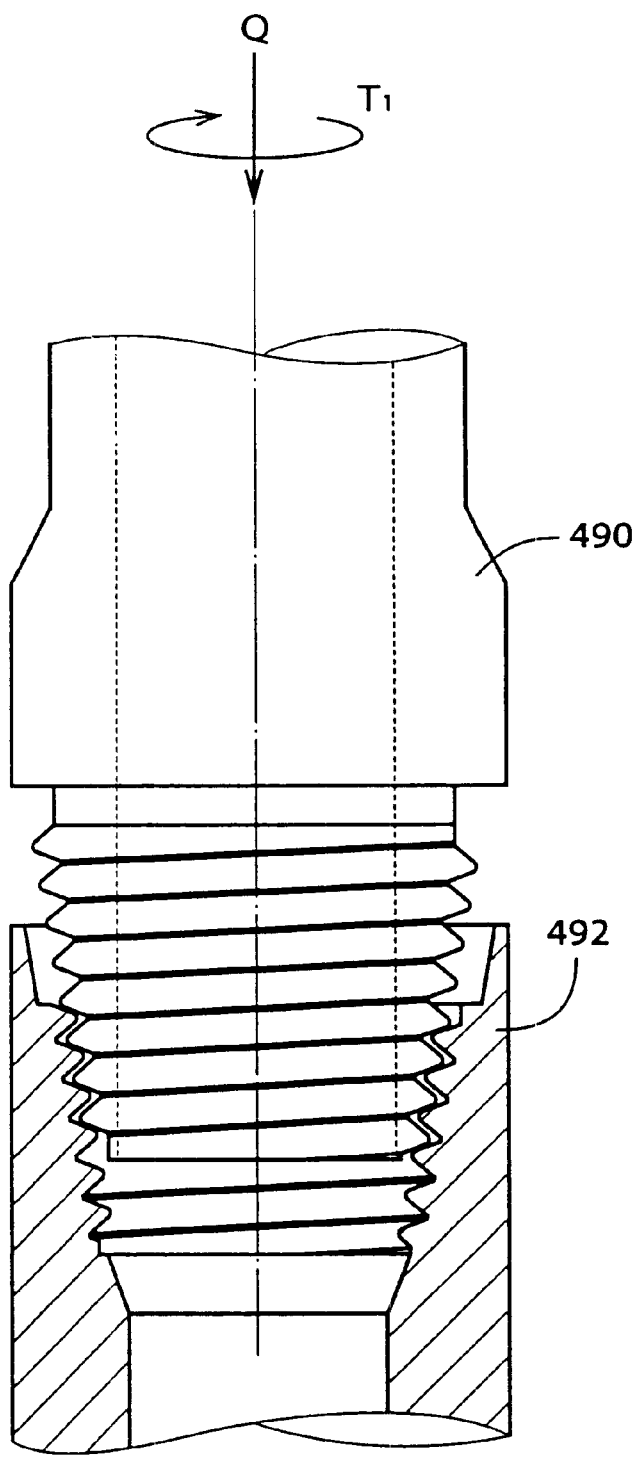
FIG. 31 is a view showing another set of two threaded tubes fixedly connected together by the tube connecting apparatus.

The externally and internally threaded portions of the externally and internally threaded tubes may have triangular threads as shown in FIG. 31, rather than the trapezoidal threads. Namely, the present invention is equally applicable to the tube connecting method and apparatus for fixedly connecting together externally and internally threaded tubes 490 and 492 having respective tapered triangular external and internal threads, as shown in FIG. 31. A tapered triangular thread satisfies a relationship represented by an equation $\cos(\gamma1-\beta)'=\cos(\gamma2+\beta)'$. According to this relationship, the above equation (16) is converted into the following equation (16'):

$$T3=(T1/Q+P/2\pi)\times F+T2\times(F+Q)/Q+(P/2\pi)\times F \quad (16')$$

When these two externally and internally threaded tubes 490, 492 are fixedly connected together, the desired final wrenching torque is obtained according to the above equation (16'). For example, the tapered triangular thread may have a configuration RSC according the API Standard, SPEC 7.

An experiment was conducted to measure the axial tightening force acting between the externally and internally threaded tubes which have been fixedly connected together by a method according to the principle of the present invention. This experiment was conducted on an experimental apparatus shown in FIG. 32, rather than on the tube connecting apparatus constructed according to the invention. On the experimental apparatus, there is fixed an internally threaded tube 500 which, as shown in FIG. 33, includes an outer portion 504 having a shoulder surface 502, and an internally threaded inner portion 506. The outer portion 504 is fixed to a frame structure 508 of the experimental apparatus. A rotation preventing rod 510 extends through the inner portion 506 in the radial direction of the inner portion 506, so that the inner portion 506 is supported by the frame structure 508 such that the inner portion 506 is axially movable relative to the outer portion 504. The internally threaded tube 50 is fixed at its outer portion 504 to a frame structure 508 of the experimental apparatus. The experimental apparatus includes a load cell 520 for detecting an axial tightening force acting on the inner portion 506 (an axial tightening force acting on the tube 500). The experimental apparatus further includes a rotary drive electric motor 424 for rotating an externally threaded tube 522, and a torque detecting device 528 for detecting a torsional torque applied to an output shaft 526 of the electric motor 524. The wrenching torque applied to the externally threaded tube 522 is detected on the basis of the output signal of the torque detecting device 528.

Figure 34:
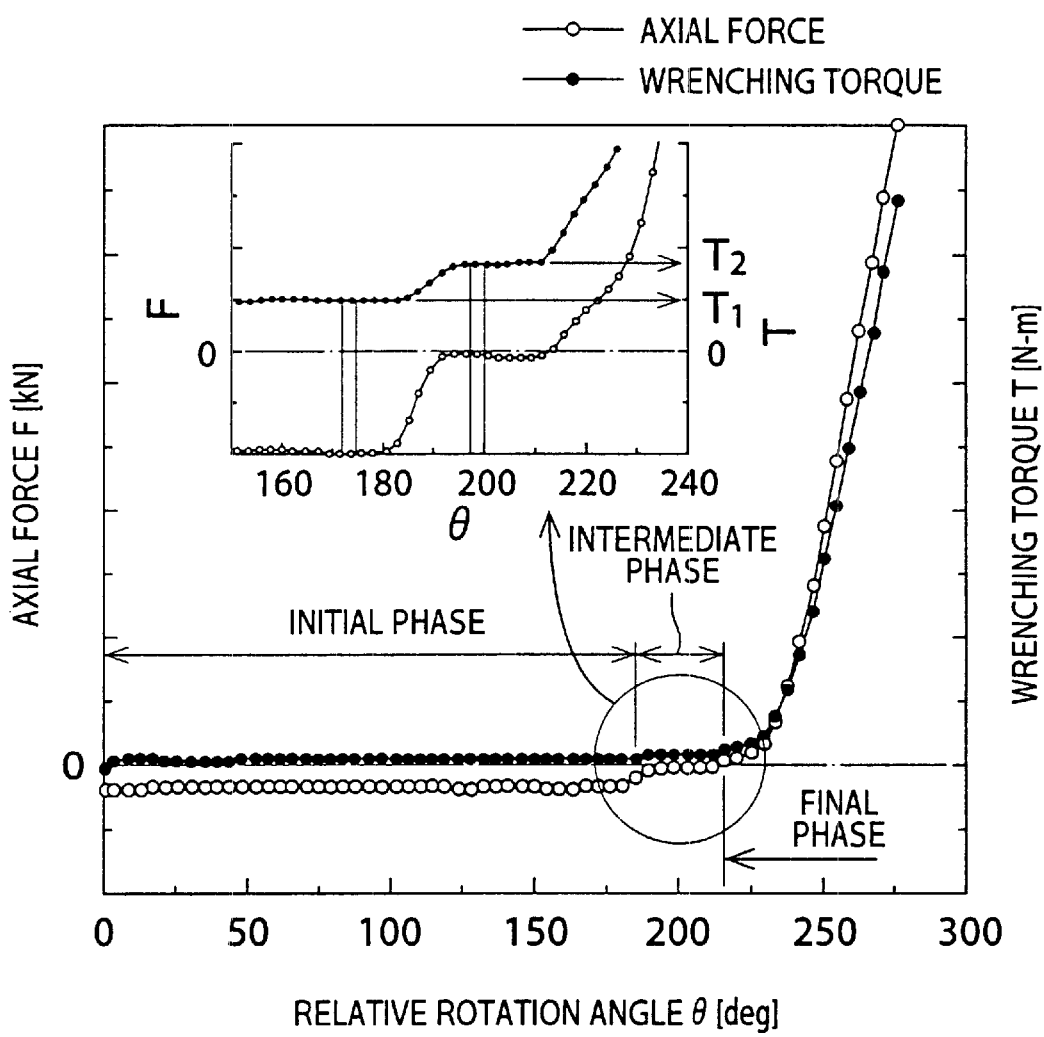
FIG. 34 is a graph showing results of an experiment conducted on the experimental apparatus according to the method of the invention.

The experiment was conducted on the experimental device described above, such that the internally and externally threaded tubes 500, 522 are fixedly connected together, with a constant axial compressive force applied to the tube 500. In this experiment, a wrenching torque T and a tightening axial force F changed with an increase in the angle of rotation of the tube 522 relative to the tube 500, as indicated in the graph of FIG. 34. As described above with respect to the first embodiment, the desired final wrenching torque was calculated on the basis of the actual initial and intermediate wrenching torque values T1 and T2 in the initial and intermediate phase of the wrenching operation, and the axial compressive force, and according to the above equation (17). The wrenching operation was terminated when the detected actual wrenching torque value has increased to the calculated desired final wrenching torque. In this condition, the axial tightening force was measured by the load cell 520. The tubes 500, 522 subjected to the experiment have tapered triangular threads RSC according to the API Standard, SPEC 7. The diameters of the threaded portions of the tubes 500, 522 are ¼ of the diameters of the threaded portions of the tubes which are actually used.

Figure 35A:
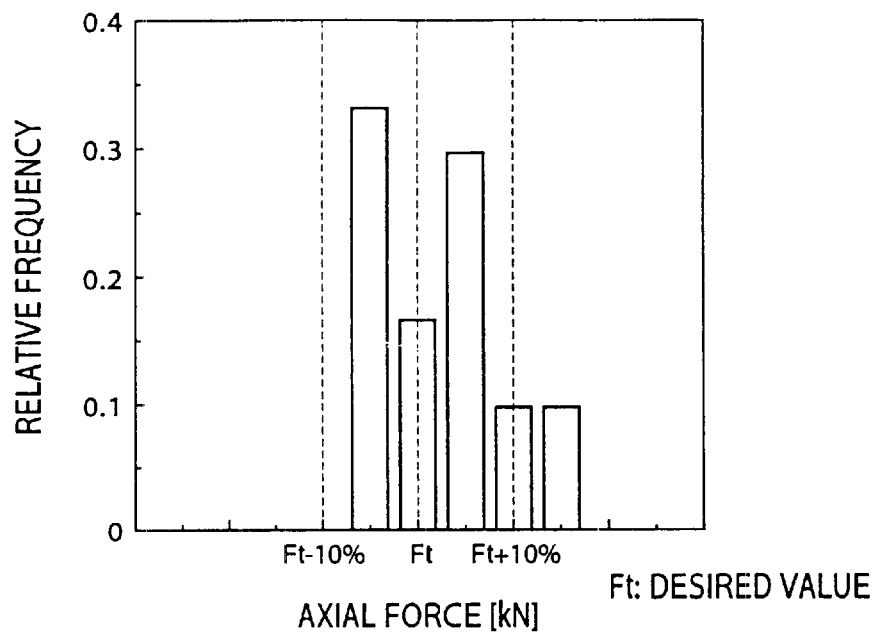
FIGS. 35A and 35B are graphs showing results of the experiment on the experimental apparatus.
Figure 35B:
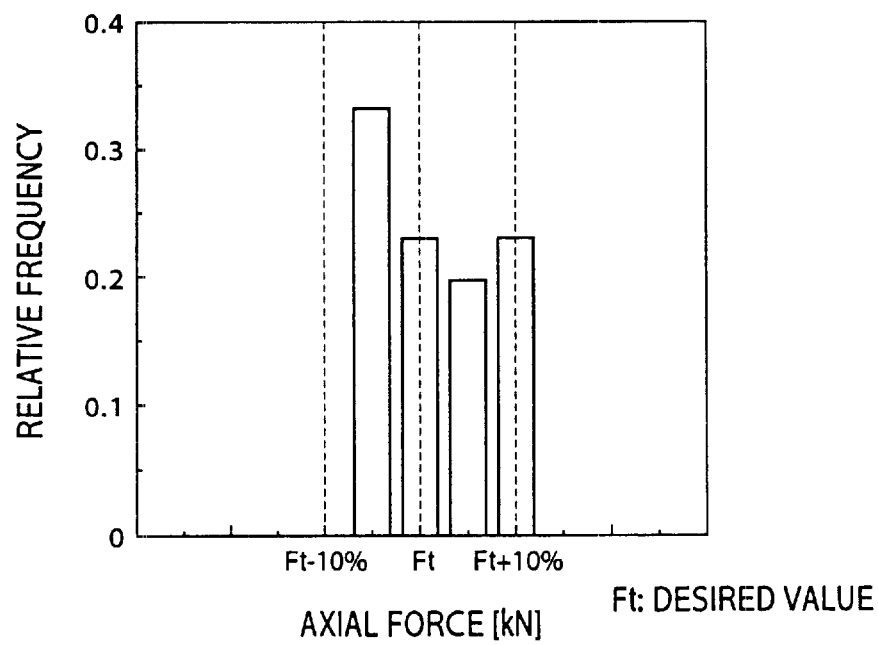

The graph of FIG. 35A indicates the axial tightening force values measured by the load cell 520, when the axial compressive force applied to the tube 500 was 500N, while the graph of FIG. 35B indicates the axial force values measured when the axial compressive force was 1000N. It will be understood from FIGS. 35A and 35B that at least 90% of the measurements of the axial tightening force was within a range of ±10% of the desired value Ft in either of the two cases, and that a variation in the axial tightening force acting on the two tubes when the desired final wrenching torque was reached was small. It will also be understood that the variation in the axial tightening force was smaller when the axial compressive force was relatively large than when it was relatively small.

Figure 32:
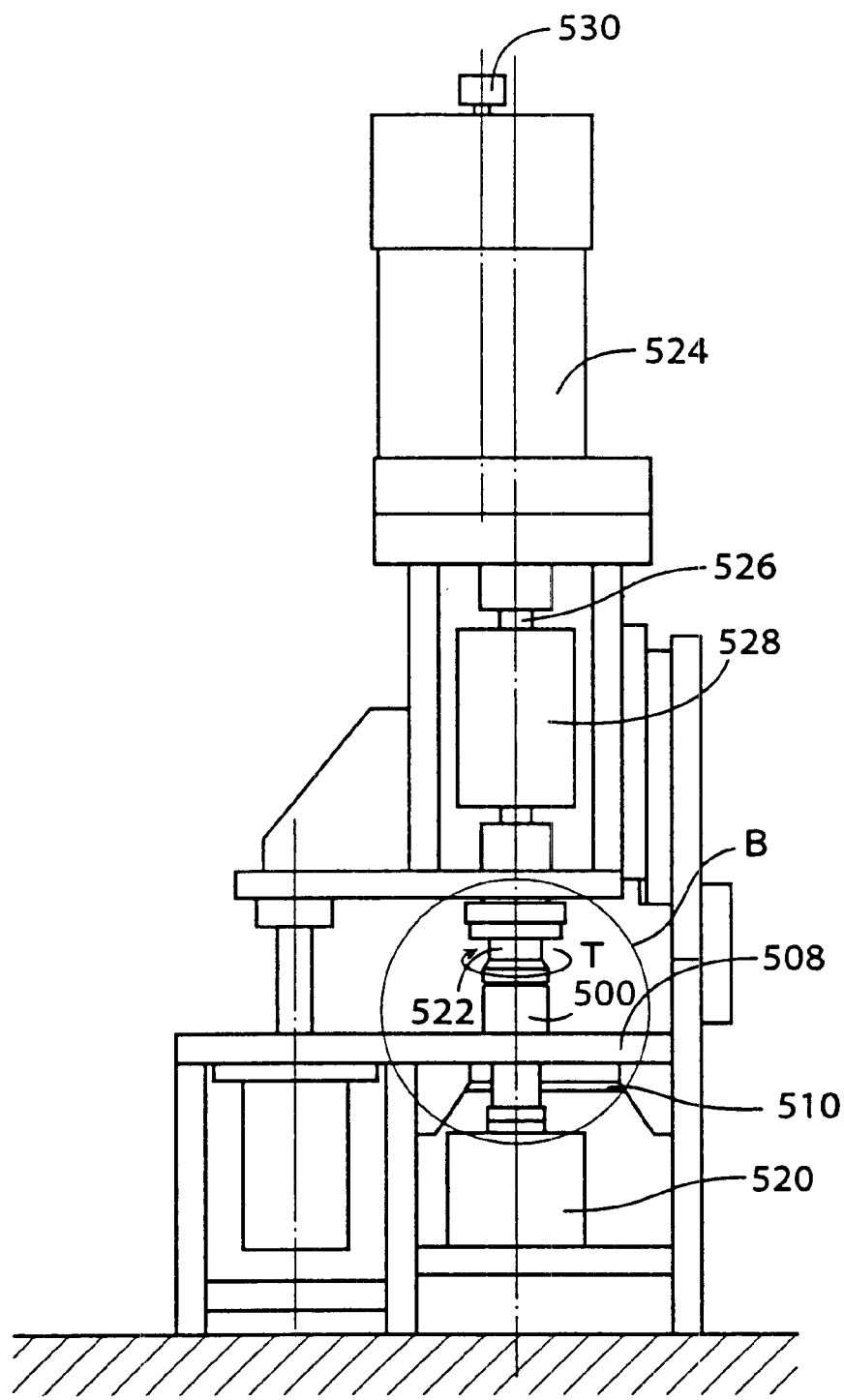
FIG. 32 is a front elevational view of an experimental apparatus adapted to perform and test a tube connecting operation so as to practice a tube connecting method according to the principle of the present invention.
Figure 33:
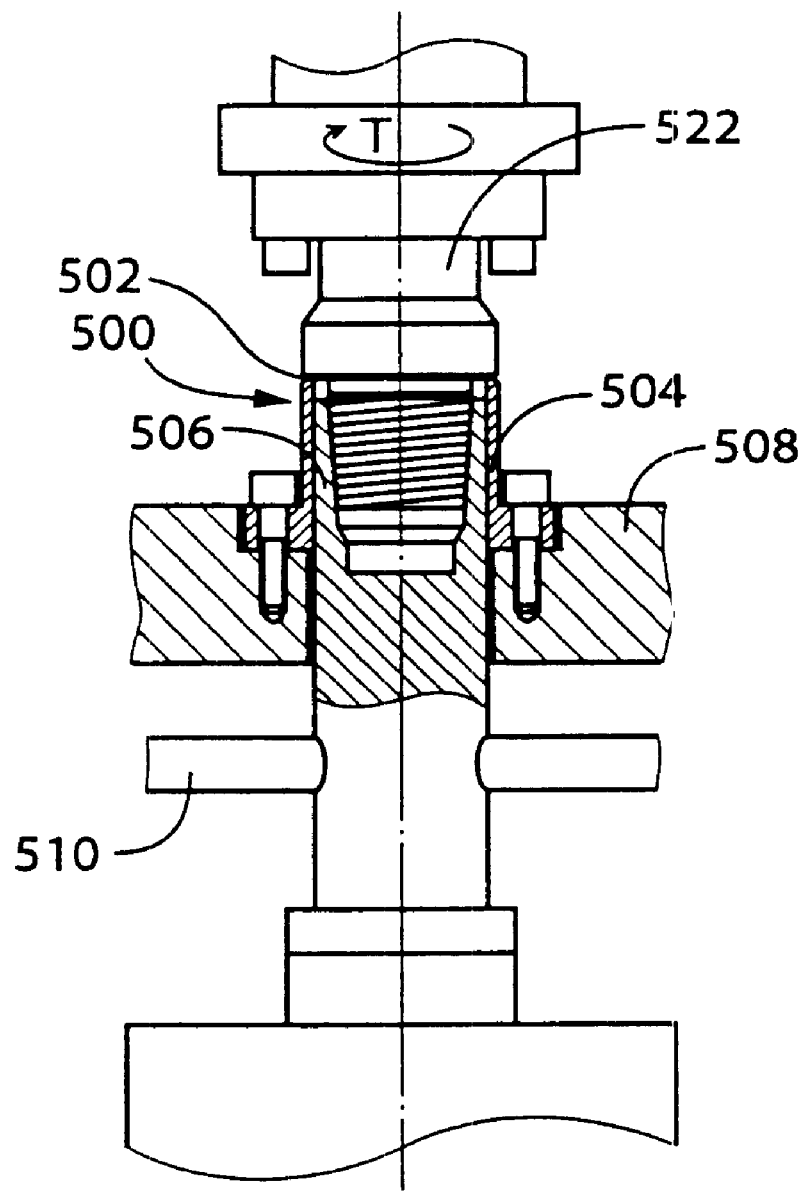
FIG. 33 is a fragmentary view showing the details of a portion of the experimental apparatus.
Figure 36:
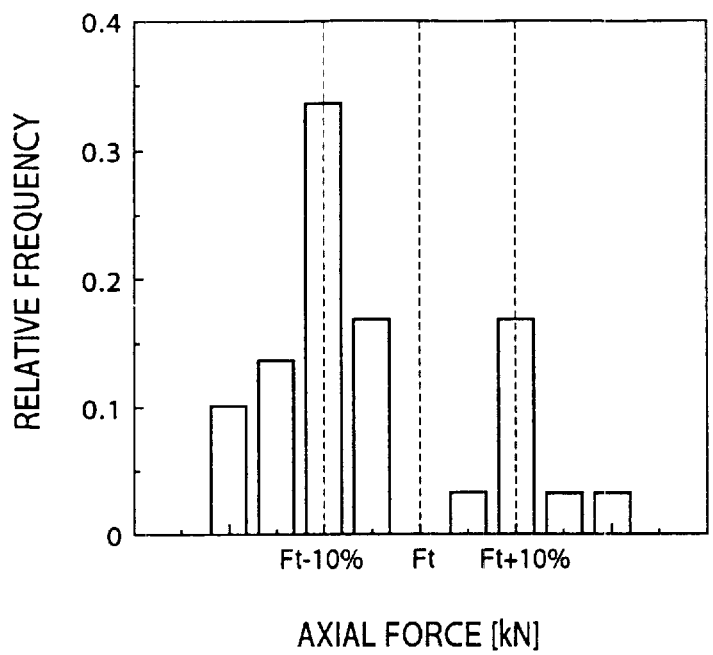
FIG. 36 is a graph showing results of an experiment conducted on the experimental apparatus according to a comparative method different from the method of the present invention.
Figure 37:
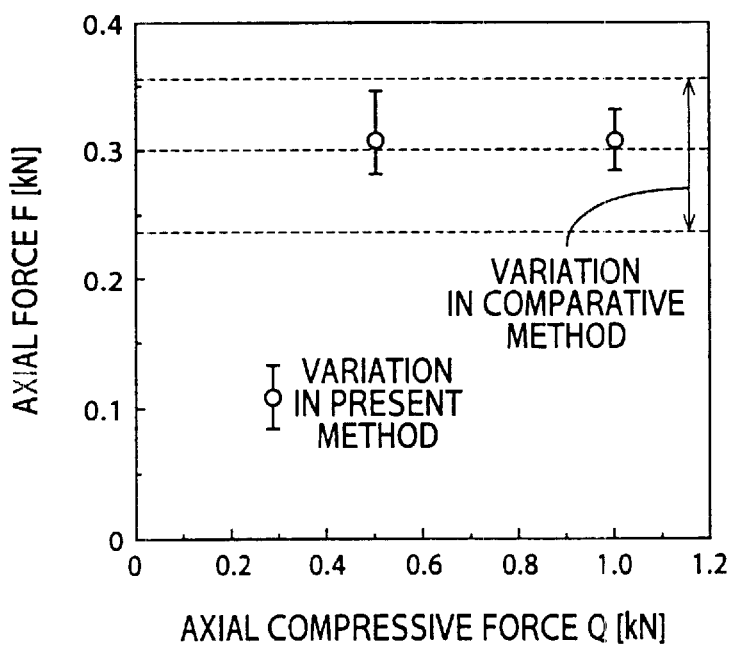
FIG. 37 is a graph showing results of the experiments conducted on the experimental apparatus according to the method of the invention and the comparative method.

A comparative experiment was conducted on the experimental apparatus of FIG. 32, without application of an axial compressive force applied between the two tubes 500, 522. In this comparative experiment, the tubes 500, 522 were tentatively tightened together with the wrenching torque being increased to a predetermined value, and were then released with the wrenching torque being reduced. A coefficient of friction at the shoulder surface 502 and a coefficient of friction at the internally threaded inner portion 506 of the tube 500 (an overall coefficient of friction between the internally and externally threaded tubes 500, 522) were estimated on the basis of rates of increase of the wrenching torque upon an abrupt increase and an abrupt reduction of the wrenching torque. The desired final wrenching torque was calculated on the basis of the estimated coefficients of friction. The wrenching operation was terminated when the detected actual wrenching torque value increased to the desired final wrenching torque value. The axial tightening force in this condition was measured. The results of the measurements are indicated in the graph of FIG. 36. It will be understood from FIG. 36 that the 90% of the measurements of the axial tightening force was within a range of ±20% of the desired value Ft. The graph of FIG. 37 shows the variation in the axial tightening force of the tubes connected together according to the present invention, in comparison with that of the tubes connected together according to the comparative method. It will be understood from FIG. 37 that the variation in the axial tightening force of the tube connected together according to the present invention was considerably smaller than that of the tubes connected together according to the comparative method.

There will be described still another embodiment of the present invention, wherein a method of fixedly connecting externally and internally threaded tubes is practiced on a tube connecting apparatus, according to a control program stored in a recording medium.

Figure 38:
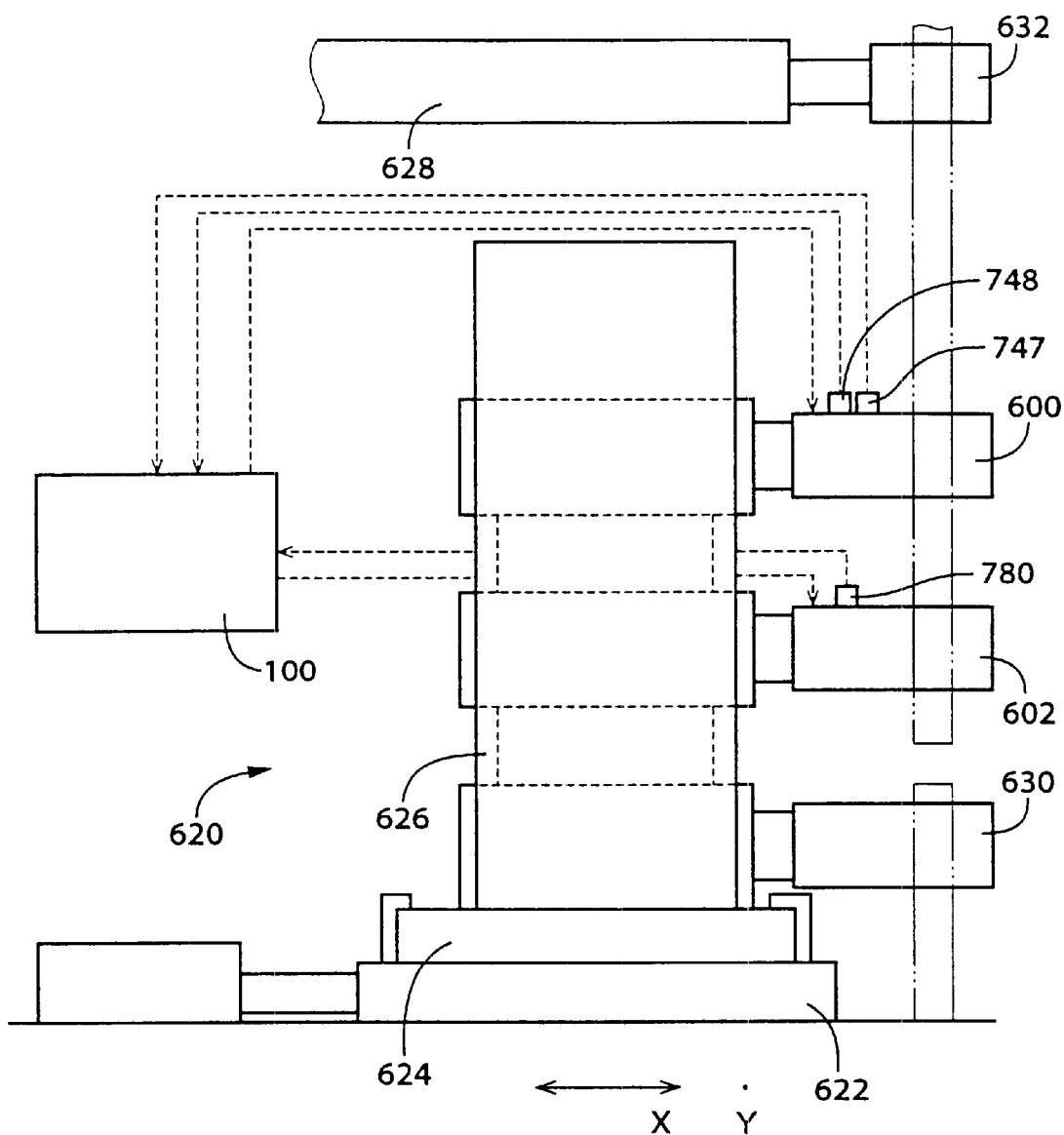
FIG. 38 is a front elevational view of a tube connecting apparatus according to a yet further embodiment of this invention.

As shown in FIG. 38, the tube connecting apparatus according to the present embodiment includes a relative rotation drive device in the form of a first rotary drive device 600 and a second rotary drive device 602. When the required final wrenching torque is relatively small, the first rotary drive device 600 is activated. When the required final wrenching torque is relatively large, the second rotary drive device 602 is activated. While the first rotary drive device 600 is arranged to rotate the externally threaded tube 18 by an electric motor, the second rotary drive device 602 is arranged to rotate the tube 18 by a hydraulic cylinder. The wrenching torque produced by the second rotary drive device 602 is detected by a hydraulic pressure in the hydraulic cylinder. An axial compressive force based on the weight of the tube 18 is applied to the tubes 14, 18 in the opposite axial directions toward each other.

The present tube connecting apparatus is mounted on a derrick (not shown). The apparatus has a frame structure 620, which includes: a first table 622 which is movable in an X-axis direction as shown in FIG. 38, toward and away from the two tubes 14, 18 to be fixed connected to each other by the present apparatus; a second table 624 is movable on and relative to the first table 622 in a Y-axis direction perpendicular to the X-axis direction; a portal frame 626 mounted upright on the second table 624; and a holder frame 628 which extends from a post of the derrick. The X-axis direction and the Y-axis direction are perpendicular to the axes of the tubes 14, 18.

On the portal frame 626, there are mounted the first and second rotary drive devices 600 and 602 and a clamping device 630, such that the first and second rotary drive devices 600, 602 are vertically movable by an elevator device (hydraulic cylinder) relative to the second table 624, and such that the clamping device 630 is not vertically movable. To the holder frame 628, there is attached a holder device 632 for holding the tube 18 such that the tube 18 is rotatable and axially movable relative to the holder device 632.

Figure 39:
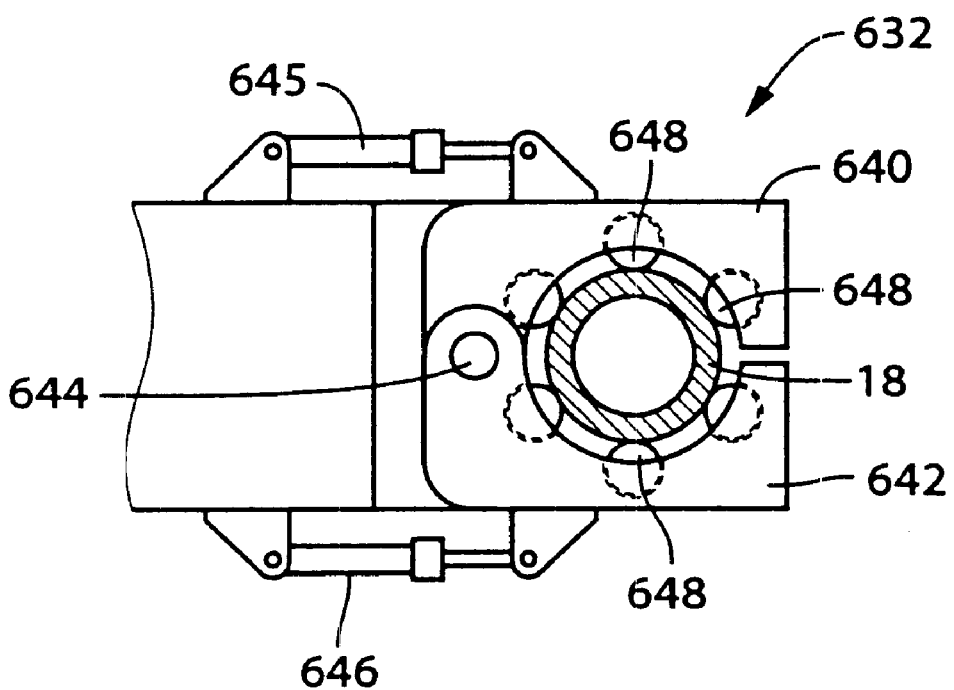
FIG. 39 is a plan view of a holder device provided in the apparatus of FIG. 38.

As shown in FIG. 39, the holder device 632 includes a pair of clamp arms 640, 642, a pin 644 connecting the clamp arms 640, 642 at one end of each clamp arm, and a pair of clamp cylinders 645, 646 for pivoting the clamp arms 640, 642 about the pin 644 relative to each other, between a non-clamping position and a clamping position. Each clamp arm 640, 642 carries a plurality of bearing balls 648 for contact with the outer circumferential surface of the tube 18 when the claim arms 640, 642 are placed in the clamping position. The bearing balls 648 permit the tube 14 to be rotatable and axially movable relative to the holder frame 628.

Figure 40:
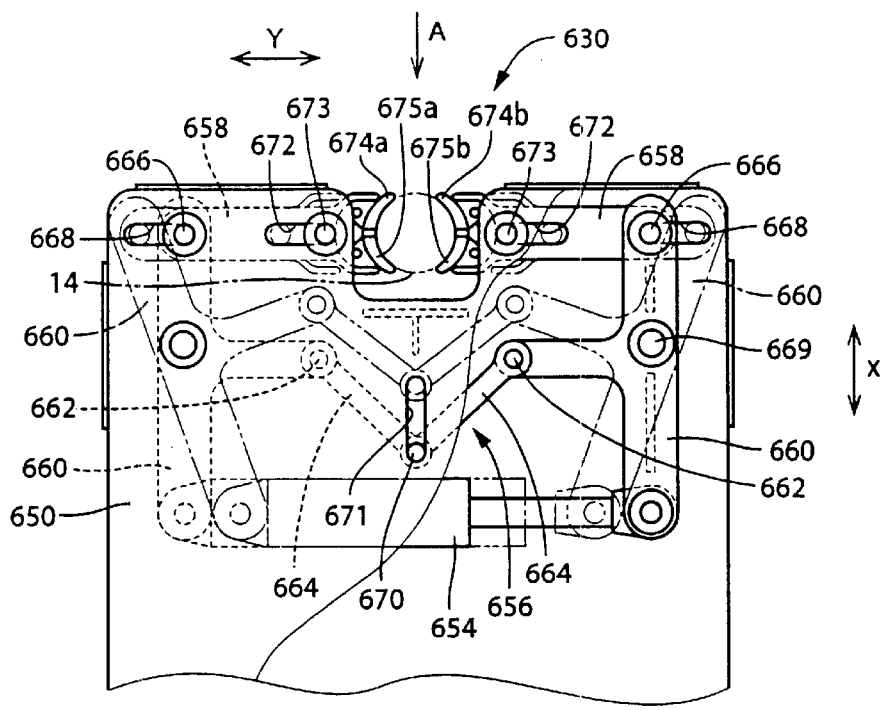
FIG. 40 is a plan view of a clamping device provided in the apparatus of FIG. 38.
Figure 41:
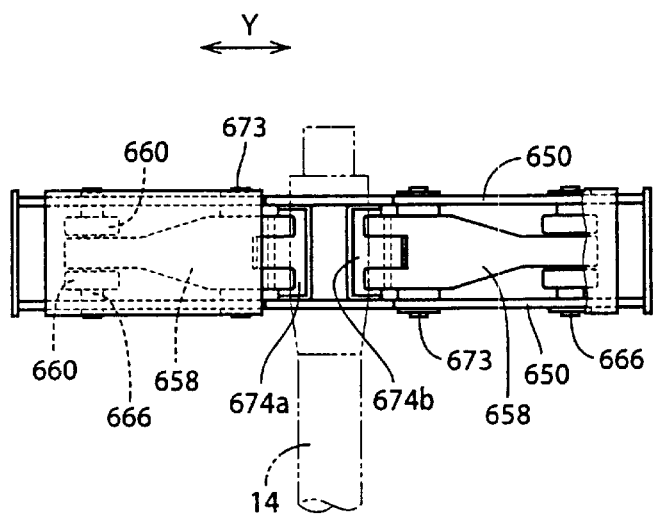
FIG. 41 is a view taken in the direction of arrow A in FIG. 40.

The clamping device 630 is hydraulically operated. As shown in FIGS. 40 and 41, the clamping device 630 includes: a body in the form of a pair of frames 650; a hydraulic cylinder 654; a link mechanism 656 activated by the hydraulic cylinder 654; and a pair of clamp rods 658 operable by the link mechanism 656 between its clamping position and non-clamping position.

The link mechanism 656 includes a pair of first link members 660 each of which is generally T-shaped, and a second link members 664 which are connected by respective pins 662 to intermediate projecting portions of the respective first link members 660. A clamp rod 658 is connected through a pin 666 to one end of each of the two first link members 660, and the pin 666 is held in engagement with elongate holes 668 formed in the frames 650. The two first link members 666 are connected at the other ends to each other by the hydraulic cylinder 654. Each first link member 666 is pivotable relative to the frame 650 about a pin 669 provided its intermediate portion. The second link members 664 are connected through a pin 670 to each other, and the pin 670 is held in engagement with elongate holes 671 which are formed in an almost central portion of the frames 650, so as to extend in the X-axis direction.

Each of the clamp rods 658 is held in engagement, at the end portion remote from the first link member 660, with a corresponding one of a pair of elongate holes 672 formed in the frames 650, through a pin 673, so that the clamp rods 658 are attached to the frame 650 such that the clamp rods 658 are movable relative to the frame 650.

A pair of clamping members 674a and 675a, or 674b and 675b are attached to an end portion of each clamp rod 658, which end portion is located on the side of the tube 14 to be clamped by the clamp rods 658. Each of these two clamping members 674, 675 is a curved wedge member which is adapted to be in abutting contact with the end of the corresponding clamp rod 658, at one of its opposite curves surfaces which is remote from the tube 14. The clamping members 674, 675 are movable by a small distance in the circumferential direction of the tube 14 while the clamping members 674, 675 are in abutting contact with the clamp rod 658.

When the hydraulic cylinder 654 is placed in a non-operated state, it is placed in its non-clamping position indicated in two-dot chain line in FIG. 40. When the hydraulic cylinder 654 is operated, it is brought to its clamping position. The tube 14 is clamped by the pair of clamp rods 658 which have been moved toward each other by the link mechanism 656. When a clockwise direction is applied to the tube 14, the clamping members 674, 675 are slightly moved in the clockwise direction, the clamping force is boosted by a wedge effect provided by the clamping members 674b, 675a which are substantially opposed to each other diametrically of the tube 14. At the same time, the two second link members 664 are connected to each other for engagement with each other through the elongate holes 671 formed in the central portion of the frames 650, so as to prevent an asymmetric operation of the link mechanism 656 in the Y-axis direction by operation of the hydraulic cylinder 564.

Figure 42:
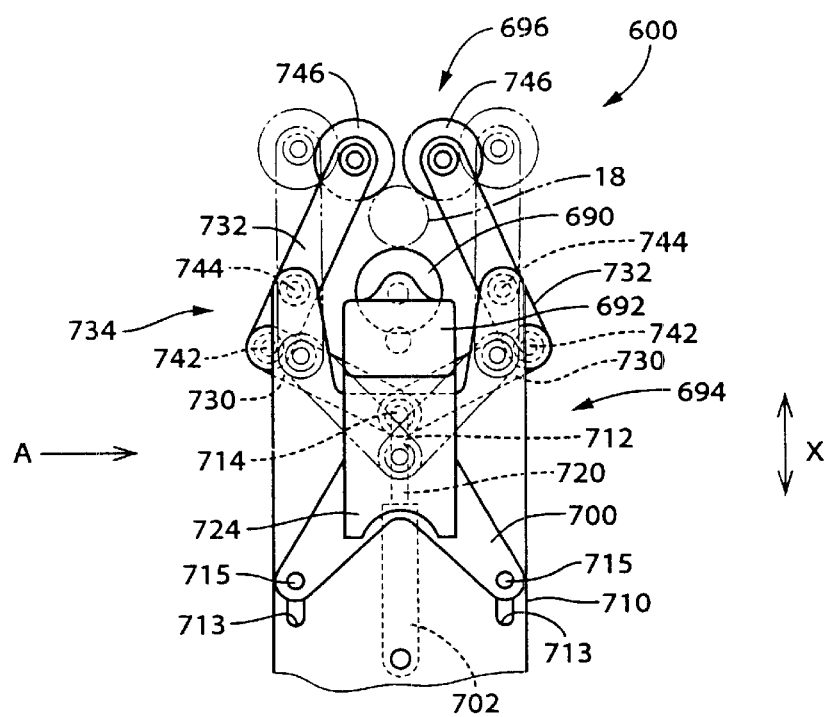
FIG. 42 is a plan view of a first rotary drive device of the apparatus of FIG. 38.
Figure 43:
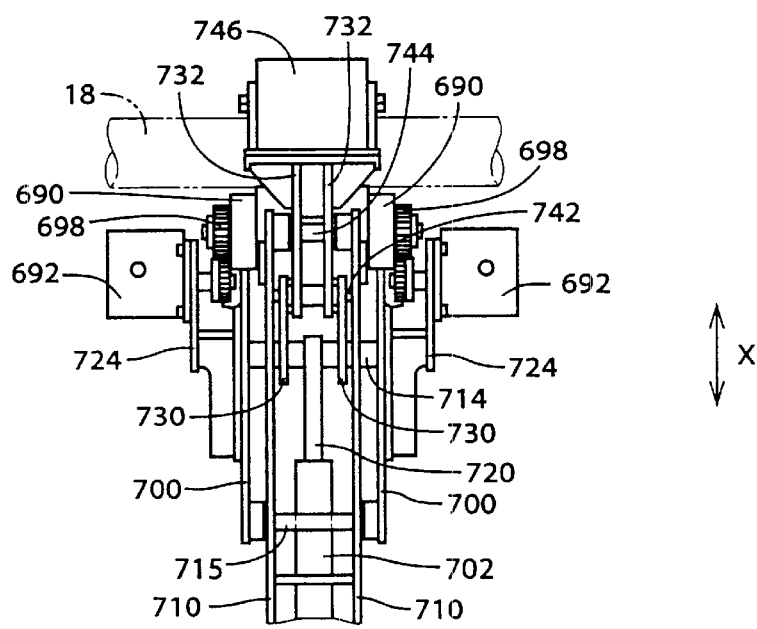
FIG. 43 is a view of the first rotary drive device taken in the direction of arrow B in FIG. 42.

As shown in FIGS. 42 and 43, the first rotary drive device 600 includes: two rollers 690; two roller drive motors 692 for rotating the respective rollers 690; a feeding device 694 for moving the rollers 690 and the electric motors 692 to a drive position at which the roller 690 contacts the outer circumferential surface of the tube 18, and a non-drive position at which the rollers 690 are spaced apart from that outer circumferential surface; and a pressing device 696 for forcing the tube 18 onto the roller 690.

Each roller 690 is connected to the corresponding electric motor 692 through a speed reducer 698, and is rotated in the opposite directions by operation of the electric motor 692. The feeding device 694 includes two feeding plates 700, and a hydraulic cylinder 702 for feeding the feeding plates 700. Each feeding plate 700 is connected to a body of the first rotary drive device 600 in the form of a pair of frames 710, through pins 714, 715 which extend through an elongate hole 712 formed in an almost central part of each frame 710, and a pair of elongate holes 713 formed in respective end portions of the frame 710. A piston rod 720 of the hydraulic cylinder 702 is connected to the pin 714, so that the feeding plates 700 are moved by an operation of the hydraulic cylinder 702. The two rollers 690 are rotatably attached to the respective feeding plates 700, and the electric motors 692 are attached to respective mounting members 724.

The pressing device 696 includes a pair of first link members 730 and a pair of second link members 732. The first link members 730 are connected to each other and to the frame 710 through the pin 714 indicated above, each at one of its opposite ends, and connected to the second link members 732 through pins 742, at the other ends. The second link members 732 are held in engagement with the frame 710 through pins 744, at their intermediate portions, such that the second link members 732 are pivotable relative to the frame 710. To the other ends of the second link members 732 remote from the first link members 730, there are rotatably attached respective presser rollers 746.

When the hydraulic cylinder 702 is placed in its non-operated state, the feeding plates 700 are placed in their retracted position, while the pressing device 696 is placed in a non-pressing state. In this state, the rollers 690 and the presser rollers 746 are spaced apart from the outer circumferential surface of the tube 18. When the hydraulic cylinder 702 is operated with a movement of the piston rod 720, the feeding plates 700 are brought into their operated position, and the pressing device 696 is brought into its pressing state, so that the rollers 690 and the presser rollers 746 are brought into contact with the outer circumferential surface of the tube 18. Thus, the tube 18 is forced by the presser rollers 746 onto the rollers 690. When the electric motors 692 are operated in this condition, the tube 18 is rotated, and the first rotary drive device 600 is moved as a whole in the axial direction of the tube 18, as the tube 18 is rotated. In the present embodiment, the operation of the feeding device 694 causes the rollers 690 to be brought into contact with the outer circumferential surface of the tube 18, while at the same time causing the presser rollers 746 to be brought into contact with the outer circumferential surface of the tube 18, so that the tube 18 can be held without a centering error or eccentricity.

Since the two electric motors 692 and the two feeding plates 700, etc. of the feeding device 694 are provided on the respective two frames 710, the two electric motors 692 can be operated synchronously with each other, and the two rollers 690 can be rotated synchronously with each other. It is also noted that the outer circumferential surface of each roller 690 has a friction coefficient high enough to prevent rotation of the roller 690 relative to the tube 18.

The electric motors 692 are provided with an encoder 747 as indicated in FIG. 38, to detect a rotating angle of the electric motors 692. On the basis of the rotating angle of the electric motors 692, the angle of rotation of the tube 18 is determined. Further, a torque detecting 748 is attached to the output shaft of the electric motors 692, so that the wrenching torque applied to the tube 18 is detected by the torque detecting device 748.

In the present embodiment, the tube 18 is kept rotated by the first rotary drive device 600 until the rotating angle of the electric motors 692 has reached a predetermined value, which is determined so that the actual wrenching torque value when the predetermined rotating angle has been reached is close to the maximum wrenching torque value that can be established by the electric motors 692. The tube 18 can be rotated by the electric motors 692 of the first rotary drive device 600 with higher efficiency than when the tube 18 is rotated by the second rotary drive device 602 which will be described.

As in the first embodiment, the friction coefficients are obtained on the basis of the initial and intermediate wrenching torque values in the initial and intermediate phases of the wrenching operation. Described more specifically, the friction coefficients are obtained on the basis of the initial and intermediate wrenching torque values while the tube 18 is rotated by the first rotary drive device 600, and the above-indicated maximum wrenching torque value is obtained as the desired final wrenching torque value, on the basis of the obtained initial and intermediate wrenching torque values.

The rotation of the tube 18 by the electric motors 692 is terminated when the actual wrenching torque value detected by the torque detecting device 748 has increased to the predetermined value. In this respect, it is noted that the torque detecting device may be adapted to detect the wrenching torque on the basis of an electric current flowing through the electric motors 692. The electric motors 692 may be replaced by hydraulic motors. In this case, the torque detecting device may be adapted to detect the wrenching totorque on the basis of the hydraulic pressure in the hydraulic motors.

Figure 44:
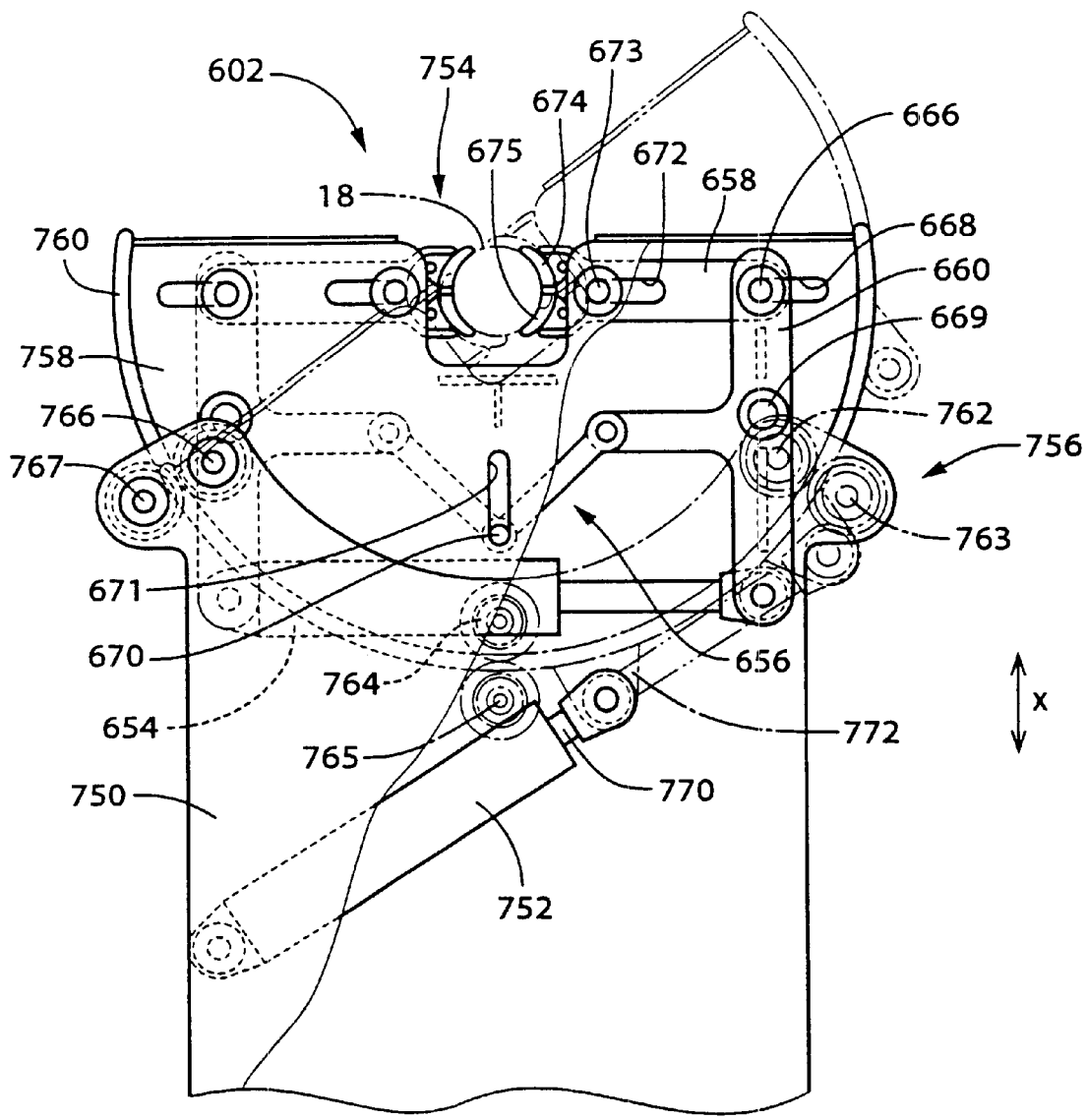
FIG. 44 is a plan view of a second rotary drive device of the apparatus of FIG. 38.

As shown in FIG. 44, the second rotary drive device 602 includes a pair of frames 750, a hydraulic cylinder 752 mounted on the frames 750, a chucking device 754 disposed rotatably relative to the frames 750, and a motion converting device 756 for converting a linear motion of a piston rod of the hydraulic cylinder 752 into a rotary motion.

The chucking device 754 includes a pair of rotary discs 758 disposed rotatably relative to the frames 750. Since the chucking device 754 is similar in construction with the clamping device 630 described above, the same reference signs as used for the clamping device 630 are used to identify the corresponding components, and a detailed description of the chucking device 754 will not be provided. The rotary discs 758 correspond to the frames 650 described above.

The motion converting device 756 includes: a cylindrical rim 760 formed along the outer periphery of each rotary disc 758; three pairs of guide rollers 762–767 disposed on the frames 750 such that the two guide rollers rollers of each pair sandwich the cylindrical rim 760 of the rotary disc 758; and a bracket 772 which extends radially outwardly from the rotary disc 758. The rotary disc 758 is a plate which has a semi-circular shape having a center on the axis of the tube 18, as indicated in FIG. 44, and which has the cylindrical rim 760 extending along the semi-circular periphery of the plate. A piston rod 770 of the hydraulic cylinder 752 is connected to the bracket 772.

When the piston rod 770 is moved upon operation of the hydraulic cylinder 752, the rotary discs 756 are rotated about the axis of the tube 18, by a predetermined angle, while being guided by the guide rollers 762–767, so that the tube 18 is accordingly rotated.

As shown in FIG. 38, the present apparatus uses a hydraulic pressure detecting device 780 for detecting the hydraulic pressure in the hydraulic cylinder 752, so that the wrenching torque applied to the tube 18 is detected on the basis of the hydraulic pressure of the hydraulic cylinder 752. The hydraulic pressure detecting device 780 may be adapted to directly detect the hydraulic pressure in the hydraulic cylinder 752, or a hydraulic pressure in a fluid passage connected to the hydraulic cylinder 752. In the present embodiment, the hydraulic pressure detecting device 780 and a portion of the control device 100 assigned to obtain the wrenching torque on the basis of the detected hydraulic pressure constitute a torque detecting device.

When the detected actual wrenching torque value is smaller than the desired final wrenching torque value, the rotary discs 758 are rotated by the predetermined angle, and then the chucking device 754 is brought into its non-clamping position, and the rotary discs 758 are restored to the original position. In this state, the chucking device 754 is again placed in the clamping position, and then the rotary discs 758 are rotated by the hydraulic cylinder 752. This series of operations is repeatedly implemented until the actual wrenching torque has increased to the desired wrenching torque (tightening torque). This, the present embodiment is adapted to rotate the tube 18 by operation of the hydraulic cylinder 752, so that the relatively large wrenching torque for rotating the tube 18 can be obtained.

The tube 18 may be rotated by the first rotary drive device 600 in the initial phase of the wrenching operation, and by the second rotary drive device 602 in both of the intermediate and final phases. In this case, the friction coefficients of the tubes 18, 14 are obtained on the basis of the wrenching torque values determined by the detected hydraulic pressure of the hydraulic cylinder 752, and the wrenching torque values determined by the detected operating state of the electric motors 692, so that the desired final wrenching torque value is obtained on the basis of the obtained friction coefficients.

In the embodiments described above, the clamping device 12, 302, 406, 630 or the frame structure 10, 300, 400, 620 have two halves or clamping members having a closed position for clamping the tube 14 and an open position in which the tube 14 can be inserted between the two halves or clamping members by a radial movement of the tube 14 before the tube 14 is clamped by the two halves or clamping members in the closed position. However, this arrangement is not essential, and the clamping device or frame structure may have an annular clamping portion in which the tube 14 is inserted by an axial movement of the tube 14. Similar modification applies to the chucking device 54, 250, 754 for fastening the driven gear 50, 322, 422 to the tube 18.

Figure 45:
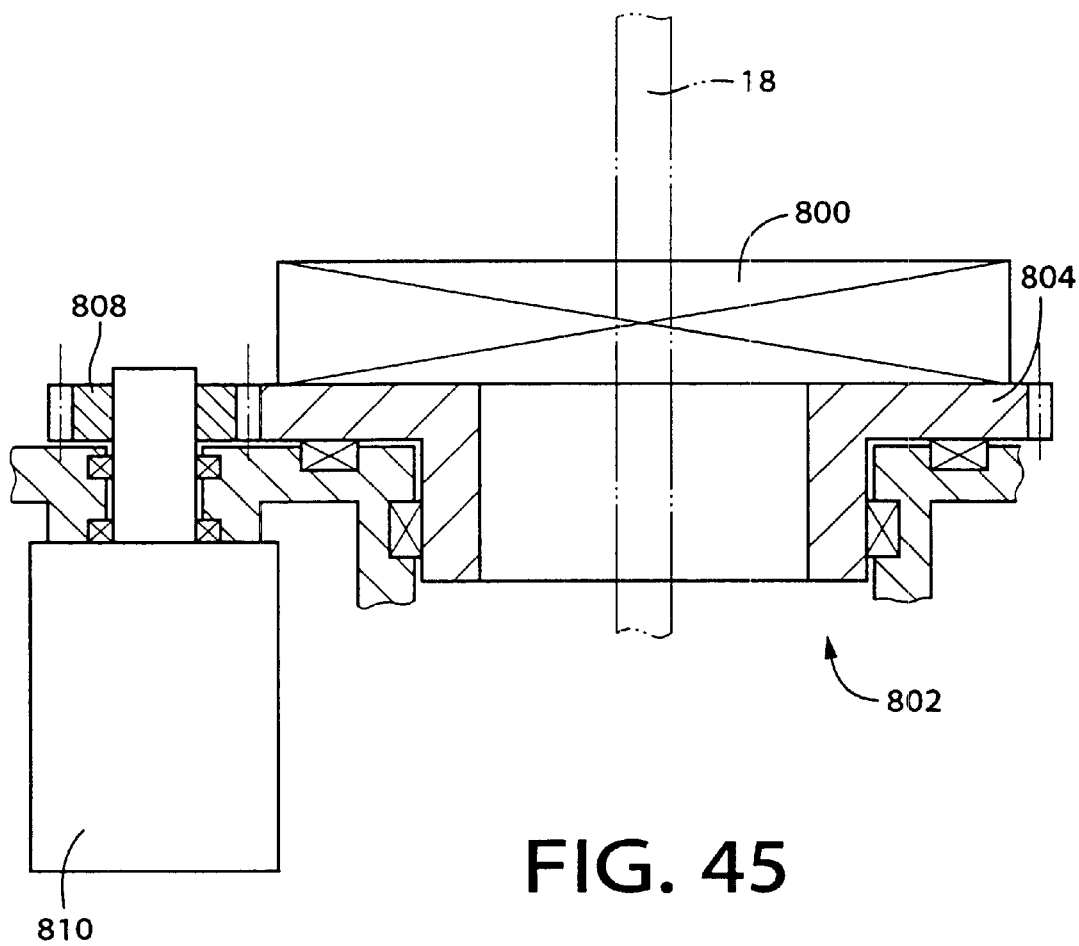
FIG. 45 is an elevational view partly in cross section of a rotary drive device provided in a tube connecting apparatus according to a further embodiment of the invention.

An example of such a modification as applied to a driven gear 804 of a rotary drive device 802 is shown in FIG. 45. In this example, the rotary drive device 802 for rotating the externally threaded tube 18 includes a chucking device 800 in place the chucking device 754. In this chucking device 800, an annular clamping portion is provided in place of the clamping members 674, 675. The tube 18 is inserted through the annular clamping portion of the chucking device 800 while the clamp rods 658 are placed in the non-clamping position. Then, the clamping rods 658 are moved toward each other to the clamping position for clamping the tube 18. In the present modification, the body of the chucking device 800 is fixed to the driven gear 804, and a hydraulic motor 810 is mounted on the frame structure of the apparatus such that a drive gear 808 fixed to the output shaft of the hydraulic motor 810 meshes with the driven gear 808. With the tube 18 clamped by the chucking device 800, the hydraulic motor 810 is operated to rotate the chucking device 800 together with the tube 18. This arrangement permits rotation of the tube 18 throughout the wrenching operation from the initial phase to the final phase, while controlling the hydraulic motor 810 in a desired one of different operating states, for instance, in one of a low-torque high-speed state and a high-torque low-speed state. In the low-torque high-speed state, the hydraulic motor 810 is operated by a pressurized fluid delivered from a hydraulic pump whose delivery pressure is relatively low and whose delivery flow rate is relatively high. In the high-torque low-speed state, the hydraulic motor 810 is operated by a pressurized fluid delivery from a hydraulic pump whose delivery pressure is relatively high and whose delivery flow rate is relatively low.

In the illustrated embodiments, the externally and internally threaded tubes are fixedly connected together while the axes of the tubes extend in the vertical direction. However, the tubes may be connected together while their axes extend in the horizontal direction. Although the illustrated embodiments are adapted such that the externally threaded tube is located above the internally threaded tube, the reverse positioning is possible, that is, the internally threaded tube may be located above the externally threaded tube.

While the several presently preferred embodiments of this invention have been described above for illustrative purpose only, it is to be understood that the present invention may be embodied with various changes and improvements, such as those described in the SUMMARY OF THE INVENTION, which may occur to those skilled in the art.

What is claimed is:

1. An apparatus for performing a wrenching operation to fixedly connect together an externally threaded tube having an externally threaded portion and an internally threaded tube having an internally threaded portion, said apparatus comprising:

a rotary drive device for rotating said externally and internally threaded tubes relative to each other with said externally and internally threaded portions engaging each other;

an axial force applying device for applying an axial force to said tubes for at least a portion of a period in which said tubes are rotated by said rotary drive device relative to each other, without generation of a tightening force between said tubes;

a torque detecting device for detecting a wrenching torque applied by said rotary drive device to said tubes for relative rotation thereof while said axial force is applied to said tubes by said axial force applying device;

a physical quantity obtaining device for obtaining a physical quantity relating to a coefficient of friction between said tubes, on the basis of the wrenching torque detected by said torque detecting device and said axial force applied by said axial force applying device; and a terminating condition determining device for determining a terminating condition for terminating said wrenching operation, on the basis of said physical quantity obtained by said physical quantity obtaining device.

2. An apparatus according to claim 1, wherein said rotary drive device comprises:

a rotary drive source;

a clamping device for clamping one of said externally and internally threaded tubes to a frame structure of the apparatus such that said one of said tubes is not rotatable relative to said frame structure; and a rotary motion transmitting device including a chucking device which holds the other of said tubes such that said other tube is not rotatable relative to said chucking device, said rotary motion transmitting device transmitting a rotary motion of said drive source to said other tube through said chucking device.

3. An apparatus according to claim 2, wherein said chucking device includes a plurality of part-cylindrical members which are butted together at opposite ends of each of said part-cylindrical members in planes parallel to an axis of said other tube, said part-cylindrical members cooperating to form a cylindrical clamping structure of split type which has an axis aligned with the axis of said other tube and which is disposed radially outwardly of said other tube, for contact with an outer circumferential surface of said other tube to hold said other tube.

4. An apparatus according to claim 3, wherein said cylindrical clamping structure has a locking portion projecting in an axial direction thereof from axial end faces of at least two of said plurality of said part-cylindrical members, said cylindrical clamping structure being locked at said locking portion for holding said other tube.

5. An apparatus according to claim 2, wherein said chucking device includes an annular member having an inside diameter larger than an outside diameter of said other tube, and an interposed member which is interposed between an inner circumferential surface of said annular member and an outer circumferential surface of said other tube, such that said wrenching torque is transmittable from said annular member to said other tube.

6. An apparatus according to claim 5, wherein one of said annular member and said interposed member has a first tapered inner circumferential surface whose diameter increases in one of opposite axial directions of said annular member, and said interposed member has a second tapered outer circumferential surface whose diameter decreases in said one of said opposite axial directions, said interposed member further having an inner circumferential surface whose diameter is constant in said opposite axial directions, said interposed member consisting of a plurality of part-cylindrical wedge members which are butted together in planes parallel to said axis of said other tube when said part-cylindrical wedge members are pressed in said one of said opposite axial directions into an annular gap between said first tapered inner circumferential surface and the outer circumferential surface of said other tube, for holding said other tube such that the wrenching torque is transmittable from said annular member to said other tube, said chucking device further including a pressing device for pressing said plurality of part-cylindrical wedge members of said interposed member into said annular gap.

7. An apparatus according to claim 2, wherein said rotary drive device includes one of an electric motor and a fluid-actuator motor.

8. An apparatus according to claim 1, wherein said rotary drive device is a hydraulically operated rotary drive device including a hydraulic cylinder, a chucking device for clamping said other tube, and a motion converting device for converting a linear motion of said hydraulic cylinder into a rotary motion of said chucking device, said other tube being rotated by rotation of said chucking device by operation of said hydraulic cylinder.

9. An apparatus according to claim 1, wherein both of said externally and internally threaded tubes are positioned so as to extend in a vertical direction, and said axial force applying device includes a vertically holding device for holding one of said tubes such that a weight of said one tube acts as said axial force between said externally and internally threaded portions of said tubes.

10. An apparatus according to claim 1, wherein said axial force applying device includes a forcing device for applying said axial force to said externally and internally threaded tubes such that said tubes are forced toward each other by said axial force.

11. An apparatus according to claim 1, wherein said rotary drive device includes a clamping device for clamping one of said externally and internally threaded tubes to a frame structure of the apparatus such that said one tube is not rotatable relative to said frame structure, said rotary drive device rotating the other of said tubes relative to said one tube, and wherein said axial force applying device applies said axial force to said other tube while said one tube is held by said frame structure such that said one tube is not axially movable relative to said frame structure.

12. An apparatus according to claim 11, wherein said axial force applying device includes:

at least one axially forcing roller disposed such that an outer circumferential surface of said at least one axially forcing roller is held in contact with an outer circumferential surface of said other tube;

a roller support structure which supports said at least one axially forcing roller such that said at least one axially forcing roller is rotatable about an axis thereof;

a holder device which holds said roller support structure in said frame structure such that said roller support structure is immovable in axial and radial directions of said other tube and is rotatable about an axis of said other tube; and a roller drive device disposed on said roller support structure and operable to rotate said at least one axially forcing roller.

13. An apparatus according to claim 12, wherein said holder device includes an annular rail fixed to said frame structure coaxially with said other tube, and at least three support rollers attached to said roller support structure such that said at least three support rollers are arranged in a circumferential direction of said other tube, said at least three support rollers being held in rolling engagement with said annular rail.

14. An apparatus according to claim 11, wherein said rotary drive device includes a hydraulic cylinder, a chucking device for holding said other tube, and a motion converting device for converting a linear motion of said hydraulic cylinder into a rotary motion of said chucking device, said hydraulic cylinder being operated to rotate said chucking device for thereby rotating said other tube, and wherein said terminating condition determining device determines a desired final value of the wrenching torque on the basis of said physical quantity obtained by said physical quantity obtaining device, said apparatus further comprising:

a termination determining device for determining that said terminating condition is satisfied when said wrenching torque obtained on the basis of said hydraulic pressure has become equal to said desired final value.

15. An apparatus according to claim 11, wherein said rotary drive device includes a rotary motor for rotating said other tube, and said torque detecting device detects said wrenching torque on the basis of an operating state of said rotary motor.

16. An apparatus according to claim 15, wherein said rotary motor is a hydraulic motor, and said torque detecting device includes a pressure detector for detecting a hydraulic pressure in said hydraulic motor.

17. An apparatus according to claim 12, wherein said holder device includes an includes:

an axial force applying member fixed to one of said externally and internally threaded tubes such that said axial force applying member is coaxial with said one tube and is not movable relative to said one tube in an axial direction of said one tube; and an axial drive device disposed between said axial force applying device and said frame structure and operable to apply said axial force to said axial force applying member in at least one of opposite axial directions of said tubes, while permitting rotation of said axial force applying member relative to said frame structure.

18. An apparatus according to claim 1, wherein said axial force applying device includes an impact force applying device for applying an impact force to said externally and internally threaded tubes as said axial force.

19. An apparatus according to claim 1, wherein said physical quantity obtaining device includes an axial force detecting device which detects said axial force applied to said tubes by said axial force applying device, said physical quantity obtaining device estimating said coefficient of friction on the basis of said axial force detected by said axial force detecting device and said wrenching torque detected by said torque detecting device.

20. An apparatus according to claim 1, wherein said torque detecting device includes a torsional torque detecting device for detecting a torsional torque applied to a rotary shaft in said rotary drive device.

21. An apparatus according to claim 1, wherein said rotary drive device includes:

a rotary drive source;

a clamping device for clamping one of said externally and internally threaded tubes to a frame structure such that said one tube is not rotatable relative to said frame structure;

a rotary motion transmitting device for transmitting a rotary motion of said rotary drive source to the other of said tubes; and a drive source holder device for holding said rotary drive source such that said rotary drive source is axially movable relative to said frame structure and is not rotatable about an axis thereof, and wherein said torque detecting device includes a reaction force detecting device which detects a reaction force which is applied to said drive source holder device as a result of rotation of said other tube.

22. An apparatus according to claim 1, wherein said rotary drive device includes an electric motor as a rotary drive source, and said torque detecting device detects said wrenching torque on the basis of an electric current flowing through said electric motor.

23. An apparatus according to claim 1, further comprising a frame structure consisting of a plurality of separate elements positioned radially outwardly of said tubes such that said elements are arranged in a circumferential direction of said tubes, and a fixing device for fixing said separate elements to each other such that said separate elements are butted together in planes parallel to an axis of said tubes, so as to surround portions of outer circumferential surfaces of said tubes.

24. An apparatus according to claim 1, further comprising an intermediate phase detecting device for detecting at least one point of time in an intermediate phase of said wrenching operation.

25. An apparatus according to claim 24, wherein said intermediate phase detecting device detects said at least one point of time on the basis of the wrenching torque detected by said torque detecting device.

26. An apparatus according to claim 24, wherein said intermediate phase detecting device includes a device for detecting a moment of initiation of said intermediate phase depending upon a rapid change of a rate of change of the detected wrenching torque, which rapid change takes place upon transition of the wrenching operation from an initial phase to said intermediate phase.

27. An apparatus according to claim 24, wherein said intermediate phase detecting device includes:

torque memory means for storing values of said wrenching torque which are detected from time to time by said torque detecting device; and determining means for determining a moment of termination of said intermediate phase on the basis of the values of the wrenching torque stored in said torque memory means, after the detected wrenching torque has reached a predetermined value.

28. An apparatus according to claim 1, further comprising a final phase detecting device which detects a final phase of said wrenching operation in which at least one of an axial tightening force and a radial tightening force is generated between said externally and internally threaded portions of said tubes.

29. An apparatus according to claim 1, wherein said terminating condition determining device determines a desired final value of the wrenching torque on the basis of said physical quantity obtained by said physical quantity obtaining device, said apparatus further comprising:

a termination determining device for determining that said terminating condition is satisfied when the actual value of said wrenching torque has become equal to said desired final value.

30. An apparatus according to claim 1, further comprising a thread engagement abnormality detecting device which detects an abnormality associated with mutual meshing engagement of said externally and internally threaded portions of said tubes, on the basis of an initial value of said wrenching torque detected by said torque detecting device in an initial phase of said wrenching operation.

31. An apparatus according to claim 1, wherein said physical quantity obtaining device and said terminating condition determining device comprise a computer connected to at least said torque detecting device.

* * * * *